United States Patent
Baek et al.

(10) Patent No.: US 10,219,159 B2
(45) Date of Patent: Feb. 26, 2019

(54) METHOD AND APPARATUS FOR TRANSMITTING AND RECEIVING REFERENCE SIGNAL USING UNLICENSED BAND

(71) Applicant: Electronics and Telecommunications Research Institute, Daejeon (KR)

(72) Inventors: Seung-Kwon Baek, Daejeon (KR); Chanho Yoon, Daejeon (KR); Eunkyung Kim, Daejeon (KR); Jae Sun Cha, Daejeon (KR); Sung Cheol Chang, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 74 days.

(21) Appl. No.: 15/012,190

(22) Filed: Feb. 1, 2016

(65) Prior Publication Data

US 2016/0227571 A1    Aug. 4, 2016

(30) Foreign Application Priority Data

Jan. 30, 2015  (KR) .................... 10-2015-0015555
Apr. 10, 2015  (KR) .................... 10-2015-0051172
(Continued)

(51) Int. Cl.
*H04W 72/12*    (2009.01)
*H04W 16/14*    (2009.01)
(Continued)

(52) U.S. Cl.
CPC ........... *H04W 16/14* (2013.01); *H04L 5/0053* (2013.01); *H04W 48/20* (2013.01);
(Continued)

(58) Field of Classification Search
CPC .... H04L 5/0053; H04W 16/14; H04W 24/02; H04W 48/12; H04W 48/20; H04W 52/0206; H04W 74/0808; H04W 88/06
See application file for complete search history.

(56) References Cited

U.S. PATENT DOCUMENTS 8,290,503 B2    10/2012  Sadek et al.
2008/0062865 A1*  3/2008  Neugebauer .......... H04W 88/04
                                                   370/229
(Continued)

FOREIGN PATENT DOCUMENTS

WO    2012078565 A1    6/2012
WO    2013179095 A1    12/2013

OTHER PUBLICATIONS

"Study on Licensed-Assisted Access to Unlicensed Spectrum," 3GPP TR 36.889, Nov. 2014, pp. 1-40, vol. 0.1.1.
(Continued)

*Primary Examiner* — Awet Haile
(74) *Attorney, Agent, or Firm* — William Park & Associates Ltd.

(57) ABSTRACT

There are provided a method and apparatus for transmitting a discovery reference signal (DRS) through transmitting the DRS to a user equipment through a channel of an unlicensed band, receiving measurement report for measurement performed based on the DRS from the user equipment, and scheduling the cell of the unlicensed band based on the measurement report and providing a service to the user equipment through the cell of the unlicensed band.

13 Claims, 48 Drawing Sheets

(30) Foreign Application Priority Data

| May 15, 2015 | (KR) | 10-2015-0068106 |
|---|---|---|
| Jul. 3, 2015 | (KR) | 10-2015-0095428 |
| Jul. 7, 2015 | (KR) | 10-2015-0096480 |
| Aug. 10, 2015 | (KR) | 10-2015-0112552 |
| Sep. 11, 2015 | (KR) | 10-2015-0129293 |
| Jan. 29, 2016 | (KR) | 10-2016-0011989 |
| Jan. 29, 2016 | (KR) | 10-2016-0011990 |

(51) Int. Cl.
  *H04W 48/20* (2009.01)
  *H04W 52/02* (2009.01)
  *H04L 5/00* (2006.01)
  H04W 74/08 (2009.01)
  H04W 24/02 (2009.01)
  H04W 48/12 (2009.01)
  H04W 88/06 (2009.01)
  H04W 36/00 (2009.01)

(52) U.S. Cl.
  CPC ........ *H04W 52/0206* (2013.01); *H04W 24/02* (2013.01); *H04W 36/0069* (2018.08); *H04W 48/12* (2013.01); *H04W 74/0808* (2013.01); *H04W 88/06* (2013.01)

(56) References Cited

U.S. PATENT DOCUMENTS

| 2012/0117446 | A1* | 5/2012 | Taghavi Nasrabadi ............... H04L 1/0003 714/776 |
|---|---|---|---|
| 2013/0336180 | A1 | 12/2013 | Park et al. |
| 2014/0122965 | A1 | 5/2014 | Zeng et al. |
| 2014/0293911 | A1 | 10/2014 | Cheong et al. |
| 2015/0049741 | A1 | 2/2015 | Chen et al. |
| 2015/0051123 | A1 | 2/2015 | Karaki et al. |
| 2015/0063148 | A1 | 3/2015 | Sadek |
| 2015/0126207 | A1 | 5/2015 | Li et al. |
| 2015/0131536 | A1 | 5/2015 | Kaur et al. |
| 2015/0312789 | A1* | 10/2015 | You ................ H04L 1/0693 370/252 |
| 2015/0373674 | A1* | 12/2015 | Han ................ H04W 16/14 370/329 |
| 2016/0100404 | A1* | 4/2016 | Han ................ H04W 16/14 370/329 |
| 2016/0135179 | A1* | 5/2016 | Yin ................ H04J 11/0069 370/329 |
| 2017/0339580 | A1* | 11/2017 | Martin ............. H04W 24/02 |

OTHER PUBLICATIONS

"5G Prior Art Analysis Document (Mobile Communication System Utilizing Unlicensed Band Frequency)," May 28, 2014, p. 1-98.
"LTE Advanced Service on Unlicensed Spectrum", TTA Journal, 2014, pp. 71-78, vol. 152.
"Broadband Radio Access Networks (BRAN); 5 GHz high performance RLAN," ETSI EN 301 893 V.1.7.2, Jul. 2014, pp. 1-96.
"Scenarios and Requirements for LAA," 3GPP TSG RAN WG2 #89, R2-150234, Feb. 9-13, 2015, pp. 1-6.
"Discussion on Carrier Selection in LAA," 3GPP TSG RAN WG2 #89bis, R2-151292, Apr. 20-24, 2015, pp. 1-4.
"Consideration on Measurement for LAA," 3GPP TSG-RAN WG2 Meeting #90, R2-152427, May 25-29, 2015, pp. 1-4.
"RSSI Measurement for LAA," 3GPP TSG RAN WG2 #91, R2-153429, Aug. 24-28, 2015, pp. 1-4.
"RSSI measurement for hidden node detection," 3GPP TSG RAN WG2 #91bis, R2-154303, Oct. 5-9, 2015, pp. 1-5.
"Time domain pattern for channel occupancy," 3GPP TSG RAN WG2 #92, R2-156266, Nov. 16-20, 2015, pp. 1-3.

* cited by examiner

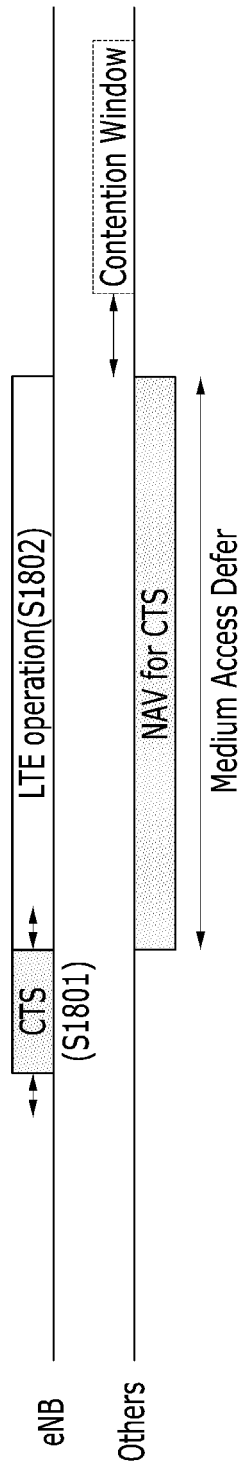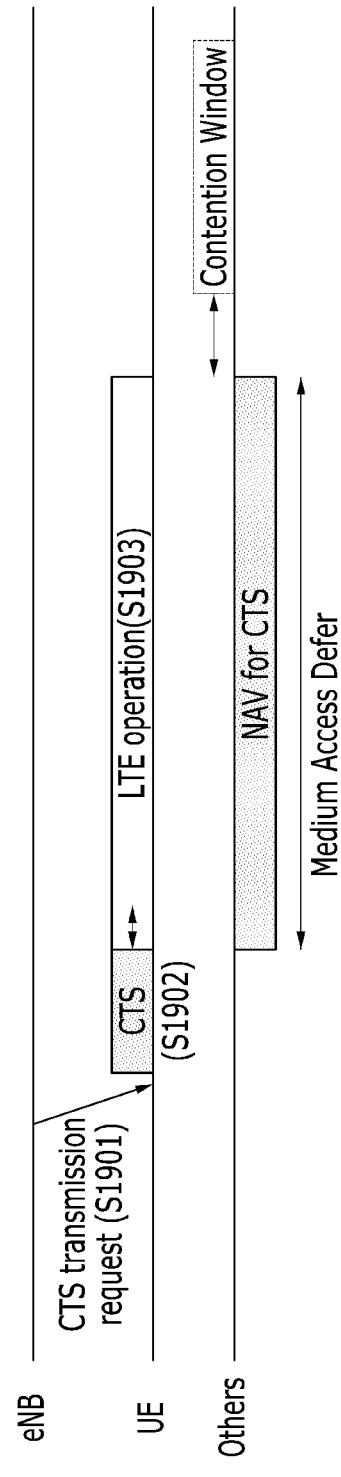

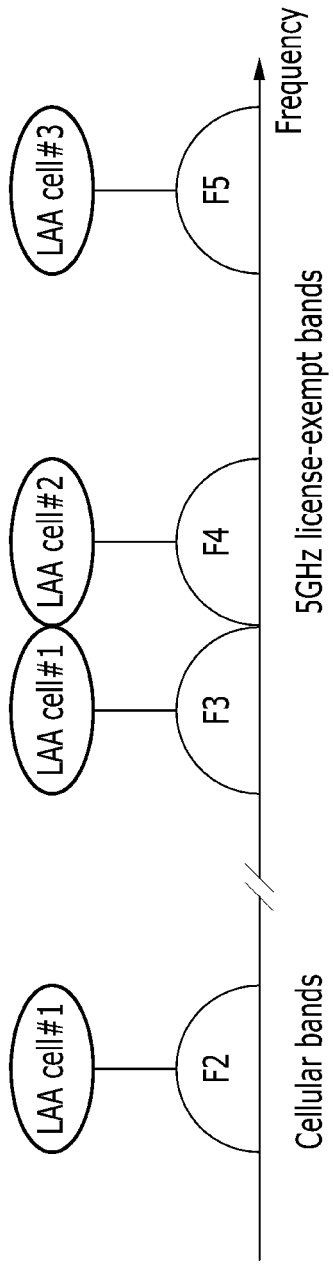
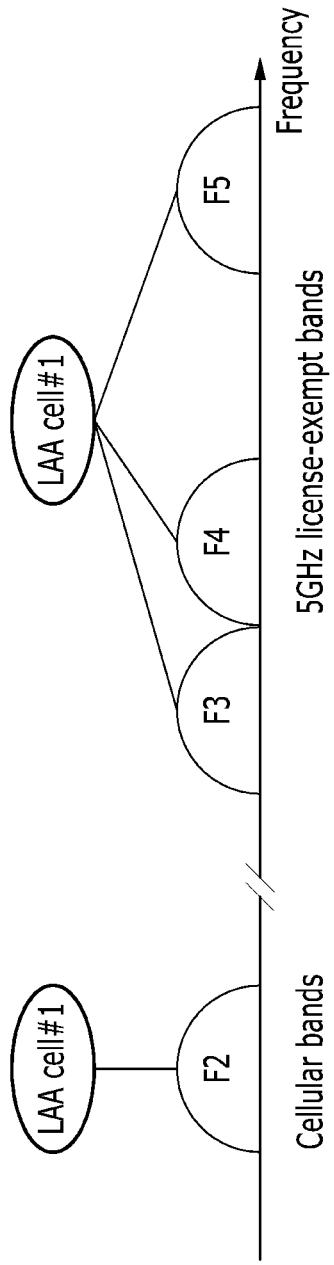

FIG. 26

| R | R | E | LCID:11011 |

MAC subheader

| c7 | c6 | c5 | c4 | c3 | c2 | c1 | R |

MAC Control Element

FIG. 35

```
MeasGapConfig-LAA-r13 ::=   CHOICE {
    release                     NULL,
    setup                       SEQUENCE {
        gapOffset                   CHOICE {
            gp0                         INTEGER (0..39),
            gp1                         INTEGER (0..79),
            ...
        }
    }
}
```

FIG. 36

```
MeasGapConfig-LAA-r13 ::= CHOICE {
    release              NULL,
    setup                SEQUENCE {
        gapOffset            CHOICE {
            gp0                  INTEGER (0..39),
            gp1                  INTEGER (0..79),
            gp x                 INTEGER (0..9),
            gp y                 INTEGER (0..19),
            ...
        }
    }
}
```

FIG. 38

```
MeasGapConfig-LAA-r13 ::=      CHOICE {
    release                        NULL,
    setup                          SEQUENCE {
        dmt c-PeriodOffset-r12         CHOICE {
            ms10-r13                       INTEGER (0..9),
            ms20-r13                       INTEGER (0..19),
            ms40-r12                       INTEGER (0..39),
            ms80-r12                       INTEGER (0..79),
            ms160-r12                      INTEGER (0..159),
            ...
        },
        ds-OccasionDuration-r12        CHOICE {                                     -- for Alt.3
            durationFDD-r12                INTEGER (1..maxDS-Duration-r12),         -- for Alt.3
            durationTDD-r12                INTEGER (2..maxDS-Duration-r12)
        },
        ds-WindowConfiguration-r13     SEQUENCE {                                   -- for Alt.2
            windowSize-r13                 INTEGER (1..maxDS-WindowSize-r13),
            numDRSTx-r13                   INTEGER (1..maxDS-DrsTransmission-r13),
            intervalDRSTx-r13              INTEGER (1..maxDS-DrsInterval-r13)
        },
        measCSI-RS-ToRemoveList-r12    MeasCSI-RS-ToRemoveList-r12 OPTIONAL,        -- Need ON
        measCSI-RS-ToAddModList-r12    MeasCSI-RS-ToAddModList-r12 OPTIONAL         -- Need ON
    }
}
```

FIG. 39

```
QuantityConfig ::=      SEQUENCE {
    quantityConfigEUTRA     QuantityConfigEUTRA     OPTIONAL,       -- Need ON
    ...,
}

QuantityConfigEUTRA ::= SEQUENCE {
    fiterCoefficientRSRP    FilterCoefficient       DEFAULT fc4,
    fiterCoefficientRSRQ    FilterCoefficient       DEFAULT fc4,
    fiterCoefficientRSSI    FilterCoefficient       DEFAULT FFS     -- for r-13 RSSI
}
```

METHOD AND APPARATUS FOR TRANSMITTING AND RECEIVING REFERENCE SIGNAL USING UNLICENSED BAND

CROSS-REFERENCE TO RELATED APPLICATION

This application claims priority to and the benefit of Korean Patent Application Nos. 10-2015-0015555, 10-2015-0051172, 10-2015-0068106, 10-2015-0095428, 10-2015-0096480, 10-2015-0112552, 10-2015-0129293, 10-2016-0011989, and 10-2016-0011990 filed in the Korean Intellectual Property Office on Jan. 30, 2015, Apr. 10, 2015, May 15, 2015, Jul. 3, 2015, Jul. 7, 2015, Aug. 10, 2015, Sep. 11, 2015, Jan. 29, 2016, and Jan. 29, 2016, the entire contents of which are incorporated herein by reference.

BACKGROUND OF THE INVENTION (a) Field of the Invention

The present invention relates to a method and apparatus for transmitting and receiving a reference signal using an unlicensed band in a mobile communication system.

(b) Description of the Related Art $3^{rd}$ generation partnership project long term evolution (3GPP LTE) has been globally enlarged to 251 commercial networks in 93 countries for about 4 years after being commercially available on 2009 and recently, the number of subscribers throughout the world has exceed one hundred million and 2 ten million. Accordingly, use of data through an LTE service has been further rapidly increased as a pad type terminal for supporting a large screen and high resolution has been widely used, and in the future, if device communication such as machine-to-machine (M2M) is extended, it is expected that "data explosion" will occur in a cellular network.

In order to accommodate explosive increase of data as described above-wireless communication providers have conducted researches into a method for remarkably extending a data capacity to be provided by a network without investment of large scale equipment or broadscale increase in communication costs while sufficiently meeting demands for data use of consumers. As one of solutions that have been introduced by a plurality of wireless communication providers in order to correspond to explosive increase of data in a cellular network, wireless data traffic concentrated on a 3G or LTE network is dispersed (that is, off-loaded) using a wireless local area network (WLAN) communication method that is managed in an unlicensed band such as an industrial, scientific and medical (ISM) band. An unlicensed band is not a band in which a communication provider is capable of ensuring exclusive frequency license and thus, when an unlicensed band is used, a significant level of traffic capacity may be dispersed at a low cost. However, since a large amount of communication apparatuses are capable of being used without limitations only when interference relative regulation within a band is observed in an unlicensed band, it is difficult to ensure communication quality corresponding to a level provided through a communication service through a licensed band in which exclusive license is ensured.

3GPP has progressed standardization for association with Wi-Fi as the IEEE standard technology as well as high speed packet access (HSPA) or an LTE system from 2002, and currently, discussion and standard for various types of interworking methods have been established. However, it is not easy to integrate two systems into one network in order to ensure effective mobility and quality of service (QoS) due to a structural difference between a cellular network and a wireless local area network (WLAN). In order to overcome this difficulty, recently, LTE on unlicensed spectrum (LTE-U) or U-LTE technologies have been actively discussed. Recently, 3GPP has held workshop for standardization for cellular technologies in an unlicensed band and discussed requirements based on opinion of each vendor. In addition, 3GPP has approved the "Study on Licensed-Assisted Access to Unlicensed Spectrum" as a study item (SI) for providing an LTE service in an unlicensed band and has standardized the SI.

Recently, LTE has supported a frequency bandwidth of 1.4 MHz to 20 MHz (1.4 MHz, 3 MHz, 5 MHz, 10 MHz, 15 MHz, and 20 MHz), and mobile communication providers select a bandwidth appropriate for a provider in an allocated frequency bandwidth and provide an LTE service.

3GPP LTE LAA that has currently progressed standardization basically considers a system bandwidth of 20 MHz and does not consider use of a system bandwidth less than a minimum of 5 MHz (i.e., 1.4 MHz and 3 MHz). This refers to a bandwidth between 5 GHz and 20 MHz in a frequency bandwidth considered in the legacy LTE. That is, an available unlicensed band frequency may be classified into 5 MHz, 10 MHz, 15 MHz, 20 MHz, and so on. In addition, it is possible to use a frequency of several tens of MHz or several hundreds of MHz for each area in an unlicensed frequency bandwidth of 5 GHz. Accordingly, an unlicensed band frequency of a band of 5 GHz may include a plurality of frequencies with a fixed size of bandwidth. For example, in the case of Korea, there is an unlicensed bandwidth of 150 MHz in 5.1 GHz to 5.25 GHz, and when an unlicensed bandwidth of 150 MHz is divided into a size of 20 MHz, and about 7 independent carriers may be used.

The legacy LTE sets a frequency bandwidth of a fixed size for each cell and provides a service according to frequency allocation policy. This is because mobile communication providers are capable of exclusively using a corresponding frequency bandwidth, and mobile communication providers may optimize a mobile communication network by changing a predetermined frequency bandwidth as necessary. However, in an unlicensed band of 5 GHz, unlicensed devices using different wireless access technology such as WiFi as well as an LAA device coexist, and thus interference and load degrees may be changed according to degrees of access and use of these devices. Accordingly, the LAA system needs to dynamically use an unlicensed band frequency in consideration of interference and load degrees in order to increase unlicensed band frequency utilization efficiency and to effectively transmit/receive data, and to this end, there is a need for a method for selecting and changing a carrier in order to dynamically manage carrier in the LAA.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides an apparatus for transmitting a discovery reference signal (DRS) through a channel of an unlicensed band. Another embodiment of the present invention provides a method for transmitting a discovery reference signal (DRS) through a channel of an unlicensed band.

Yet another embodiment of the present invention provides a method for dynamically selecting one from a plurality of unlicensed band carriers by adding a cell of an unlicensed band as a secondary cell through an RRC connection reconfiguration procedure and monitoring a control channel for a cell of an unlicensed band added based on a control element of a MAC layer According to an embodiment of the present invention, a method for transmitting a discovery reference signal (DRS) by a base station includes transmitting the DRS to a user equipment through a channel of an unlicensed band, receiving measurement report for measurement performed based on the DRS from the user equipment, and scheduling the cell of the unlicensed band based on the measurement report and providing a service to the user equipment through the cell of the unlicensed band.

The measurement report may include measurement information of a physical layer between the base station and the user equipment or measurement information of a radio resource control (RRC) layer.

The transmitting of the DRS may include acquiring an access right to a channel of the unlicensed band, and when the access right is acquired, transmitting the DRS to the user equipment through the channel of the unlicensed band.

When the access right is acquired, transmitting the DRS to the user equipment through the channel of the unlicensed band may further include transmitting DRS indication including information about the DRS to the user equipment.

The method may further include, prior to the transmitting of the DRS, indicating a time point for transmitting the DRS to the user equipment through the licensed band cell.

The method may further include, prior to the transmitting of the DRS, transmitting DRS measurement timing configuration (DMTC) information as information associated with transmission of the DRS to the user equipment.

The DMTC information may include at least one of parameters for a transmission duration of the DRS, subframe offset, duration of DRS occasion, and measurement.

The transmitting of the DRS may include transmitting the DRS through a transmission duration of a short control channel (SCS).

The transmission duration of the SCS may be set as time duration corresponding to 10% of time duration of 50 msec or time duration corresponding to 10% of the same observation time duration as dwell time.

The providing of the service to the user equipment may include performing on/off on the cell of the unlicensed band based on physical layer signaling or physical layer scheduling.

According to another embodiment of the present invention, a base includes at least one processor, a memory, and a wireless communication unit, wherein the at least one processor executes at least one program stored in the memory to perform transmitting a discovery reference signal (DRS) to a user equipment through a channel of an unlicensed band, receiving measurement report for measurement performed based on the DRS from the user equipment, and scheduling the cell of the unlicensed band based on the measurement report and providing a service to the user equipment through the cell of the unlicensed band.

The measurement report may include measurement information of a physical layer between the base station and the user equipment or measurement information of a radio resource control (RRC) layer.

During transmission of the DRS, the at least one processor may perform acquiring an access right to a channel of the unlicensed band, and when the access right is acquired, transmitting the DRS to the user equipment through the channel of the unlicensed band.

When the access right is acquired, during transmission of the DRS to the user equipment through the channel of the unlicensed band, the at least one processor further performs transmitting DRS indication including information about the DRS to the user equipment.

Prior to the transmitting of the DRS, the at least one processor may further perform indicating a time point for transmitting the DRS to the user equipment through the licensed band cell.

Prior to the transmitting of the DRS, the at least one processor may further perform transmitting DRS measurement timing configuration (DMTC) information as information associated with transmission of the DRS to the user equipment.

The DMTC information may include at least one of parameters for a transmission duration of the DRS, subframe offset, duration of DRS occasion, and measurement.

During transmission of the DRS, the at least one processor may perform transmitting the DRS through a transmission duration of a short control channel (SCS).

The transmission duration of the SCS may be set as time duration corresponding to 10% of time duration of 50 msec or time duration corresponding to 10% of the same observation time duration as dwell time.

During providing of a service to the user equipment, the at least one processor may perform performing on/off on the cell of the unlicensed band based on physical layer signaling or physical layer scheduling.

According to another exemplary embodiment, a method for selecting a carrier of an unlicensed band includes adding a first cell managed in an unlicensed band as a secondary cell through an RRC connection reconfiguration procedure and monitoring a control channel for a first cell based on an activation MAC CE for activating the first cell.

In a mobile communication system, a discovery reference signal used in search of a cell of an unlicensed band may be transmitted so as to use an unlicensed band frequency.

In addition, a plurality of unlicensed band carriers may be dynamically used so as to effectively use a plurality of carriers included in an unlicensed band in a mobile communication system.

BRIEF DESCRIPTION OF THE DRAWINGS

FIG. 18 is a schematic view illustrating an eNB-based CTS method according to an exemplary embodiment of the present invention.

FIG. 19 is a schematic view illustrating a UE-based CTS method according to an exemplary embodiment of the present invention.

FIGS. 22A and 22B are schematic views illustrating a frequency allocating method for an LAA cell according to an exemplary embodiment of the present invention.

FIG. 26 is a diagram illustrating a MAC CE for dynamic carrier configuration according to an exemplary embodiment of the present invention.

FIG. 35 is a diagram illustrating abstract syntax notation one (ASN.1) illustrating measurement gap configuration for an LAA cell according to an exemplary embodiment of the present invention.

FIG. 36 illustrates ASN.1 illustrating measurement gap configuration for an LAA cell according to another exemplary embodiment of the present invention.

FIG. 38 illustrates ASN.1 illustrating DMTC configuration according to an exemplary embodiment of the present invention.

FIG. 39 illustrates ASN.1 for quantity configuration for layer 3 filtering according to an exemplary embodiment of the present invention.

DETAILED DESCRIPTION OF THE EMBODIMENTS

Figure 1:
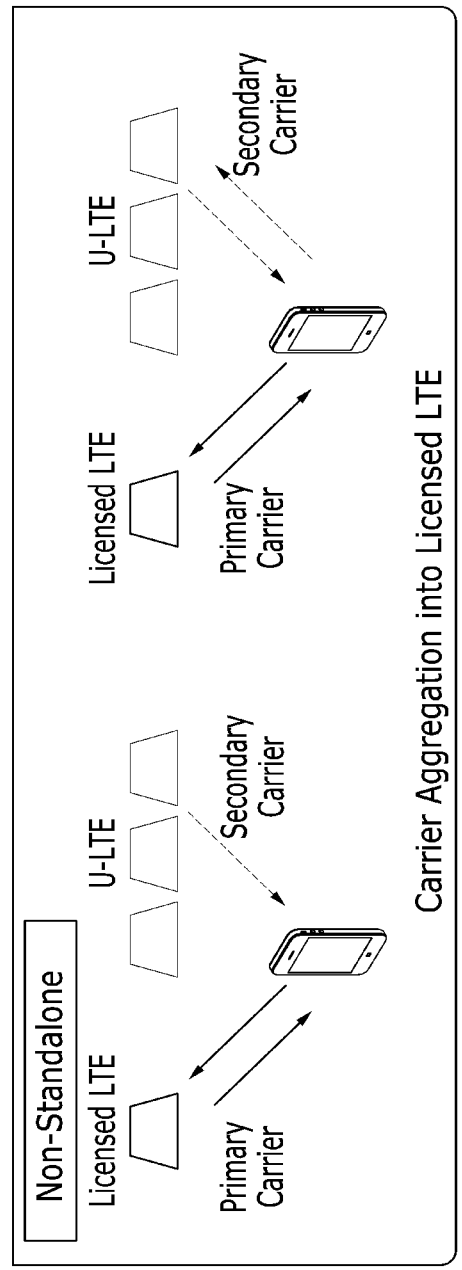
FIG. 1 is a schematic view illustrating a secondary carrier aggregation method for LAA according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, to clearly describe the present invention, a part without concerning to the description is omitted in the drawings, and like reference numerals in the specification denote like elements. Like reference numerals designate like elements throughout the specification.

Through this specification, a user equipment (UE) may refer to a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication (MTC) device, and so on, and may include some or all of functions of the MT, the MS, the AMS, the HR-MS, the SS, the PSS, the AT, the UE, and so on.

In addition, a base station (BS) may refer to an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) that functions as a base station, a relay node (RN) that functions as a base station, an advanced relay station (ARS) that functions as a base station, a high reliability relay station (HR-RS) that functions as a base station, a small base station (a femto BS, a home nodeB (HNB), a home eNodeB (HeNB), a pico BS, a macro BS, a micro BS, and so on), and so on, and may include some or all of functions of ABS, nodeB, eNodeB, AP, RAS, BTS, MMR-BS, RS, RN, ARS, HR-RS, small base station, and so on.

FIG. 1 is a schematic view illustrating a secondary carrier aggregation method for LAA according to an exemplary embodiment of the present invention.

Referring to FIG. 1, in a left portion, a cell in an unlicensed band performs only downlink transmission, and in a right portion, an unlicensed cell partially performs both uplink and downlink transmission.

In order to provide a service through an unlicensed band in a mobile communication system such as LTE, a small cell of an unlicensed band with low reliability may be used to disperse traffic based on a mobile communication macro cell with high reliability. That is, a licensed band with high reliability may be used to transmit/receive system control information for which reliability needs to be ensured like configuration of a radio resource and mobility control of a terminal, and user traffic may be transmitted/received through a licensed band and an unlicensed band in consideration of a state and service requirement of a network. In general, downlink traffic is higher than uplink traffic due to the characteristics of service traffic in a mobile communication network, and thus a cell of an unlicensed band may be mainly used to transmit downlink traffic in consideration of this. That is, an unlicensed cell may be secondarily used to increase cell capacity and user data speed via support of a cell of a licensed band, and in this specification, a use type of the unlicensed cell may be referred to as LTE-licensed assisted access (LAA).

In order to effectively use a cell that operates in a plurality of component carriers (CCs) to improve a data rate of a user, carrier aggregation (CA) technology may be applied to the LAA. According to an exemplary embodiment of the present invention, a CC that operates in a licensed band cell may perform a function of a primary component carrier (PCC) in order to transmit/receive with reliability of system control information and a CC that operates in an unlicensed band cell may perform a function of a secondary component carrier (SCC). In addition, as a duplex method of each cell, a frequency division duplex (FDD) or time division duplex (TDD) method may be considered.

Figure 2:
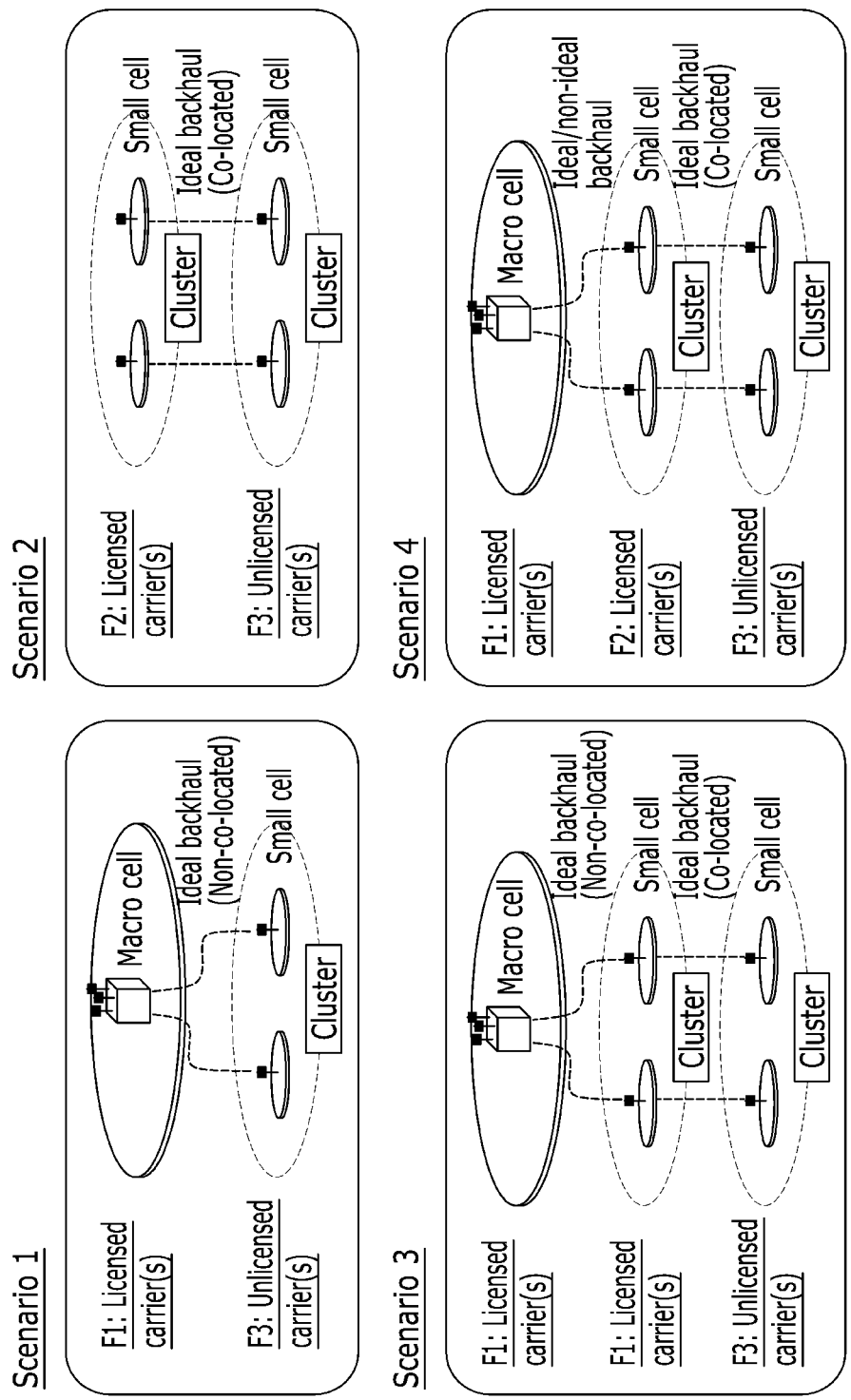
FIG. 2 is a schematic view illustrating arrangement scenarios for LAA according to an exemplary embodiment of the present invention.

FIG. 2 is a schematic view illustrating arrangement scenarios for LAA according to an exemplary embodiment of the present invention.

The arrangement scenarios illustrated in FIG. 2 may be defined according to Table 1 below.

TABLE 1

| | Definition |
|---|---|
| Scenario 1 | CA between licensed band macro cell F1 and unlicensed band small cell F3 |
| Scenario 2 | CA between licensed band small cell F2 and unlicensed band small cell F3 (without macro cell coverage) |
| Scenario 3 | CA between licensed band small cell F2 and unlicensed band small cell F3 (with macro cell coverage) |
| Scenario 4 | licensed band macro cell F1, licensed band small cell F2, and unlicensed band small cell F3 CA between licensed band small cell F2 and unlicensed band small cell F3 When ideal backhaul between a macro cell and a small cell is present, a carrier aggregation group (CAG) between a macro cell F1, a licensed band small cell F2, and an unlicensed band small cell F3 is present. When dual connectivity is possible, dual connectivity between a macro cell and a small cell is present. |

Under LAA, at least one small cells of an unlicensed band may operate based on CA. A small cell of an unlicensed band may be disposed to overlap with a macro cell or only a small cell of a licensed band may be arranged, and cells may be arranged in indoor and outdoor environments. In addition, according to an arrangement method of a small cell of a licensed band, a small cell of an unlicensed band may be co-located with a cell of a licensed band or may be non co-located with a cell of a licensed band through ideal backhaul. In addition, according to frequencies used in a macro cell and a small cell of a licensed band, an equal frequency scenario and an unequal frequency scenario may be considered, respectively.

Figure 3:
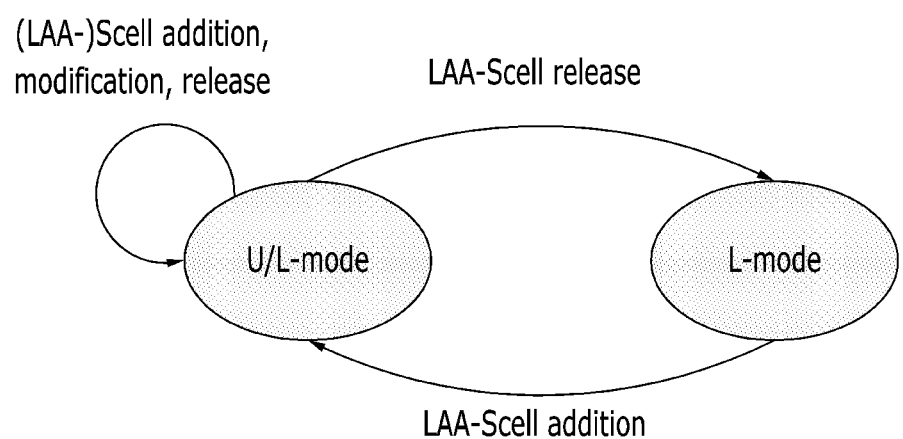
FIGS. 3 and 4 are each a state transition diagram of a LAA UE according to an exemplary embodiment of the present invention.
Figure 4:
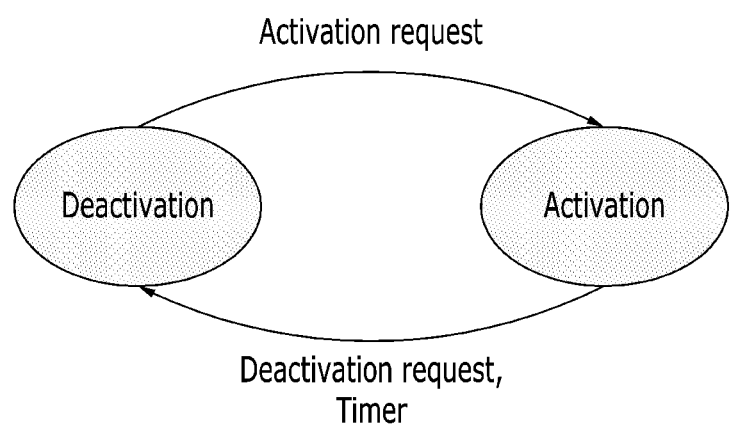
Figure 5:
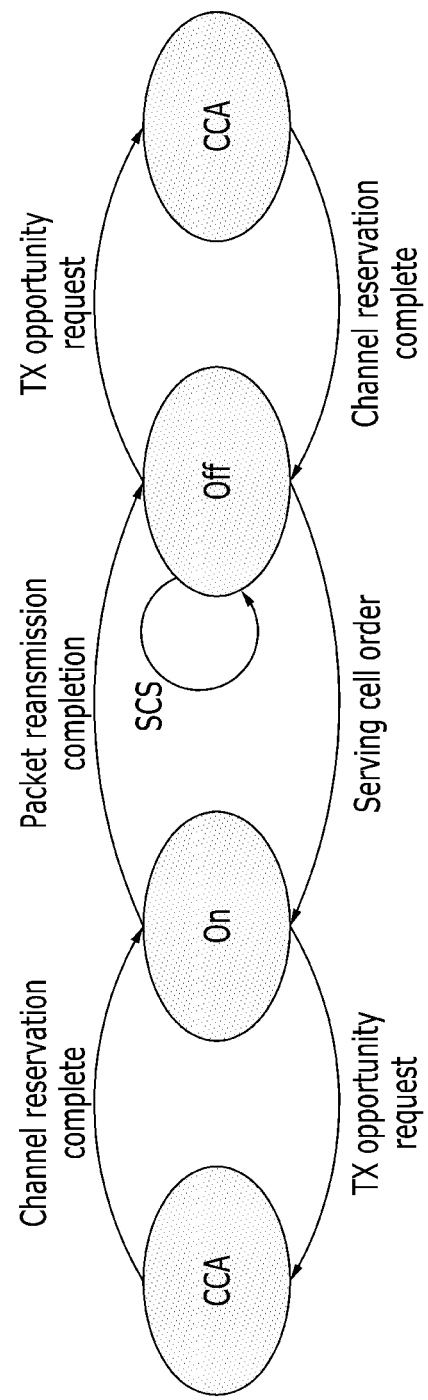
FIG. 5 is a state transition diagram of a LAA eNB according to an exemplary embodiment of the present invention.

FIGS. 3 and 4 are each a state transition diagram of a LAA UE according to an exemplary embodiment of the present invention, and FIG. 5 is a state transition diagram of a LAA eNB according to an exemplary embodiment of the present invention.

Through this specification, an LAA cell may be a small cell of an unlicensed band and an LAA UE may be a UE that accesses an LAA cell and receives a service. From a point of view of the LAA UE, an LAA operating state may be changed according to configuration of an LAA cell that operates in an unlicensed band and activation of the configured LAA cell. That is, a state of the LAA UE for configuration of the LAA cell may be a state according to an operating procedure of a radio resource control (RRC) protocol and a state according to activation of the LAA cell may be a state according to an operating procedure of a media access control (MAC) protocol.

Referring to FIG. 3, an LAA UE in an L-Mode may be transited to a U/L-Mode when an LAA cell is added (LAA-SCell addition), and then an LAA UE in a U/L-Mode may maintain a U/L-Mode during addition, modification, and release of an LAA cell or a licensed band cell. When all LAA cells are released (LAA-SCell release), an LAA UE may transit a state back to an L-Mode from a U/L-Mode.

An LAA cell for CA may be configured via an RRC protocol procedure such as SCell addition, Secondary cell (SCell) modification, or SCell release. A state of an LAA UE for configuration of an LAA cell may be classified into an L-Mode in which a cell of a licensed band is configured and a U/L-Mode in which cells of a licensed band and an unlicensed band are simultaneously configured according to a type of a configured cell. In addition, a state of an LAA UE may be transited according to an RRC reconfiguration procedure such as configuration, modification, and release of a cell.

Referring to FIG. 4, an LAA UE in a deactivation state may be transited to an activation state through an activation request, and a LAA UE in an activation state may be transited to a deactivation state through a deactivation request or an operation of a timer.

Through configuration of an LAA cell, an LAA cell of an unlicensed band may be added, and an LAA UE in a U/L-mode state may be positioned in an activation/deactivation state via a control procedure of MAC. An activation state may refer to a state in which traffic is capable of being scheduled through an LAA cell, and a deactivation state may refer to a state in which an LAA cell of an unlicensed band is configured but traffic is not capable of being scheduled, and in this regard, an LAA UE may be positioned in the deactivation state when data to be transmitted is not temporally present. A LAA UE positioned in an activation state may provide a service using an LAA cell through a physical layer signal procedure.

An LAA cell may check an occupancy state of a channel through clear channel assessment (CCA) when approaching a shared channel of an unlicensed band and then uses a channel when the channel is not used by another device or other LAA cells. Accordingly, an access right to a shared channel of an unlicensed band may be variably changed, and thus an LAA eNB for providing a service using an LAA cell requires a function for recognizing an occupancy state of a channel and a discontinuous transmission function for transmitting a signal only when there is an access right to a channel.

From a point of view of the LAA cell, an LAA operation state may include three states according to transmission of data through an LAA cell.

An on state may be a state in which data to be transmitted in an LAA cell is present and signal and user data transmission is possible when the LAA cell has an access right to a channel of an unlicensed band through CCA. An off state may be a state in which data to be transmitted in an LAA cell is not present and only a discovery reference signal (DRS) is transmitted. In order to transmit a DRS in an off state, an LAA cell may use a method for acquiring an access right to a channel of an unlicensed band and then transmitting the DRS through CCA or a method for transmitting the DRS without acquisition of an access right to a channel of an unlicensed band through a transmission duration of a short control signal (SCS). A CCA state may be a state for acquisition of an access right to a channel of an unlicensed band and may be used as a previous state to an on state or an off state.

Referring to FIG. 5, an LAA cell in a CCA state may be transited to an on state when channel reservation is completed. Then, when transmission of all packets is completed through the LAA cell, the LAA cell may be transited to an off state. An LAA cell in an off state may be maintained in an off state while transmitting an SCS. Then, when there is transmission (Tx) opportunity request, an LAA cell may be transited to a CCA state. The LAA cell may also be transited to a CCA state when there is Tx opportunity request in an on state. An LAA cell in an off state may be transited to an on state when there is a serving cell order. In FIG. 5, CCA states each associated with an on state and an off state may be the same as each other.

Figure 6:
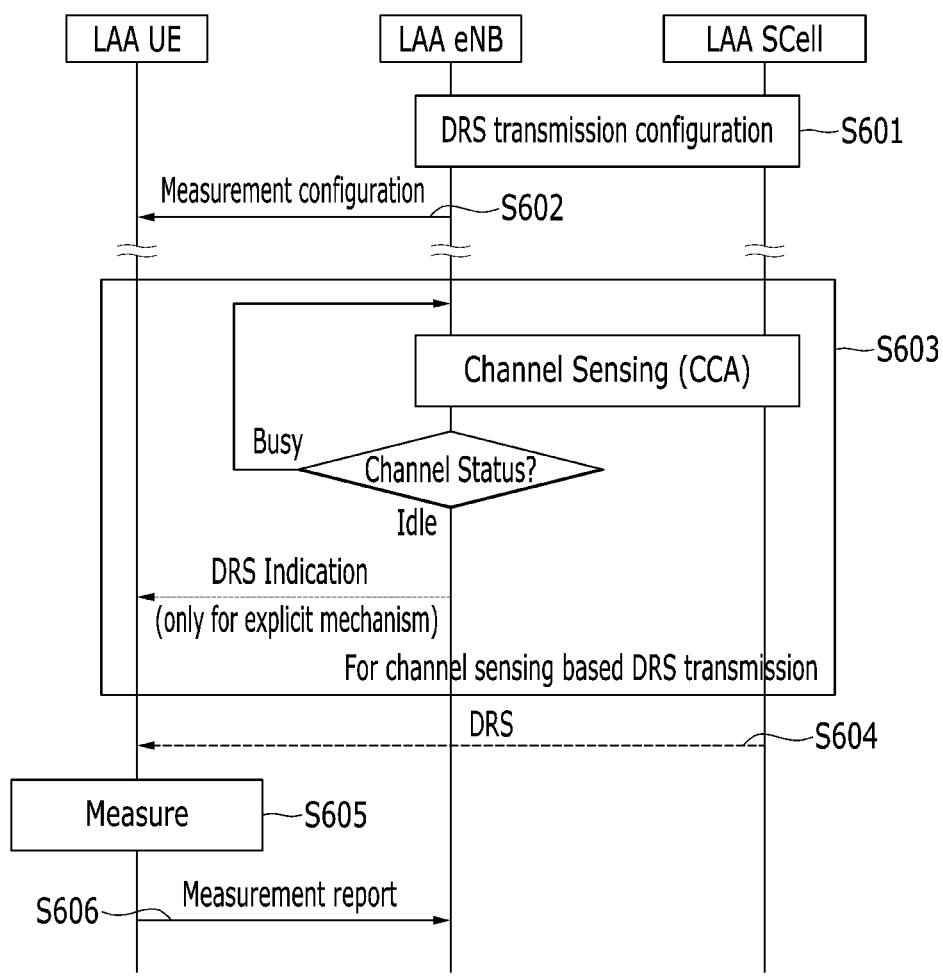
FIG. 6 is a flowchart illustrating a cell search method according to an exemplary embodiment of the present invention.

FIG. 6 is a flowchart illustrating a cell search method according to an exemplary embodiment of the present invention.

An LAA cell may be positioned in an on/off state according to whether data to be transmitted in a corresponding cell is present. When data to be transmitted in a corresponding cell is generated, an LAA cell positioned in an off state may be transited to an on state and provide a service according to control of an LAA eNB. To this end, an LAA cell may transmit a signal (DRS) for recognizing the LAA cell and detecting a channel state of the LAA cell in downlink. Then the LAA UE may monitor and measure the DRS transmitted in downlink. When a discovery signal is retrieved, an LAA UE may transmit the search result and measured information to an LAA eNB through a cell of a licensed band. The LAA eNB that receives the search result and the measured information of the LAA cell from the LAA UE may perform a configuration procedure and an activation procedure of the LAA cell, schedule the corresponding LAA cell, and provide a service to the LAA UE.

In this case, according to the aforementioned method for transmitting a DRS (the method for acquiring an access right to a channel of an unlicensed band and then transmitting the DRS or the transmitting method using an SCS), whether a physical layer signaling procedure is required may be determined.

That is, when an LAA eNB acquires an access right to a channel of an unlicensed band and then transmits a DRS (channel sensing based DRS transmission) (S603), the DRS may be aperiodically transmitted, and thus there is a need for a procedure for transmitting information indicating whether the DRS is transmitted to an LAA UE from an LAA eNB via a physical layer signaling procedure such as DRS indication. On the other hand, when the LAA cell transmits a DRS using an SCS, it is not necessary to acquire an access right to a channel of an unlicensed band, and thus an LAA eNB may transmit the DRS according to a predetermined operating period (S604), and a LAA UE may measure a DRS signal. Throughout this specification, the DRS may be used for synchronization of an LAA cell and measurement of a channel.

The LAA eNB may instruct the LAA UE to measure a DRS through measurement configuration (S602) as an RRC protocol procedure. The LAA UE that measures the DRS of the LAA cell (S605) may report the measurement result to the LAA eNB through a measurement report (S606) as an RRC protocol procedure or CSI report as a signal procedure of a physical layer. The LAA eNB that receives the measurement report or the CSI report for the LAA cell from the LAA UE may perform LAA cell configuration and LAA cell activation procedures for the LAA UE and provide a service to the LAA UE through the LAA cell.

A DRS for LAA cell search may be periodically transmitted (transmission of DRS with periodicity) or may be aperiodically transmitted (transmission of DRS without periodicity).

According to a transmission method of DRS with periodicity, an LAA cell may periodically transmit a discovery signal for cell search, and an LAA UE may measure a discovery signal based on a discovery signal transmission period set by an LAA eNB and report the measurement result to the LAA eNB.

In order to periodically transmit a DRS for LAA cell search, an SCS that is used for transmission a short control message may be used. That is, the DRS may be periodically transmitted through the SCS without channel sensing for an unlicensed band. A transmission duration (i.e., SCS duration) of an SCS may be set as time duration corresponding to 10% or less of time duration of 50 msec or time duration of 10% or less of the same observation time duration as dwell time. Accordingly, in the case of a DRS with a maximum length of 5 msec, the DRS may be transmitted through an SCS. However, an SCS may not be contained in regulation according to a country (the SCS is contained in regulation in Europe but is not contained in regulation in Japan), and different devices of an unlicensed band may transmit a signal during an SCS duration, and thus the accuracy of the measurement result may be lowered. In addition, a Wi-Fi system uses an SCS to transmit a control signal such as ACK/NACK, and thus interference may occur between an LAA system and Wi-Fi, thereby degrading system performance.

Accordingly, since the transmission method of DRS using an SCS allows periodic transmission of the DRS, it may be advantageous to use a conventionally discussed DRS transmitting method and configuring method without changes, and when geographical information is used, the transmission method of DRS with periodicity may be useful in a specific region (i.e., Europe). However, use of a SCS for DRS transmission may not be used as a single solution without geographical limitations, may have low reliability of a measurement result value, and may be disadvantageous in terms of coexistence with an Wi-Fi system.

Figure 7:
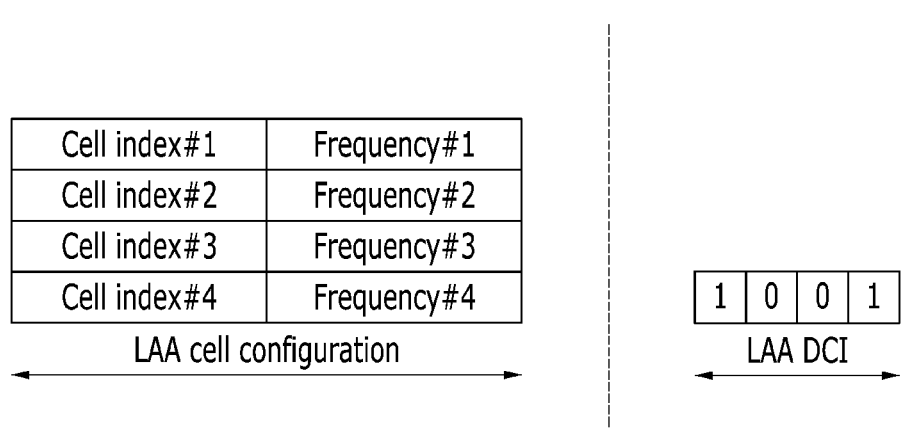
FIG. 7 is a diagram illustrating information transmitted via explicit signaling for DRS transmission according to an exemplary embodiment of the present invention.
Figure 8:
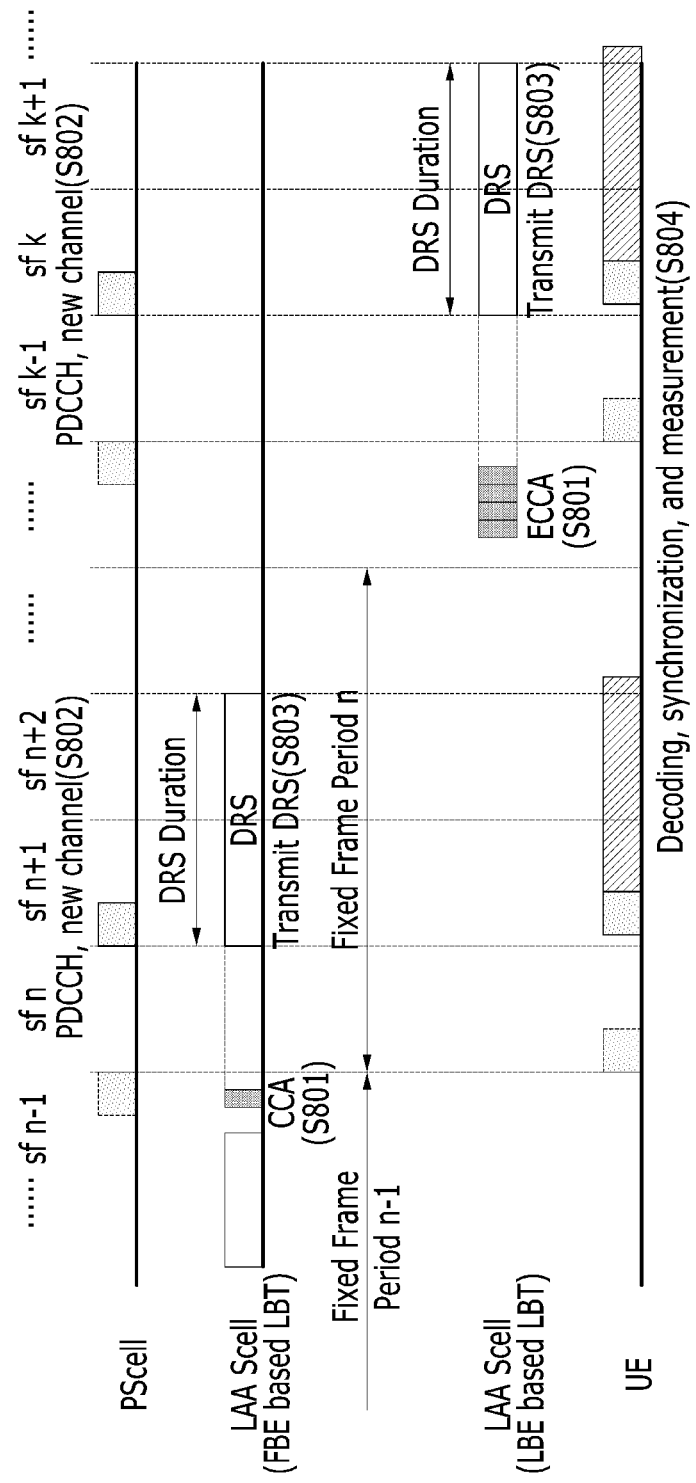
FIG. 8 is a schematic view illustrating a transmission method of DRS without periodicity according to an exemplary embodiment of the present invention.

FIG. 7 is a diagram illustrating information transmitted via explicit signaling for DRS transmission according to an exemplary embodiment of the present invention, and FIG. 8 is a schematic view illustrating a transmission method of DRS without periodicity according to an exemplary embodiment of the present invention.

In the transmission method of DRS without periodicity, when an LAA cell has an access right to a shared channel of an unlicensed band, the LAA cell may opportunistically transmit a discovery signal for cell search. Accordingly, the LAA UE may aperiodically detect the discovery signal and may report the discovery signal to the LAA eNB. When transmission of DRS without periodicity is performed, the LAA UE may use an explicit signaling scheme (alt.1) or an implicit scheme (alt.2) in order to recognize a DRS.

First, alt.1 for indicating a time point for transmitting the DRS via explicit notification will be described. In alt.1, the LAA eNB may notify the LAA UE of a time point for transmitting a DRS through an LAA cell using a signaling procedure via a cell of a licensed band with high reliability. In addition, the LAA UE may detect the LAA cell and perform measurement based on signaling received through the cell of a licensed band.

The time point for transmitting a DRS may be indicated using an operating procedure of various layers such as RRC, MAC, and PHY through a signaling procedure between the LAA eNB and the LAA UE. When a procedure of a MAC layer or a RRC layer is used, time of several tens of millisecond to several seconds may be taken to transmit/receive and process signaling. On the other hand, when a signaling procedure of a physical layer is used, signaling may be performed in a unit of a sub-frame (1 msec). Accordingly, in consideration of channel occupancy time of an unlicensed band according to LBT and processing time of signaling, the time point for transmitting a DRS may be appropriately indicated when a procedure of a physical layer is used. The method for indicating the time point for transmitting a DRS via physical layer signaling may include a method (alt. 1-1) using new downlink control information (DCI) and a method (alt. 1-2) using a new physical channel or extending an existing physical channel.

In the method (alt. 1-1) for indicating the time point for transmitting a DRS using new DCI, when an LAA cell transmits the DRS, an LAA eNB may carry information indicating that DRS is to be transmitted at a time point in which an LAA cell is configured in DCI of a physical downlink control channel (PDCCH) (or an enhanced PDCCH (EPDCCH)) transmitted for scheduling of a licensed band and transmit the information to an LAA UE. In this case, at the time point in which the DRS is transmitted through the frequency of the LAA cell, sub frames n, n+1 or n+2 (transfer sub frame of (E)PDCCH=n) may be used based on the subframe in which the information indicating the transmission of the DRS is forwarded and may be pre-defined according to processing performance of an LAA eNB and an LAA UE.

This method may be divided into an operation for setting LAA cell search through an RRC protocol and an operation for indicating a time point for transmitting a DRS for each sub frame through an (E)PDCCH.

In the operation for setting LAA cell search through an RRC protocol, information of a frequency in which a recognizer of an LAA cell and the LAA cell operate, and CSI-RS configuration information for measurement may be transmitted to the LAA UE. The operation for setting LAA cell search through an RRC protocol may be performed through a system information transmitting procedure or an RRC measurement configuration procedure. In the operation for indicating the time point for transmitting the DRS, signaling indicating whether the DRS is transmitted may be transmitted to the LAA UE through a sub frame of the LAA cell. For this operation, new LAA DCI having a common search space with a similar form to a conventionally proposed DCI format 1C may be used, and a new radio network temporary identifier (RNTI) for DCI may be used. The LAA DCI introduced to indicate the time point for transmitting DRS may include bitmap type of information indicating whether DRS is transmitted for each LAA cell proposed in an RRC protocol procedure. For example, in the LAA cell search configuration operation, the LAA eNB may transmit four pieces of LAA cell configuration information to configure a LAA cell through an RRC procedure as illustrated in a left portion of FIG. 7 and then transmit DCI information to the LAA UE as illustrated in a right portion of FIG. 7. In this case, since a bitmap of the new DCI information is "1, 0, 0, 1", the LAA UE may receive a DRS for an LAA cell corresponding to Cell index #1 and Cell index #4 and perform search and measurement on the corresponding LAA cell.

Referring to FIG. 8, first, the LAA cell may perform CCA (or enhanced CCA (ECCA)) on frequency band over the LAA-Scell and report the CCA (ECCA) result to the LAA eNB (S801). In this case, the CCA may be performed on an LAA eNB using frame based equipment (FBE) algorithm-based LBT and the ECCA may be performed on an LAA eNB using load based equipment (LBE) algorithm-based LBT.

Then, the LAA eNB may generate DCI (or new physical channel) indicating DRS transmission (S802) and transmit the (e)PDCCH including the DCI (or new physical channel) and the DRS (S803). In addition, the LAA UE that receives the (e)PDCCH from the LAA eNB may decode the (e)PDCCH to receive the DRS (S804).

Alternatively, when the time point for transmitting a DRS is indicated via physical layer signaling, the new physical channel may be used or a function of an existing physical channel may be modified to support it (alt. 1-2). However, it is not preferable to design a new physical channel in order to indicate a time point for transmitting a DRS of an LAA cell in term of standard modification and a function of a physical channel. In addition, in a method for indicating a time point for transmitting a DRS through modification of an existing physical channel, a physical control format indicator channel (PCFICH) or physical HARQ indicator channel (PHICH) may be considered. The PCFICH is used to indicate the number of orthogonal frequency division multiplexing (OFDM) symbols used for transmission of a PDCCH in a sub frame, and thus control format indicator (CFI) information and information about the time point for transmitting a DRS have no relationship. In addition, the PHICH is used to transmit ACK/NACK information with respect to transmission of a physical uplink shared channel (PUSCH) and is transmitted only in the case in which a PUSCH is transmitted, and thus these information items have not relationship with the information about the time point for transmitting a DRS. Accordingly, it is not preferable to extend an existing physical channel and to transmit the information about the time point for transmitting a DRS that is aperiodically transmitted.

Figure 9:
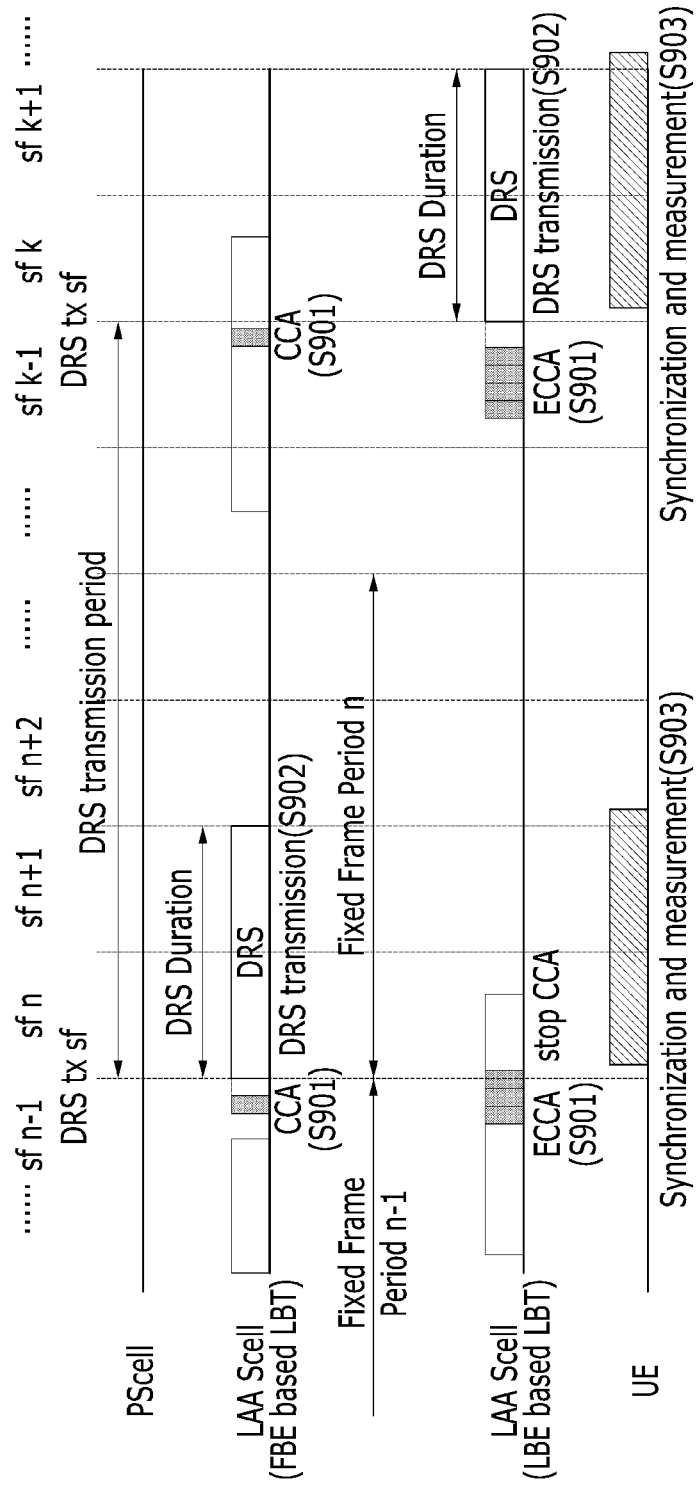
FIG. 9 is a schematic view illustrating a transmission method of DRS without periodicity according to another exemplary embodiment of the present invention.

FIG. 9 is a schematic view illustrating a transmission method of DRS without periodicity according to another exemplary embodiment of the present invention.

In order to receive a DRS that is aperiodically transmitted, an LAA UE may continuously monitor a LAA cell. In this case, the LAA UE may search for the LAA cell at a predetermined period irrespective of whether the LAA cell transmits a DRS. To this end, the LAA eNB may configure information related to DRS transmission (DRS measurement timing configuration (DMTC)) to the LAA UE and the LAA UE may search for the LAA cell based on the DMTC information. In addition, the LAA eNB may obtain an access right to a shared channel of an unlicensed band according to the result of the (E)CCA and transmit the DRS at a predetermined period. In this case, when the LAA eNB uses FBE-based LBT, the LAA eNB may perform CCA in a fixed frame prior to DRS transmission and determine whether the DRS is transmitted at a DRS transmission period based on the CCA result. When the LAA eNB uses LBE-based LBT, the LAA eNB may perform ECCA at an arbitrary time point prior to a DRS transmission period, obtain an access right the access right to a shared channel of an unlicensed band, and transmit the DRS. In addition, when a predetermined transmission time point is passed during ECCA, the LAA eNB may stop the ECCA and stop transmitting a DRS at a corresponding transmission time point.

In order to aperiodically receive a DRS using Alt.2, the LAA eNB may transmit DMTC information including the following information to the LAA UE, transmit the DRS based on the DMTC information, and search for and measures the LAA cell. The DMTC information may include at least one of DRS transmission periodicity, sub-frame offset, duration of DRS occasion, and a parameter for measurement (CRS based and CSI-RS based).

Referring to FIG. 9, first, the LAA eNB may perform CCA on the LAA-SCell using DMTC information (S901). Then, the LAA eNB may not transmit a DRS in downlink if a channel is busy or may transmit the DRS in downlink if the channel is not busy according to the CCA result (S902). The LAA UE may always monitor the LAA-SCell based on the DRS transmission duration (not shown). In this case, upon receiving a DRS, the LAA UE may perform synchronization and measurement (S903).

When a DRS is aperiodically received via continuous LAA cell monitoring, an issue in terms of transmission of DRS without periodicity) (Issue 1) and an issue in terms of measurement on other operator DRS (Issue 2) may occur in measurement in terms of a UE. The transmission of DRS without periodicity proposed in Issue 1 may occur according to LBT, and the LAA UE may overcome Issue 1 via No measurement or reconfiguration of measurement point.

In the case of No measurement, a DRS is not transmitted from the LAA cell, and thus the LAA UE does not perform measurement. On the other hand, in the case of reconfiguration of measurement point, a DRS may not be transmitted according to the LBT result at a time point for transmitting DRS at a transmission period, and thus a variable window may be configured based on the measurement period, and the DRS may be transmitted/received in a configured window period.

As a method for No measurement, an explicit signaling scheme may be used or an implicit scheme may be used. In No measurement using explicit signaling, whether a DRS is transmitted may be indicated through physical layer signaling (LAA DCI or physical channel) using a cell of a licensed band. That is, the LAA UE may perform measurement only when a DRS is transmitted from the LAA cell. No measurement using the implicit scheme may be performed as follows in terms of the LAA eNB and the LAA UE.

In terms of the LAA eNB, when a channel is not busy as the result of (E)CCA result, the LAA eNB may transmit a DRS for the LAA cell. In addition, in terms of the LAA UE, the LAA UE may monitor an LAA-SCell based on the DMTC, and when the received DRS is effective, the LAA UE may perform a measurement procedure.

The reconfiguration of measurement time point may be a method in which a duration range for DRS transmission may be set based on a measurement period configured by the DMTC and a DRS is transmitted/received in at least one of different time positions within the configured DMTC the duration range and may be performed without an explicit signaling scheme. A method for transmitting/receiving a DRS through the reconfiguration of measurement point may be performed as follows in terms of the LAA eNB and the LAA UE.

In terms of the LAA eNB, the LAA eNB may configure a DRS searching window using the DMTC, and when a channel is busy as the CCA result and a current time point (i.e., the time point at which the channel is busy after the CCA) is positioned in the search window, the LAA eNB may select a new transmission time point in the search window.

However, when the current time point is not positioned in the search window, the LAA eNB may not transmit a DRS for the LAA cell.

In terms of the LAA UE, the LAA UE may monitor the DRS based on the DMTC. When the received signal (DRS) is an effective signal, the LAA UE may begin a measurement procedure. However, when the received signal (DRS) is not received at the time point configured by the DMTC, the LAA UE may determine whether the current time point is positioned in the search window, and when the current time point is positioned in the search window, the LAA UE may determine a next reception time point based on the DMTC.

Figure 10:
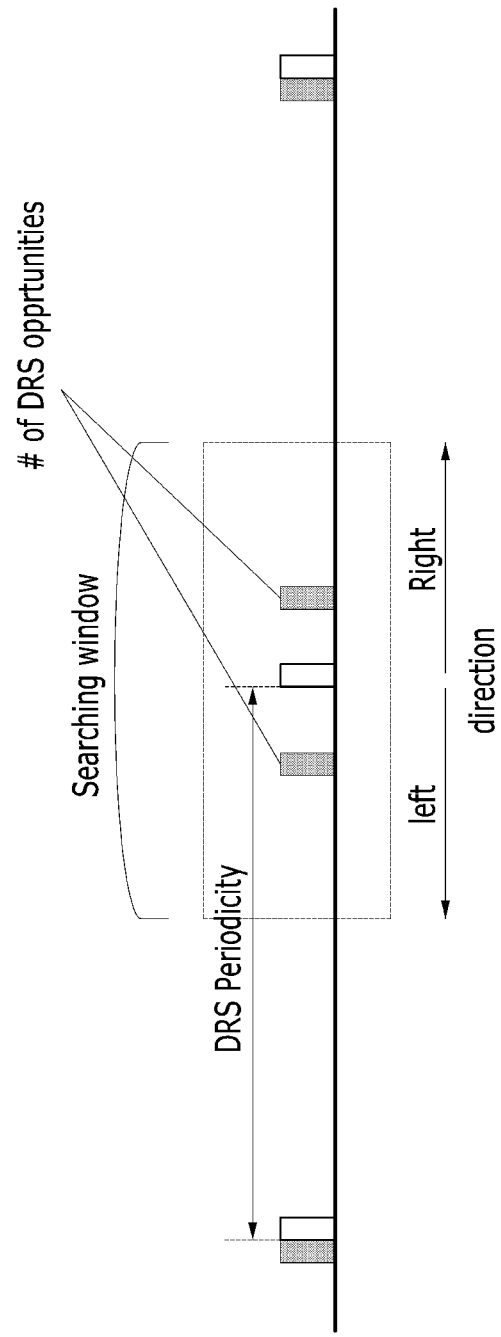
FIG. 10 is a diagram illustrating a DMTC parameter for reconfiguration of measurement point according to an exemplary embodiment of the present invention.

FIG. 10 is a diagram illustrating a DMTC parameter for reconfiguration of measurement point according to an exemplary embodiment of the present invention.

For the reconfiguration of measurement point, the DMTC may include at least one of a search window size, a direction, and the number of DRS opportunities within a search window. The search window size may refer to a size of an operating window for DRS transmission/reception and the direction may refer to a direction of a start point (DMTC periodicity—offset) of a search window based on a DMTC periodicity. For example, when a direction is a minus value, this may indicate that the search window for a measurement point of a DRS is located in the left based on the DMTC periodicity, and when the direction is a plus value, this may indicate that the search window for the measurement point of the DRS is located in the right based on the DMTC period. When the direction is either zero or not configured, this may indicate that the measurement point of the DRS is same as the DMTC periodicity (i.e., start at no offset based on the DMTC periodicity). The UE may use the method that searches the DRS at the time point calculated from dividing the search window by the transmission number of the DRS, and may use the method that continuously searches the DRS at all the period in the search window as the DRS search method in the search window.

The issue in terms of measurement on other operator DRS (Issue 2) may occur when different operators simultaneously transmit a DRS through the same DMTC in the same geographical service area. In this case, signaling overhead according to an unnecessary measurement report procedure may be enhanced. Accordingly, in terms of the LAA eNB, it is necessary to check whether the DRS measurement report transmitted from the LAA UE corresponds to the LAA cell indicated according to measurement configuration.

To this end, the LAA eNB may receive the measurement report for the LAA cell from the LAA UE and then compare a physical cell identifier (PCI) of the measured and reported LAA cell with PCI set by the LAA eNB to recognize that collision with DMTC configuration with another provider occurs. In addition, when collision occurs, the LAA eNB may overcome collision via modification of the configured DMTC. Accordingly, the measurement report procedure for the LAA may include PCI of the retrieved LAA cell. The aforementioned aperiodic DRS transmitting/receiving procedure may be associatively operated with an FBE or LBE-based LBT procedure.

Figure 11:
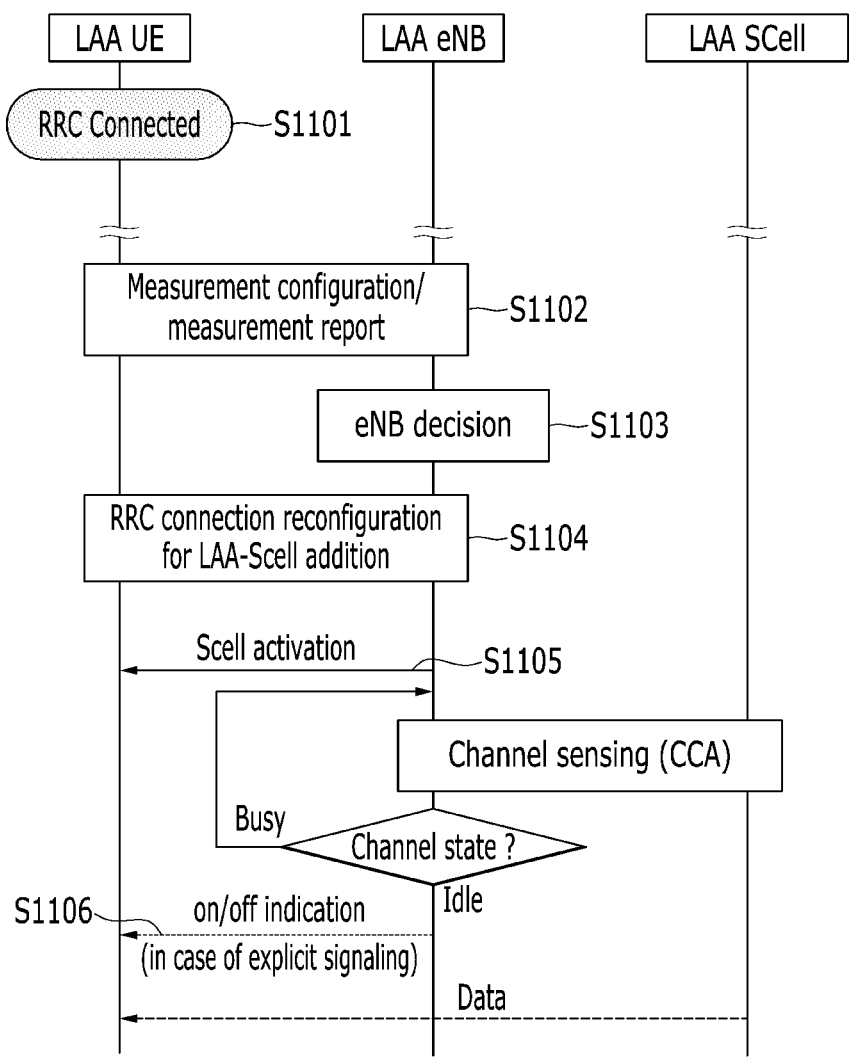
FIG. 11 is a flowchart illustrating a procedure of an operating of an LAA cell according to an exemplary embodiment of the present invention.

FIG. 11 is a flowchart illustrating a procedure of an operating of an LAA cell according to an exemplary embodiment of the present invention.

When a service is provided using an LAA cell according to control of an LAA eNB after the LAA cell is retrieved, a procedure such as cell configuration and activation is required. Hereinafter, a procedure for providing a service using the LAA cell will be described in detail.

The LAA cell may be configured with respect to LAA UEs in an RRC connected state (S1101). In addition, the LAA cell configuration procedure may be performed according to measurement report (S1102) from the LAA UE or determination (S1103) of the LAA eNB. In consideration of the CA operating procedure, the LAA cell may be configured/controlled through operations of an RRC layer and a MAC layer. The RRC layer may perform LAA cell configuration control such as addition, modification, and release of an LAA cell (S1104). The MAC layer may perform activation and deactivation procedures of a configured LAA cell (S1105). In addition, the physical layer may perform on/off control of an LAA cell based on a physical layer procedure (scheduling or signaling) in units of subframes or a plurality of subframes (S1106).

The LAA cell may perform discontinuous transmission without continuously operating according to whether user traffic is present and whether an access right to a channel of an unlicensed band channel is present, transmission control through on/off of an LAA cell is required. The on/off of the LAA cell may be performed through the following procedure.

Handover-based on/off: Operating procedure of 3 layers
DC (Dual Connectivity)-based on/off: Operating procedure of 3 layers
CA (Carrier Aggregation)-based on/off: Operating procedure of 2 layers
L1 (Layer 1)-based on/off: Operating procedure of 1 layer However, maximum channel occupancy time and an LBT operation that are proposed by the regulation require an on/off operation of units of mili seconds or several tens of mili seconds, and thus it is not appropriate to control on/off of an LAA cell using an existing operating procedure of 3 layers or 2 layers. Accordingly, for opportunistic transmission through on/off of the LAA cell, an LAA cell needs to be controlled in units of subframes or a plurality of subframes (i.e., 10 msec or less), and thus the LAA cell may be on/off through a physical layer according to an exemplary embodiment of the present invention.

The LAA cell may reserve a channel of an unlicensed band based on LBT and perform transmission using the channel of the unlicensed band, and thus according to an exemplary embodiment of the present invention, on/off information of the LAA cell may be transmitted to the LAA UE using an implicit scheme (alt.1) or an explicit scheme (alt.2).

First, a method for transmitting on/off information of the LAA cell to the LAA UE using an implicit method will be described. The on/off control method using an implicit scheme is a method for controlling on/off of the LAA cell through scheduling without an additional physical layer signaling and will be described in detail with reference to FIGS. 12 and 13.

Figure 12:
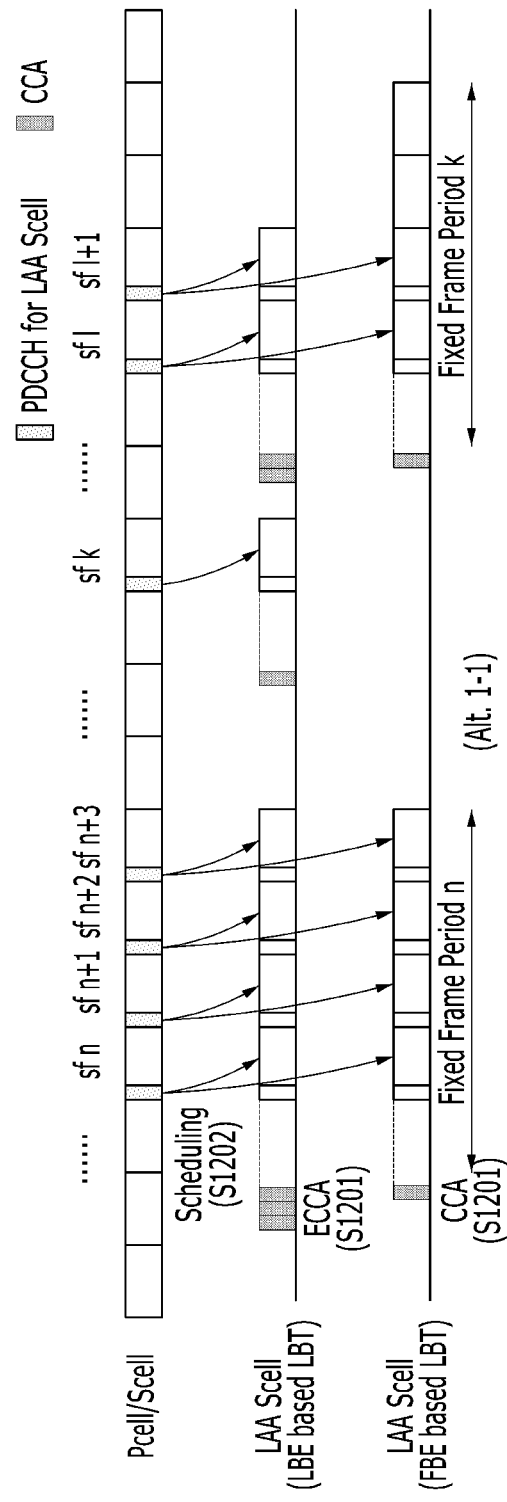
FIG. 12 is a schematic view illustrating an on/off control method of an LAA cell using an implicit scheme according to an exemplary embodiment of the present invention.

FIG. 12 is a schematic view illustrating an on/off control method of an LAA cell using an implicit scheme according to an exemplary embodiment of the present invention.

The on/off control method of an LAA cell illustrated in FIG. 12 may also be referred to as cross-carrier scheduling with licensed cell (alt.1-1). In this method, the LAA cell operates in the assisted form with respect to a cell of a licensed band, and thus a cell of an unlicensed band may be scheduled through cross-carrier scheduling, and on/off of an LAA cell may be indicated to the LAA UE. In this case, the LAA UE may continuously monitor an (E)PDCCH of a PCell (S1201), and when scheduling of the LAA cell is contained in the (E)PDCCH (S1202), data may be transmitted/received through a physical downlink shared channel (PDSCH)/physical uplink shared channel (PUSCH) of the LAA cell.

Figure 13:
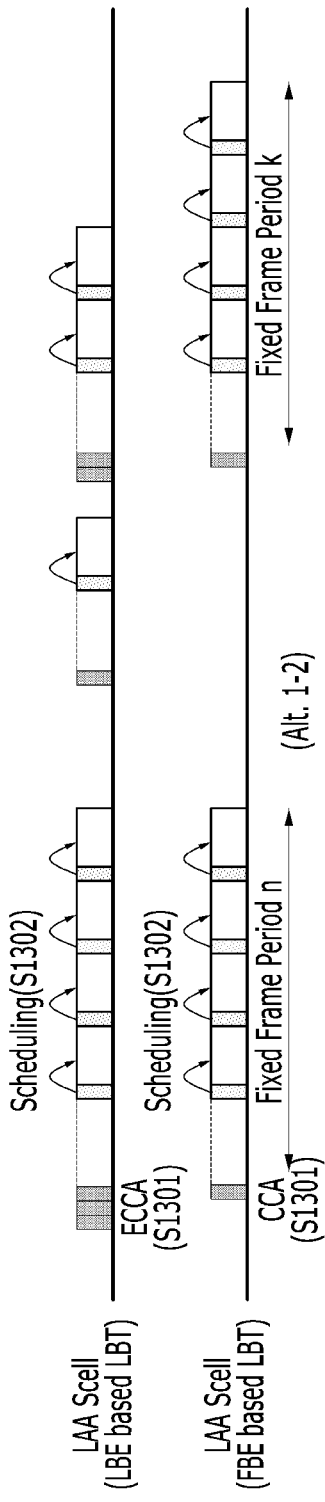
FIG. 13 is a schematic view illustrating an on/off control method of an LAA cell using an implicit scheme according to another exemplary embodiment of the present invention.

FIG. 13 is a schematic view illustrating an on/off control method of an LAA cell using an implicit scheme according to another exemplary embodiment of the present invention.

The on/off method of the LAA cell illustrated in FIG. 13 may be referred to as the same carrier scheduling (alt.1-2). In the method, an LAA UE may continuously receive scheduling information of an LAA cell and recognize on/off of the corresponding cell. In this case, the LAA UE may continuously monitor an (E)PDCCH of the LAA cell (S1301), and when scheduling of the LAA cell is contained in the (E)PDCCH (S1302), data may be transmitted/received through PDSCH/PUSCH of the LAA cell.

When cell on/off of the LAA cell is performed through the aforementioned method, alt.1-1 is advantageous in terms of battery consumption of the LAA UE compared with alt.1-2, but scheduling is performed using a portion of (E)PDCCH of a licensed band cell, congestion in the (E)PDCCH may occur. In alt.1-2, scheduling is performed through an (E)PDCCH of an LAA cell, and thus an (E)PDCCH resource of a licensed band is not affected, but the LAA UE may consume a higher battery amount than in alt.1-1 in order to monitor the (E)PDCCH of the LAA cell, which is discontinuously transmitted.

Figure 14:
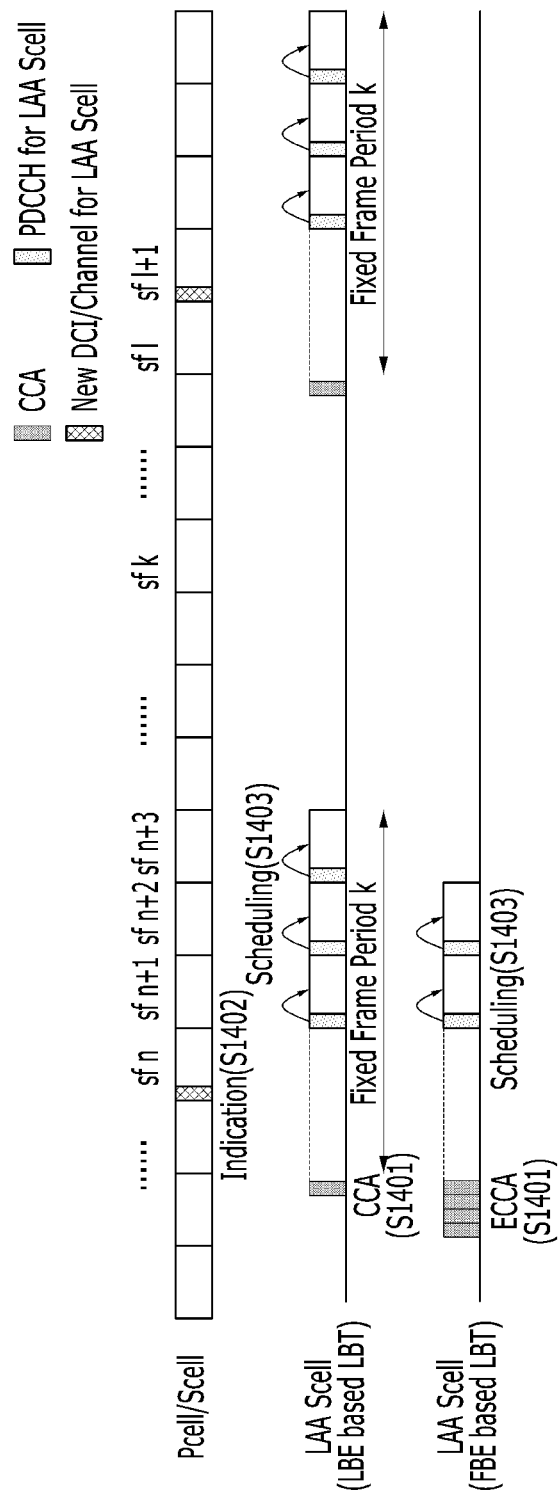
FIG. 14 is a schematic view illustrating an on/off control method of an LAA cell using an explicit scheme according to an exemplary embodiment of the present invention.

FIG. 14 is a schematic view illustrating an on/off control method of an LAA cell using an explicit scheme according to an exemplary embodiment of the present invention.

The on/off control method of the LAA cell using the explicit scheme is a method for controlling on/off of the LAA cell through additional physical layer signaling and has similar characteristics of the aforementioned transmission method of DRS without periodicity. According to this method, new DCI or a new physical channel for on/off control of an LAA cell may be transmitted using a cell of a licensed band with high reliability, and the LAA UE that receives the new DCI or the new physical channel may decode the physical channel transmitted from the LAA cell and receive data. That is, the LAA cell may perform (E)CCA on a shared channel of an unlicensed band to acquire an access right (S1401) and transmit control information indicating On of the LAA cell to the LAA UE through a cell of a licensed band (S1402). Then, the LAA UE that receives the control information indicating On of the LAA cell may decode a PDCCH of the LAA cell and receive data (S1403). The implicit scheme may be disadvantageous in that congestion of a resource of a licensed band is high due to cross-carrier scheduling and battery consumption of an LAA UE may be high to continuously monitor an (E)PDCCH of an LAA cell. However, the implicit scheme may be advantageous in that influence of standard and complexity of a physical layer procedure is reduced since new signaling of a physical layer is not introduced. On the other hand, although the explicit scheme may be disadvantageous in that complexity due to introduction a new signaling procedure of a physical layer is increased and (E)PDCCH processing is delayed, the explicit scheme may be advantageous in that battery consumption of the LAA UE is reduced.

Figure 15:
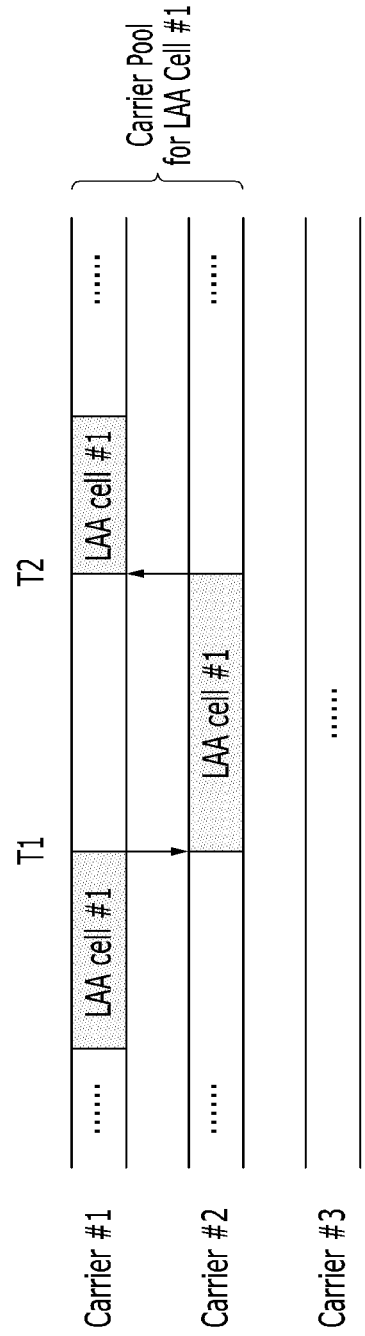
FIG. 15 is a schematic view illustrating a dynamic carrier configuration method according to an exemplary embodiment of the present invention.

FIG. 15 is a schematic view illustrating a dynamic carrier configuration method according to an exemplary embodiment of the present invention.

Since an unlicensed band includes a plurality of available carriers, a plurality of carriers of an unlicensed band may be dynamically selected and may be effectively dispersed and used for effective communication. When the number of unlicensed band equipments that operate in a specific carrier is high or the amount of interference from the unlicensed band equipment is high, utilization efficiency of an LAA cell that operates in an unlicensed band carrier may be lowered. Accordingly, the LAA cell may dynamically select a plurality of carriers in an unlicensed band according to a communication state and may perform communication via movement between carriers, thereby enhancing utilization efficiency of unlicensed frequency in terms of the LAA cell.

According to an exemplary embodiment of the present invention, a carrier pool including a plurality of carriers in an unlicensed band is introduced. The LAA cell may select one carrier appropriate for a communication environment from the carrier pool, communicate with the LAA UE using the selected carrier, and then perform communication while dynamically modifying a carrier according to a state of the carrier.

FIG. 15 illustrates an example of a dynamic carrier configuration method. Referring to FIG. 15, LAA cell #1 may execute a service while dynamically modifying a channel using a carrier pool including carrier #1 and carrier #2. That is, an LAA cell may execute a service using carrier #1 up to time T1 and execute a service using carrier #2 through a dynamic carrier configuration procedure between T1 and T2. After time T2, LAA cell #1 may re-execute a service using carrier #1 through a dynamic carrier configuration procedure.

A dynamic carrier modification method of an LAA cell according to an exemplary embodiment of the present invention will be described below.

First, when an RRC connection setup procedure is performed using a cell of a licensed band, the LAA eNB check capability of the LAA UE (i.e., RF capability, . . . ). Then, when an LAA cell is set as a secondary cell through carrier aggregation, the LAA eNB may exchange a message including information of a plurality of operating frequencies at which the LAA cell operates with an LAA UE (using an RRC procedure).

Then, the LAA eNB may indicate measurement configuration containing information of the above configured frequency at which an LAA cell is capable of being operated, to the LAA UE that sets the LAA cell as a secondary cell.

Then, the LAA UE may perform measurement and report the measurement result to the LAA eNB. The LAA eNB may activate the LAA cell as a secondary cell through carrier aggregation based on the received measurement report and determine an actual operating frequency at which communication is performed, among a plurality of operating frequencies (using a MAC procedure). The measurement report received by the LAA eNB may include measurement information of physical layer or measurement information of an RRC layer.

In this case, when an operating frequency is changed during communication, the LAA eNB and the LAA UE may not perform transmission/reception for predetermined time for configuration time for a new frequency. In addition, indicating measurement configuration to the LAA UE by the LAA eNB, performing measurement by the LAA UE and reporting the measurement result to the LAA eNB, and performing carrier aggregation by the LAA eNB and determining an actual operating frequency may be continuously performed between the LAA eNB and the LAA UE.

Figure 16:
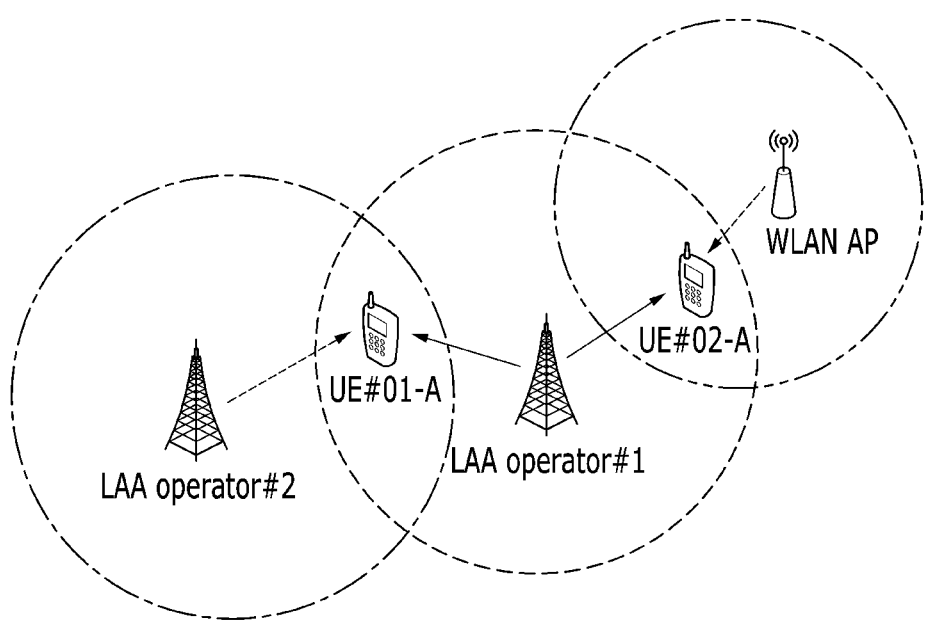
FIG. 16 is a schematic view illustrating an issue in terms of a hidden node in an LTE LAA.

FIG. 16 is a schematic view illustrating an issue in terms of a hidden node in an LTE LAA.

In an IEEE 802.11 wireless local area network (WLAN) system, a wireless node may detect a channel situation through frequency detection for communication. In addition, the wireless node may use a channel only when a channel is empty. When a channel is used, the wireless node may perform frequency detection after waiting for random backoff time. In this case, a node that is not discovered even if a channel is searched for through channel sensing may be referred to as a hidden node, and the hidden node may cause interference during wireless communication between two nodes.

Similarly to a WLAN, an issue in terms of a hidden node may also occur in an LTE LAA of an unlicensed band and may occur between cells managed by different LTE LAA providers or the LAA cell and Wi-Fi cell.

Referring to FIG. 16, UE #01-A and UE #02-A join an LAA service provided by LAA provider #1 and each UE may undergo an issue in terms of a hidden node according to signal transmission from LAA provider #2 or WLAN devices.

The issue in terms of a hidden node may occur between cells in the same provider, between cells of different providers, or between an LAA cell and a Wi-Fi cell and a solution thereof may be considered in terms of coordination. That is, cells in the same provider may be configured to prevent the issue in terms of a hidden node by exchange information of a frequency and channel used through an interface between base stations, such as an X2 interface. On the other hand, coordination is impossible for the issue in terms of a hidden node between cells of different providers or between an LAA cell and a Wi-Fi cell, and thus there is a need to introduce a new mechanism to overcome the issue. In order to overcome the issue in terms of a hidden node between cells of different providers or between an LAA cell and a Wi-Fi cell, a request to send (RTS)/clear to send (CTS)-based method and an LTE measurement-based method may be considered.

Figure 17:
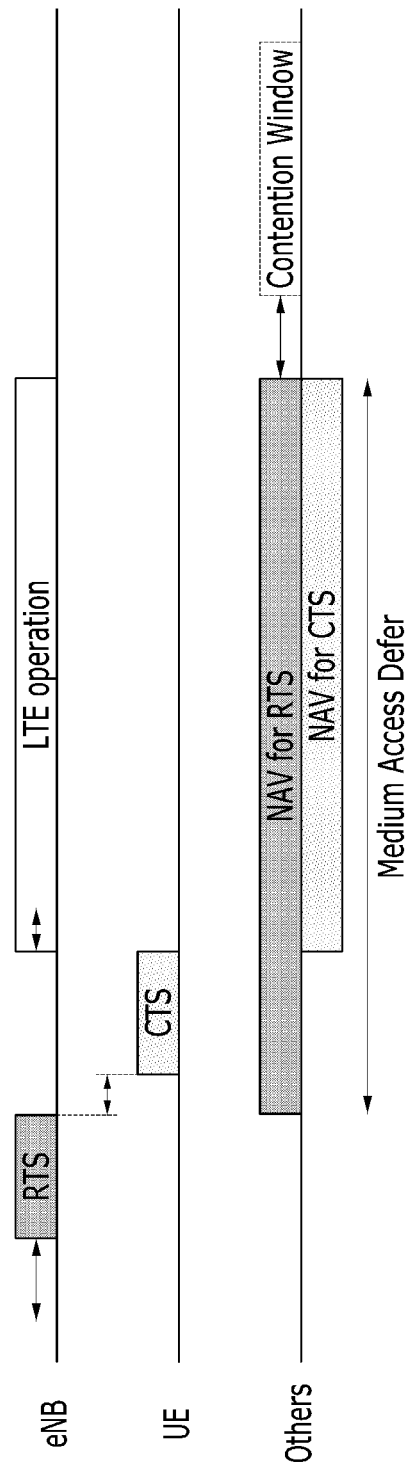
FIG. 17 is a schematic view illustrating an RTS/CTS-based method for overcoming an issue in terms of a hidden node according to an exemplary embodiment of the present invention.

FIG. 17 is a schematic view illustrating an RTS/CTS-based method for overcoming an issue in terms of a hidden node according to an exemplary embodiment of the present invention.

The RTS/CTS-based method for overcoming the issue in terms of a hidden node may be performed in an environment in which a Wi-Fi function between an LAA eNB and an LAA UE is capable of being executed and the LAA eNB and the LAA UE are capable of transmitting/receiving an RTS/CTS frame using a Wi-Fi module during execution of an LAA service.

In the RTS/CTS-based operation, when an LAA cell accesses a shared channel of an unlicensed band, the LAA cell may acquire an access right to a channel through (E)CCA and then reserve a channel through exchange of RTS/CTS as a control frame of Wi-Fi so as to overcome the issue in terms of a hidden node. The RTS/CTS-based method may be applied to FBE-based LBT or LBE-based LBT and may include an RTS/CTS-based mechanism, a CTS-based mechanism, and an RTS/CTS listening & channel sensing mechanism.

The RTS/CTS-based mechanism may be performed through the following procedure. First, an LAA eNB that has an access right to a channel through (E)CCA may transmit an RTS frame to a UE of an LAA cell. In addition, the LAA UE that receives the RTS frame from the LAA eNB may transmit a CTS frame. Accordingly, issues in terms of channel reservation and hidden node may be overcome. Then, scheduling may be performed through an (E)PDCCH and a PDSCH may be transmitted.

An eNB of an LTE system may perform scheduling on a plurality of UEs in a subframe of duration of 1 msec, which is different from a 1:1 type of Wi-Fi communication method. That is, an existing RTS/CTS method in Wi-Fi may basically assume a 1:1 type operation but may assume a 1:n type operation in LTE. Accordingly, in order to overcome the issue in terms of a hidden node through RTS/CTS transmission in LTE LAA, the following forms may be considered.

First, RTS/CTS transmission (Alt.1) through configuration of a reception address of an RTS frame may be considered. The RTS/CTS transmission through configuration of a reception address of an RTS frame may be a method in which a mapping table for a recognizer of WLAN of an LAA eNB and a recognizer using LTE is maintained and an RTS/CTS procedure is performed only on an LAA UE to be scheduled in an LAA cell and may use the following method for configuring a receiver address (RA).

Alt.1-1: Method using multicast address

Alt.1-1 is a method in which an RA of an RTS frame is transmitted using a predetermined multicast address and a LAA UE that receives the RA of an RTS frame transmits a CTS message. However, it may be used in case of supporting a function related to multicast such as multicast group management and the like in a WLAN standard.

Alt.1-2: Method using a plurality of unicast addresses

Alt.1-2 is a method in which a plurality of RTS/CTS procedures is performed on each LAA UE scheduled in a subframe. This method is disadvantageous in that an RTS/CTS procedure is performed in consideration of time domain scheduling time but complexity of an operation is high and an amount of used radio resources according to transmission/reception of a plurality of RTS/CTSs is high.

Alt.1-3: Method using unicast address of representative UE.

Alt.1-3 is a method for selecting a representative LAA UE among all LAA UEs scheduled in a subframe and performing an RTS/CTS procedure between the selected LAA UE and an LAA eNB. For this method, a position of the LAA UE needs to be recognized and a representative LAA UE needs to be selected, and when the LAA UE is dispersed, this method has the same characteristic as Alt.1-2.

Alternatively, scheduling (Alt.2) may be considered only for one UE per transmission time interval (TTI). In a method for scheduling only one LAA UE in a specific subframe of an LAA cell, a 1:1 communication structure for transmission and reception in a subframe may be satisfied and an RTS/CTS operation may be performed similarly to Wi-Fi. However, radio resources may be wasted according to an amount of traffic of a scheduled LAA UE.

FIG. 18 is a schematic view illustrating an eNB-based CTS method according to an exemplary embodiment of the present invention. FIG. 19 is a schematic view illustrating a UE-based CTS method according to an exemplary embodiment of the present invention.

According to the CTS-based mechanism, an LAA cell may occupy a shared channel of an unlicensed band using CTS transmission only without using RTS. The CTS-based mechanism may be classified into an eNB-based CTS method and a UE-based CTS method.

Referring to FIG. 18, according to the eNB-based CTS method, an LAA eNB that has an access right to a channel through (E)CCA may transmit a CTS frame (S1801), perform scheduling through an (E)PDCCH, and then transmit a PDSCH (S1802). In this case, the eNB-based CTS method may not cause transmission deferring with respect to a node, which may affect an LAA UE, and thus may not overcome the issue in terms of a hidden node from a point of a view of a UE.

Referring to FIG. 19, according to the UE-based CTS method, an LAA eNB that has an access right to a channel through (E)CCA may transmit a CTS frame transmission request to an LAA UE through a PCell of an licensed band (S1901) and the LAA UE that receives the CTS frame transmission request from the LAA eNB may transmit a CTS frame (S1902). Then, scheduling may be performed through an (E)PDCCH and a PDSCH may be transmitted (S1903). In this case, in the UE-based CTS method, all LAA UEs configured in an LAA eNB need to transmit a CTS frame, and thus an issue may occur in terms of 1:n scheduling. When a CTS frame is transmitted between adjacent LAA UEs without channel sensing for a channel, interference between adjacent LAA UEs may occur, and a transmission time point between transmitted CTS frames is coordinated in order to overcome the interference issue, it is necessary to use an additional radio resource.

Figure 20:
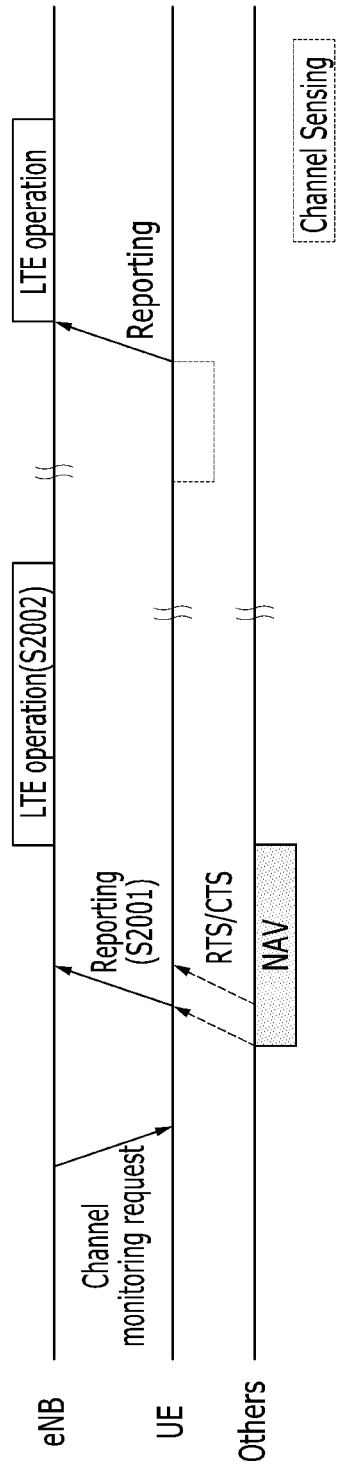
FIG. 20 is a schematic view illustrating an RTS/CTS listening & channel sensing method according to an exemplary embodiment of the present invention.

FIG. 20 is a schematic view illustrating an RTS/CTS listening & channel sensing method according to an exemplary embodiment of the present invention.

Referring to FIG. 20, the RTS/CTS listening & channel sensing mechanism may be begun by activating a Wi-Fi module by an LAA UE in an RRC connected mode, performing channel sensing on a shared channel in an unlicensed band, and receiving an RTS/CTS frame transmitted by unlicensed devices. Then, the LAA UE may transmit a reservation state of a shared channel of an unlicensed band of a Wi-Fi device, which is acquired via channel sensing and RTS/CTS frame reception, to an LAA eNB (S2001). Then, the LAA eNB may use the channel reservation information received from the LAA UE for channel (re)selection and scheduling (S2002). However, in the case of a frame shorter than a specific length (shorter than 2437 bytes), RTS/CTS is selectively used in the WLAN standard, and thus all issues in terms of a hidden node may not be overcome through the RTS/CTS listening & channel sensing mechanism, and in this case, continuous channel sensing of an LAA UE is also necessary. In addition, for the RTS/CTS listening & channel sensing mechanism, a configuration procedure of an RRC level and a reporting procedure of a level of a physical layer are further required.

An LTE measurement-based method for overcoming an issue in terms of a hidden node will be described below.

Figure 21:
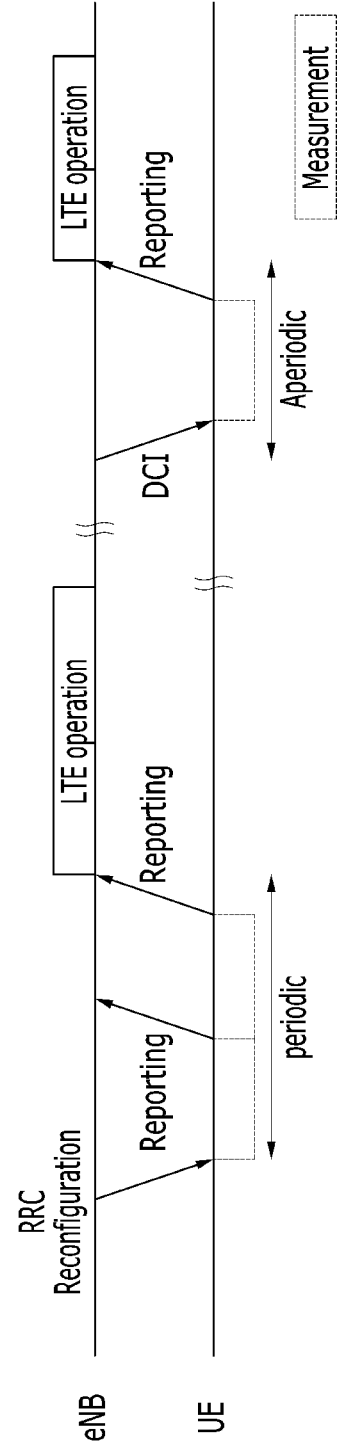
FIG. 21 is a schematic view illustrating an LTE measurement-based method for overcoming an issue in terms of a hidden node according to an exemplary embodiment of the present invention.

FIG. 21 is a schematic view illustrating an LTE measurement-based method for overcoming an issue in terms of a hidden node according to an exemplary embodiment of the present invention.

The LTE measurement-based method may overcome the issue in terms of a hidden node of an LTE LAA using a measurement procedure provided by LTE. That is, a signal to noise ratio (SNR) or a signal to interference plus noise ratio (SINR) may be acquired via LTE measurement and a shared channel of an unlicensed band and whether another provider performs LAA transmission or Wi-Fi is activated may be checked using the acquired SNR or SINR. In this case, it is important to recognize an instantaneous state of a channel, and thus it is more appropriate to instantaneously measure channel stage indication (CSI) than a channel state for a long period of time. In the LTE measurement-based method for overcoming an issue in terms of a hidden node, an LAA eNB may perform configuration for CSI measurement on an LAA UE, and the LAA UE may perform CSI measurement on a state of a a shared channel of an unlicensed band and then report the measurement result to the LAA eNB. The LTE measurement-based method may be performed at the following order.

The LAA eNB may perform measurement configuration on the LAA UE.

Periodic measurement may be configured via RRC configuration (cqi-ReportPeriodic of cqi-ReportConfig in PhysicalConfigDedicated). In addition, aperiodic measurement may be configured via RRC configuration (cqi-ReportModeAperiodic of cqi-ReportConfig in PhysicalConfigDedicated).

Then the LAA UE may perform measurement in the form indicated by the LAA eNB and report a periodic or event-driven type of aperiodic measurement report to the LAA eNB.

In this case, wideband measurement may be considered rather than sub-band measurement. Measurement based on configured periodicity and reporting may be performed in periodic measurement.

In addition, aperiodic measurement may be initiated by DCI format 0/4 and measurement report may be reported on an $(n+k)^{th}$ subframe. In addition, in an $(n-k)^{th}$ subframe in which scheduling via an LAA cell is considered, CSI measurement reporting may be indicated via DCI.

In addition, enhanced legacy L1 feedback may be required as measurement reporting.

Then, the LAA eNB may perform channel selection and scheduling based on the measurement information received from the LAA UE.

FIGS. 22A and 22B are schematic views illustrating a frequency allocating method for an LAA cell according to an exemplary embodiment of the present invention.

With regard to LAA, a radio resource of a licensed band cell and a radio resource of an unlicensed band cell may be aggregated using carrier aggregation (CA) so as to transmit/receive data. In this case, a licensed band cell may function as a primary cell (PCell) that is responsible for control and transmission/reception of data and an unlicensed band cell may be used as a secondary cell (SCell) that is responsible for transmission/reception of data.

An unlicensed band of 5 GHz may be configured for a plurality of carriers or channels and used, and a frequency allocation method of an LAA cell may be classified into a case in which a single carrier is allocated to an LAA cell and a case in which a plurality of carriers are allocated to an LAA cell.

First, when a single carrier is allocated to an LAA cell (Frequency-Alt.1), one frequency bandwidth with a fixed size may be allocated to one LAA cell, and a plurality of LAA cells may be selectively used to provide a service.

When a plurality of carriers are allocated to an LAA cell (Frequency-Alt.2), a plurality of frequency bandwidths with a fixed size may be allocated to one LAA cell, and a plurality of frequency bandwidths may be selectively used to provide a service.

FIG. 22A is a schematic view of an example of Frequency-Alt.1, and F3, F4 and F5 are allocated to LAA cell #1, LAA cell #2 and LAA cell #3, respectively. FIG. 22B is a schematic view of an example of Frequency-Alt.2, and all of F3, F4 and F5 are allocated to LAA cell #1. In Frequency-Alt.1, a plurality of LAA cells are arranged in the same area and a service is provided via movement between cells. In Frequency-Alt.2, one LAA cell is arranged in one area and an LAA cell provides a service using a plurality of carriers. In Frequency-Alt.2, a carrier used in an LAA cell may be modified without modification of an SCell, but in Frequency-Alt.1, an SCell needs to be modified (i.e., SCell release and SCell addition) in order to modify a carrier used in the LAA cell. However, Frequency-Alt.2 has opposite feature to a cell structure considered in a conventional mobile communication system, and particularly, is closely associated with RRC reconfiguration), system information block (SIB), measurement, etc., and thus Frequency-Alt.2 is very largely affected by the legacy standard. In the specification, a dynamic carrier operating method will be described based on a frequency allocation structure of Frequency-Alt.1.

An LAA cell managed in an unlicensed band is operated based on an LBT for pair coexistence with other unlicensed band devices. LBT considered in the LAA may include an (E)CCA-based channel approaching method, a maximum channel occupancy time (COT) method after channel approaching, and so on. A separate (E)CCA time unit for channel access proposed by the current LBT related standard may be a minimum of 20 micro seconds (u s), there are different regulations for respective areas, and maximum channel occupancy time in an unlicensed band in which an LAA operates is 4 ms to 13 ms.

A dynamic carrier configuration method considered in the LAA may include a semi-static carrier selection method and a dynamic carrier selection method. In the semi-static carrier selection, when a carrier is modified during communication, a carrier is reselected in a long time unit (i.e., several hundreds of milli seconds (ms) or more), in the dynamic carrier selection, a carrier is reselected in a short time unit (i.e., a minimum of several milli seconds) during communication.

The semi-static carrier selection may be used in dynamic frequency selection (DFS) for detection of a radar system, carrier using time of which is not changed at a short period. In the dynamic carrier selection, a carrier with low interference and load may be selectively used via instantaneous measurement so as to enhance overall utilization efficiency of a radio resource. In addition, the dynamic carrier selection is similar to the semi-static carrier selection except for temporal requirement and thus the same procedure as that of the semi-static carrier selection may be applied to the dynamic carrier selection.

Figure 23:
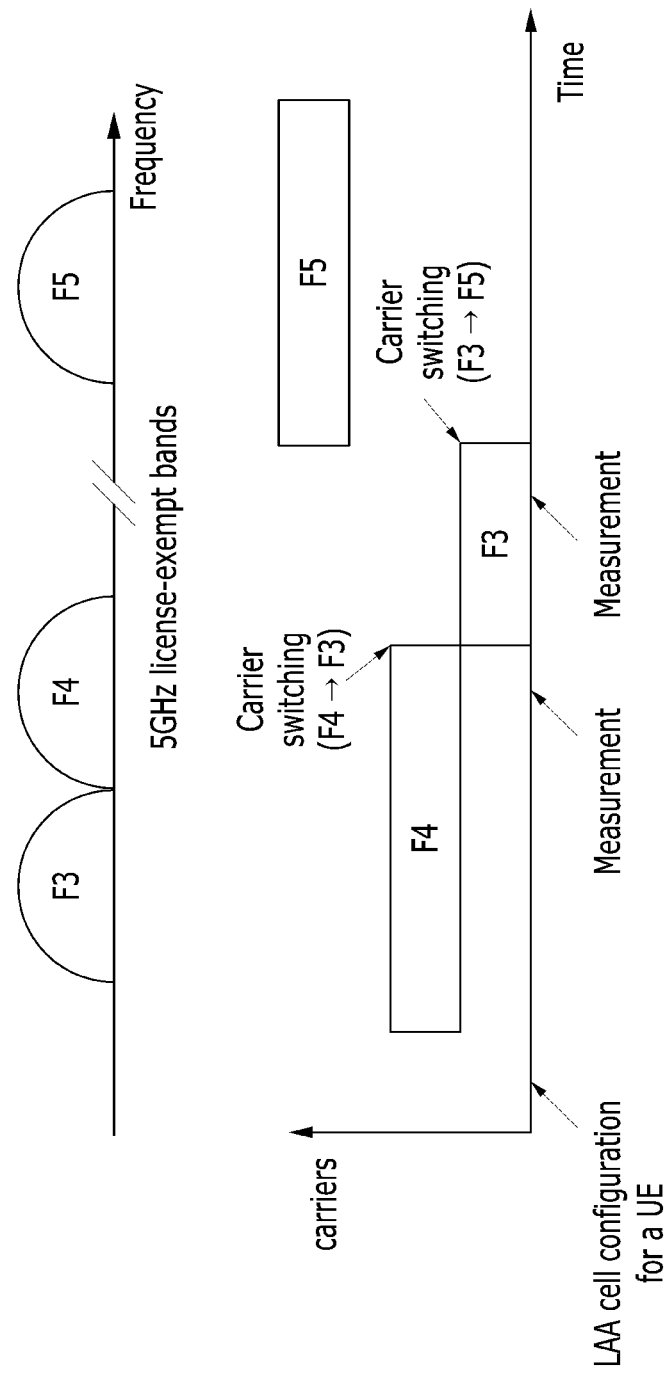
FIG. 23 is a schematic view illustrating a dynamic carrier selection method applied to LAA.

FIG. 23 is a schematic view illustrating a dynamic carrier selection method applied to LAA.

Referring to FIG. 23, available unlicensed band frequencies F3, F4, and F5 are temporally separated and used so as to enhance frequency utilization efficiency, and the number of times of discontinuous transmission considered in the LAA may be minimized.

Carrier selection in LAA may be classified into carrier selection in terms of an LAA UE and carrier selection in terms of an LAA cell. The carrier selection in terms of the LAA UE may refer to enhancement in performance of the LAA UE by providing a service by dynamically using a plurality of LAA cells configured as different carriers according to an interference or congestion degree. On the other hand, the carrier selection in terms of the LAA cell may refer to enhancement in performance of the LAA cell by providing a service by dynamically using a carrier according to an interference or congestion degree when a plurality of configurable unlicensed band carriers are present.

In the legacy LTE CA, in order to activate an SCell and to monitor scheduling information of the activated SCell, SCell activation/deactivation signaling of a MAC layer is used, and a maximum of several tens of mili seconds is taken to transmit a MAC control element (CE). In addition, various unlicensed devices coexist and operate in an unlicensed band of 5 GHz and all the devices need to operate based on LBT, and thus opportunistic transmission is inevitable. However, when activation/deactivation of an LAA cell managed in an unlicensed band is controlled through a procedure proposed in the legacy LTE CA, an issue may occur.

Figure 24:
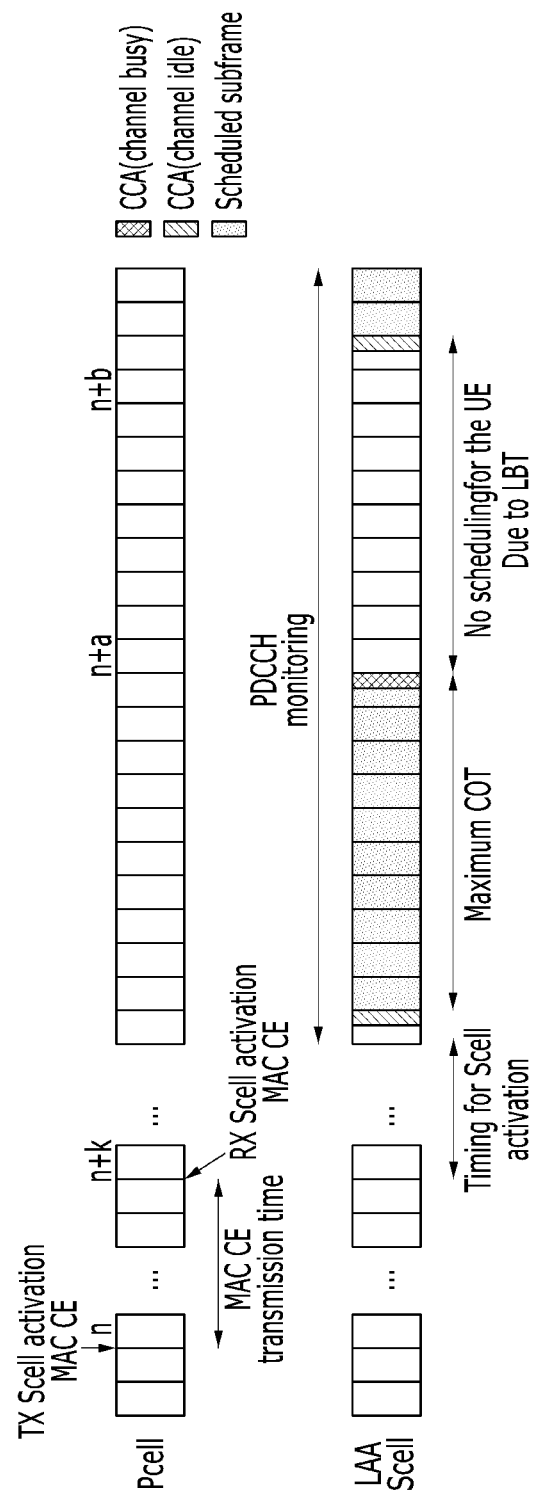
FIG. 24 is a schematic view illustrating an issue that occurs when activation/deactivation of an LAA cell of an unlicensed band is controlled through a procedure of an LTE CA.

FIG. 24 is a schematic view illustrating an issue that occurs when activation/deactivation of an LAA cell of an unlicensed band is controlled through a procedure of an LTE CA.

Referring to FIG. 24, an eNB may transmit 'activation MAC CE' for activation of an LAA SCell in a subframe n, and a UE may receive the MAC CE in a subframe n+k. After receiving the 'activation MAC CE', the UE may continuously monitor (E)PDCCH including scheduling information of an LAA cell from timing for SCell activation. However, the LAA cell does not transmit data in a subframe corresponding to n+a to n+b due to LBT, but the UE continuously monitors corresponding (E)PDCCH, thereby causing unnecessary battery consumption.

Figure 25:
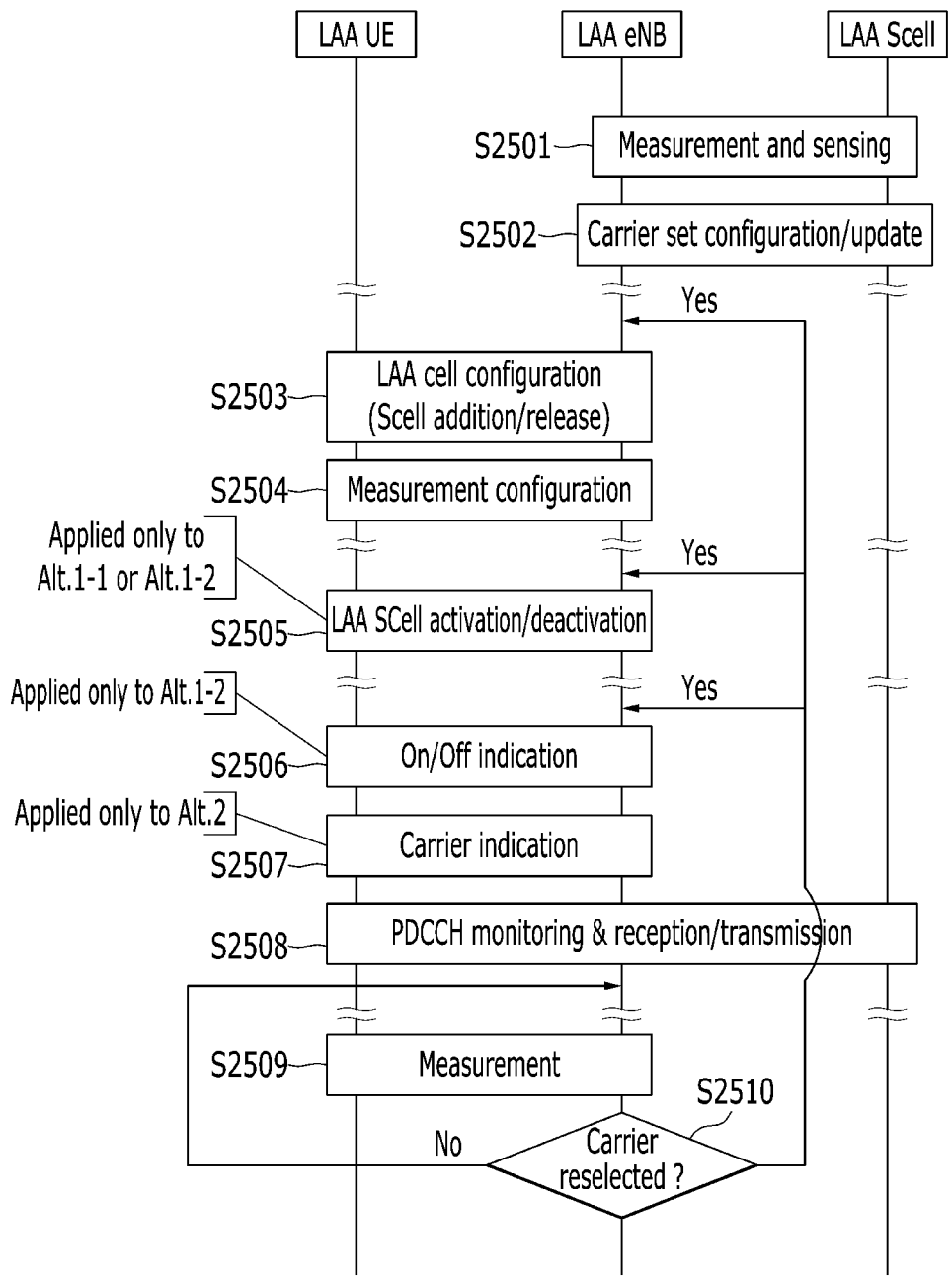
FIG. 25 is a flowchart illustrating a method for dynamically selecting and modifying a carrier for LAA according to an exemplary embodiment of the present invention.

FIG. 25 is a flowchart illustrating a method for dynamically selecting and modifying a carrier for LAA according to an exemplary embodiment of the present invention.

The following forms may be considered as dynamic carrier selection method of LAA cell from a point of a view of a UE.

Alt.1-1: Method using LAA cell configuration and LAA cell activation.

Alt.1-2: Method using LAA cell configuration, LAA cell activation, and LAA cell on/off indication.

Alt.2: Method using LAA cell configuration and carrier indication.

The flowchart of FIG. 25 shows Alt.1-1, Alt.1-2, and Alt.2 configured for the dynamic carrier selection method and some operations (e.g., S2505, S2506, and S2507) may be selectively performed.

S2501: Measurement and Sensing

An interference and load degree of a network may be measured in order to select a carrier to be used by an LAA cell. The measurement and sensing may be continuously performed during periodic or event-driven operation of an LAA cell.

S2502: Carrier Set Configuration/Update

The carrier set configuration/update may be an operation for configuring and updating carriers collected in the measurement and sensing. The carrier set configuration/update may be performed according to the measurement result, and carrier included in a carrier set may be updated in S2501 and S2509.

S2503: LAA SCell Addition/Release

When a carrier of an LAA cell needs to be modified according to the result of S2502 or S0259, an LAA cell that operates in a carrier that needs to be modified may be released and an LAA cell to which a new carrier is allocated may be added. In this case, addition/release of the LAA SCell may be performed using an RRC connection reconfiguration procedure for SCell release and addition.

S2504: Measurement Configuration

The measurement configuration may be an operation for indicating measurement to a UE in order to measure signal intensity/signal quality of a specific cell by an eNB.

S2505: LAA SCell Activation/Deactivation

The LAA SCell activation/deactivation is an operation for activating/deactivating a specific LAA cell for transmission/reception of data among LAA cells configured in S2503. Operation S2505 may be applied only to Alt.1-1 and Alt.1-2.

S2506: On/Off Indication

The on/off indication may be an operation for transmitting an on/off signal indicating whether data is transmitted to a cell activated through SCell activation to an LAA UE by an LAA eNB. The on/off indication may be applied only to Alt.1-2.

S2507: Carrier Indication (which is Applied Only to Alt.2)

The carrier indication may be an operation for transmitting carrier information to be used in an SCell to an LAA UE by an LAA eNB. The carrier indication may be applied only to Alt.1-2.

S2508: (E)PDCCH Monitoring and Transmitting/Receiving of Data

The (E)PDCCH monitoring and transmitting/receiving of data may be an operation for monitoring an (E)PDCCH and transmitting/receiving data.

S2509: Measurement

The measurement may be an operation in which an LAA UE performs measurement according to measurement configuration configured by an LAA eNB and reports periodic or event-driven reference signal received power (RSRP), reference signal received quality (RSRQ), and received signal strength indicator (RSSI).

S2510: Decision on Carrier Reselection

The decision on carrier reselection may be an operation for determining whether carrier reselection is needed is determined through operation S2508 and operation S2501 that is periodically performed. For example, when an interference amount measured in a corresponding carrier is higher than an interference threshold value or a measured load degree is higher than a threshold value, an LAA eNB may perform carrier modification.

Yes-1 refers to reselection of a carrier through on/off indication or carrier indication, and Yes-2 refers to reselection of a carrier through activation/deactivation. In addition, Yes-3 refers to reconfiguration of an LAA cell configured through RRC reconfiguration.

Hereinafter, a method for dynamically configuring a carrier in terms of an LAA UE and a method for dynamically configuring a carrier in terms of an LAA cell will be described below in detail with reference to FIGS. 26 to 32.

First, the method for dynamically configuring a carrier in terms of an LAA UE will be described. The method for dynamically configuring a carrier in terms of an LAA UE may combine LAA cell configuration and LAA cell activation (alt.1-1).

This method is a method for performing LAA cell configuration for configuring an LAA cell as an SCell through a measurement-based RRC procedure and activating an LAA cell or a carrier through a MAC procedure when data transmission/reception is required. An eNB may control activation and deactivation of the LAA cell in consideration of whether data to be transmitted/received is present or an interference and load degree with respect to a carrier. A UE may monitor an (E)PDCCH received from the activated LAA cell and transmit/receive data.

In Alt.1-1, LAA cell configuration such as addition/erase of an LAA cell may be performed based on measurement of the eNB and measurement report received from the UE.

Through measurement of the eNB, whether interference occurs or a load degree may be recognized periodically or event-driven, and a carrier set to be used in an LAA cell may be configured based thereon. The carrier set to be used in the LAA cell may include a plurality of carriers.

For configuration of an LAA cell, the eNB may transmit an RRC connection reconfiguration message including SCell configuration information of an LAA cell, to be added, to the UE, and the UE that receives the RRC connection reconfiguration message may configure an LAA cell proposed by the eNB as an SCell and then transmit an RRC connection reconfiguration complete message to the eNB in response to the RRC connection reconfiguration message.

The eNB that completes LAA cell configuration may add a configured LAA cell to an SCell list for the UE.

Then, a scheduler of the eNB may activate or deactivate an LAA cell configured as an SCell to control transmission in order to transmit/receive data. The activation/deactivation of the LAA cell may be performed through an exchange procedure of a MAC level of control element (CE) and the UE that receives the activated MAC CE may monitor an (E)PDCCH for the LAA cell. For deactivation, an explicit deactivated MAC CE may be used or a deactivation timer configured in LAA cell configuration may be used.

In Alt.1-1, the dynamic carrier selection method of the LAA cell may be performed through a MAC level of control procedure. That is, a carrier may be dynamically modified in an LAA cell using a MAC activation/deactivation procedure. When a carrier is modified using the activation/deactivation procedure, a cell in which an existing activated carrier operates may be deactivated and a cell in which a carrier operates to be activated may be activated to modify a carrier. When a single frequency is allocated to an LAA cell, a control element transmitted from MAC may include a cell index indicating an LAA cell.

FIG. 26 is a diagram illustrating a MAC CE for dynamic carrier configuration according to an exemplary embodiment of the present invention.

Referring to FIG. 26, cx (c1, c2, and so on) of the MAC CE may refer to an index of an activated cell. For example, when a cell is activated, a bit of an index is denoted by 1. That is, when c1 is denoted by 1, this value may indicate that SCell #1 is activated.

Next, in Alt.1-1, a method for carrier reselection of a UE may be performed via an activation/deactivation procedure of a configured LAA cell.

In Alt.1, (E)PDCCH monitoring of an SCell may be indicated through control of a MAC layer, and in this case, control appropriate for an LBT operation may be impossible in consideration of time scale considered in the LBT operation. This is because in general, a maximum of several tens of milli seconds is taken to transmit a MAC CE to a UE from an eNB, and thus it is difficult to rapidly control (E)PDCCH monitoring according to the CCA result using the MAC CE. In addition, when an eNB reserves use of a channel of a corresponding unlicensed band through LBT and indicates activation of LAA to the UE, a time point for receiving an activation MAC CE by the UE may exceed a channel occupancy time configured by the eNB in consideration of maximum channel occupancy time of the LBT. Accordingly, when Alt.1-1 is used, the self-scheduling (case.1-1) and cross-carrier scheduling (case.1-2) may be applied as an LAA cell scheduling method.

When the self-scheduling is used in a structure of Alt.1-1, the UE needs to continuously monitor a PDCCH of an LAA cell during activated time duration. This is disadvantageous to increase battery consumption of a UE by continuously attempting (E)PDCCH decoding even if the (E)PDCCH is not transmitted by the LBT, but is disadvantageous in that the existing standard is reused.

When the cross-carrier scheduling is used in the structure of Alt.1-2, scheduling of the LAA cell may be performed using an (E)PDCCH of a licensed band cell. Since the UE receives the (E)PDCCH transmitted to the cell of the licensed band and then determines whether the LAA cell is transmitted/received based on the (E)PDCCH, battery consumption of the UE may be reduced compared with the self-scheduling. However, scheduling information is always transmitted using an (E)PDCCH of a licensed band, thereby causing congestion of the (E)PDCCH of a licensed band cell. In addition, since the (E)PDCCH needs to be generated based on the (E)CCA result for a frequency bandwidth used in the LAA cell, a significant amount of processing time may be taken to generate the (E)PDCCH.

Figure 27:
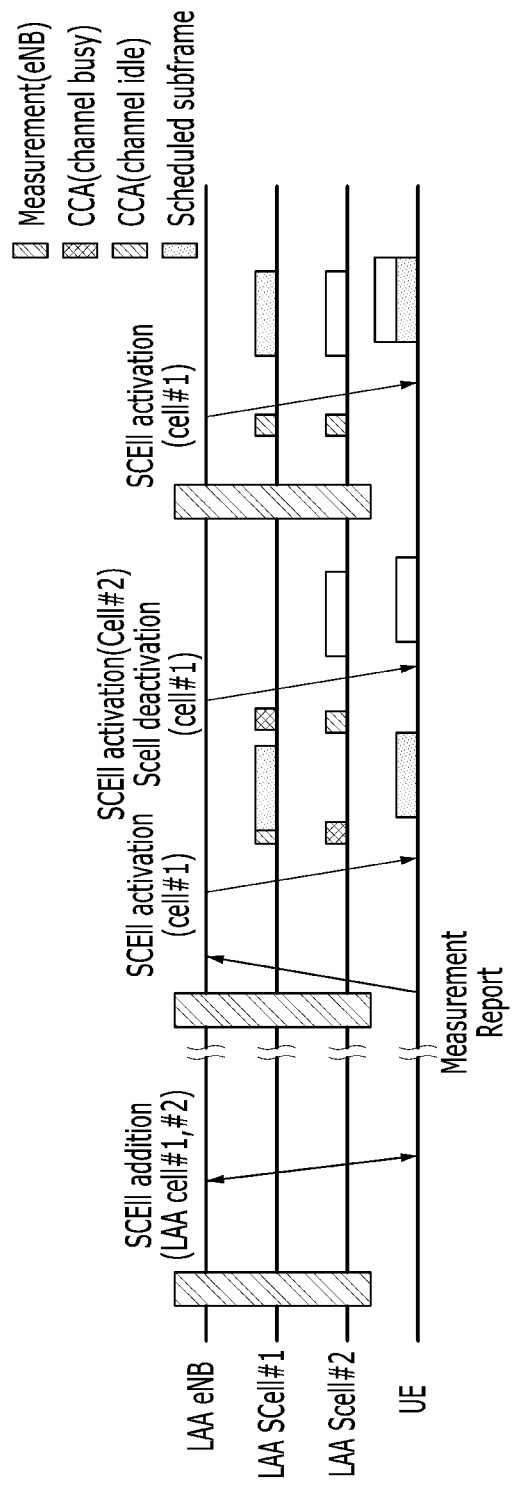
FIG. 27 is a schematic view illustrating a dynamic carrier selection method of Alt.1-1 according to an exemplary embodiment of the present invention.

FIG. 27 is a schematic view illustrating a dynamic carrier selection method of Alt.1-1 according to an exemplary embodiment of the present invention.

Referring to FIG. 27, an LAA eNB may select a carrier to be used in an LAA cell through measurement and configure LAA cell #1 and LAA cell #2 as an SCell for UE via an RRC connection reconfiguration procedure. Then, dynamic carrier modification may be performed via an SCell activation and deactivation procedure based on measurement report transmitted from the UE and measurement of the eNB.

Then, in the dynamic carrier configuration method in terms of the LAA UE, LAA cell configuration, LAA cell activation, and on/off indication may be combined (Alt.1-2).

Alt.1-2 may be a method in which LAA cell configuration for configuring an LAA cell as an SCell is performed via an RRC procedure based on measurement of the eNB, a corresponding LAA cell or carrier is activated through a MAC procedure when data needs to be transmitted/received, and then on/off of the activated cell or carrier used for transmission/reception is indicated through a physical layer procedure. The eNB may control activation and deactivation of an LAA cell in consideration of whether data to be transmitted/received is present and select a carrier to be used in consideration of an interference and load degree for a carrier of the LAA cell. The UE may monitor a received (E)PDCCH and transmit/receive data for the LAA cell according to on/off indication signaling indicated by the eNB by the activated LAA cell.

In alt.1-2, an on/off indication signal that is capable of being transmitted for short time may be newly defined based on the procedure of Alt.1-1 and a state of an activated SCell may be indicated to the UE using the on/off indication signal, and thus more rapid dynamic carrier selection may be supported and unnecessary battery consumption of the UE may be minimized.

In Alt.1-2, as a dynamic carrier selection method, the measurement method proposed in Alt.1-1 may be used in the same way. In addition, an LAA cell configuration procedure of Alt.1-2 may be the same as the procedure proposed in Alt.1-1.

An LAA cell may be configured as an SCell through the LAA cell configuration procedure and then a scheduler may activate the LAA cell for data transmission. Activation of the LAA cell may be performed via MAC signaling and the UE that receives the activated MAC CE may prepare data transmission/reception. Then, Alt.1-2 may be classified into signaling using a cell of a licensed band and signaling using an LAA cell according to an on/off indication signaling method. When on/off indication signaling is transmitted/received using a cell of a licensed band, the eNB may indicate a state (i.e., on or off) of an LAA cell activated in a subframe unit in the activated LAA cell. When on/off indication signaling is transmitted/received using the LAA cell, the eNB may indicate a state (i.e., on or off) of the LAA cell activated in a maximum channel occupancy time unit in the activated LAA cell.

The UE that receives indication indicating an on state for the activated cell from the eNB may monitor a transmitted (E)PDCCH. In this case, a MAC CE may use the same structure as that illustrated in FIG. 26. For on/off indication, the following information may be transmitted to a physical layer as follows.

First, new DCI indicating an on/off state of an LAA cell may be defined. The eNB may add the new DCI to an (E)PDCCH transmitted in a PCell or LAA cell in a licensed band and transmit the DCI to the UE. The UE that receives on/off indication of the activated LAA cell from the eNB may decode the (E)PDCCH for the LAA cell and transmit/receive data.

Carrier reselection of the UE in Alt.1-2 may be performed through on/off indication including state information of a cell for each activated LAA cell.

When Alt.1-2 is used, self scheduling and cross-carrier scheduling may be applied. In the case of self scheduling, the UE may decode (E)PDCCH for an indicated carrier according to on/off indication transmitted through the PCell or the LAA cell. In the case of the cross-carrier scheduling, scheduling information of an LAA cell is transmitted using an (E)PDCCH of a cell of a licensed band, a method (carrier indicator field) proposed in the existing CA or on/off indication considered in the self-scheduling may be used as it is without on/off indication signaling of Alt.1-2.

Figure 28:
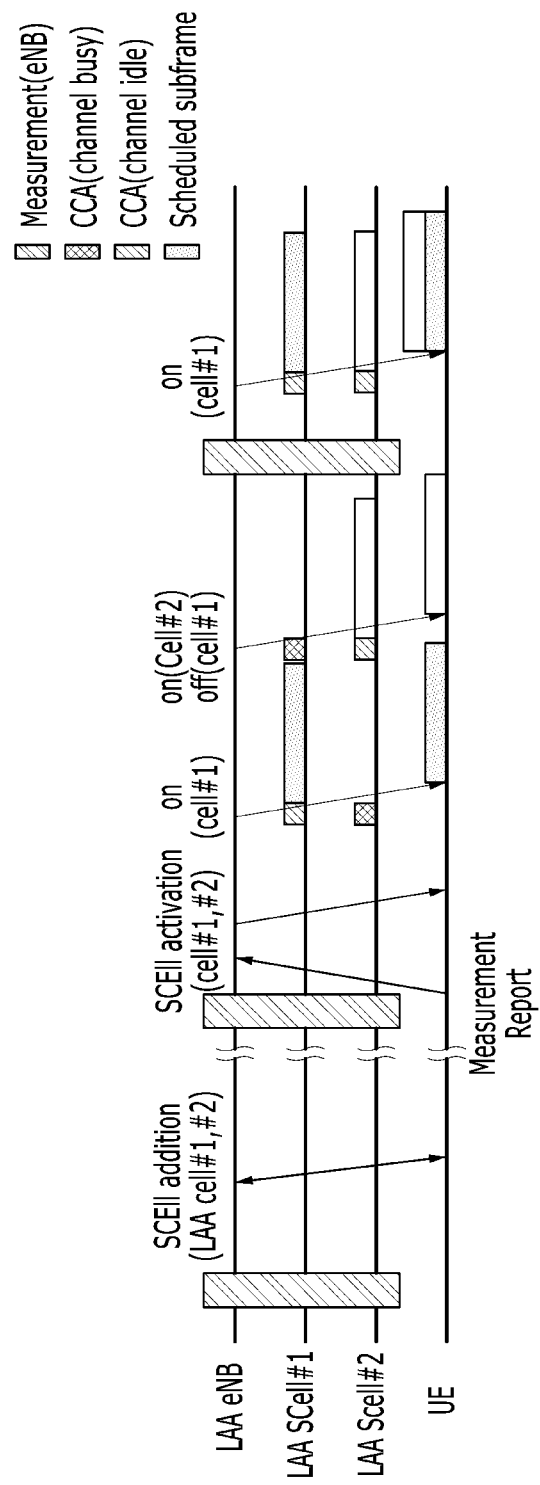
FIG. 28 is a schematic view illustrating a dynamic carrier selection method of Alt.1-2 according to an exemplary embodiment of the present invention.

FIG. 28 is a schematic view illustrating a dynamic carrier selection method of Alt.1-2 according to an exemplary embodiment of the present invention. An LAA eNB may configure LAA cell #1 and LAA cell #2 as an SCell for a UE through an RRC connection reconfiguration procedure and then activate LAA cell #1 and LAA cell #2 according to determination of a scheduler when data transmission/reception is required. The activated LAA cell #1 and LAA cell #2 may transmit/receive data using carrier #1 through an on/off indication procedure and then change a carrier to carrier #2 according to the measurement result. Then when a channel quality of LAA cell #1 and LAA cell #2 is good, a service may be provided using these two cells.

Then, in the dynamic carrier configuration method in terms of the LAA UE, LAA cell configuration and carrier indication may be combined (Alt.2).

Alt.2 may be a method in which LAA cell configuration for configuring an LAA cell as an SCell is performed through an RRC procedure based on measurement, and a corresponding LAA cell or carrier is indicated through a physical layer procedure, and an (E)PDCCH is monitored when data transmission/reception is required. The eNB may control a carrier to be used in an LAA cell in consideration of whether data to be transmitted/received is present and an interference and load degree of a corresponding carrier, and the UE may monitor an (E)PDCCH received from a carrier of an LAA cell indicated by the eNB and transmit/receive data.

The measurement method proposed in Alt.1-1 may be applied to the dynamic carrier selection of Alt.2 in the same way. In addition, the LAA cell configuration procedure of Alt.2 may be performed through RRC connection reconfiguration procedure based on measurement report transmitted from the UE and measurement of the eNB similarly to Alt.1-1. Accordingly, information included in an RRC connection reconfiguration message used in the LAA cell configuration may have the same structure as that of Alt.1-1.

However, unlike in Alt.1-1 and Alt.1-2, in Alt.2, activation/deactivation is not performed through a control procedure of a MAC layer, and a carrier of an LAA cell is selected and transmitted/received through a control procedure of a physical layer, and thus, in Alt.2, the UE may monitor an (E)PDCCH for a corresponding LAA cell through carrier indication information of a physical layer.

After LAA cell configuration is completed using an RRC connection reconfiguration procedure, the eNB may perform carrier indication control using a cell that operates at a licensed band frequency in order to transmit carrier information used in data transmission to the UE among carriers of configured LAA cells. The carrier indication control using a licensed band cell has shorter transmission delay than LAA cell activation/deactivation indication through MAC level of control proposed in Alt.1-1 or Alt.1-2, and thus it is easy to apply LBT and maximum channel occupancy time of LAA. However, in order to transmit carrier information of an LAA cell through a physical layer procedure, the eNB may define new DCI indicating a carrier used in the LAA cell, add the newly defined DCI to an (E)PDCCH of a PCell of a licensed band, and transmit the newly defined DCI to the UE. The UE may receive DCI indicating an LAA cell from the eNB, decode an (E)PDCCH for the LAA cell, and transmit/receive data.

The carrier indication signaling may include signaling using a cell of a licensed band and signaling using an LAA cell. When the carrier indication signaling is transmitted/received using a cell of a licensed band, a carrier of an activated LAA cell may be indicated in a subframe unit. When the carrier indication a carrier of signaling is transmitted/received using the LAA cell, a carrier of an LAA cell activated in a maximum channel occupancy time unit in an LAA cell may be indicated.

In Alt.2, carrier reselection of the UE may be performed through a procedure for indicating a carrier including indication information of a carrier to be used in a configured LAA cell.

As carrier scheduling of Alt.2, self scheduling and cross-carrier scheduling may be applied. In the case of self scheduling, the UE may decode an (E)PDCCH for a carrier indicated by carrier indication transmitted through the PCell. In the case of cross-carrier scheduling, scheduling information of the LAA cell is transmitted using an (E)PDCCH of a cell of a licensed band, and thus a method (carrier indicator field) of the existing CA may be used without carrier indication signaling of Alt.2.

Figure 29:
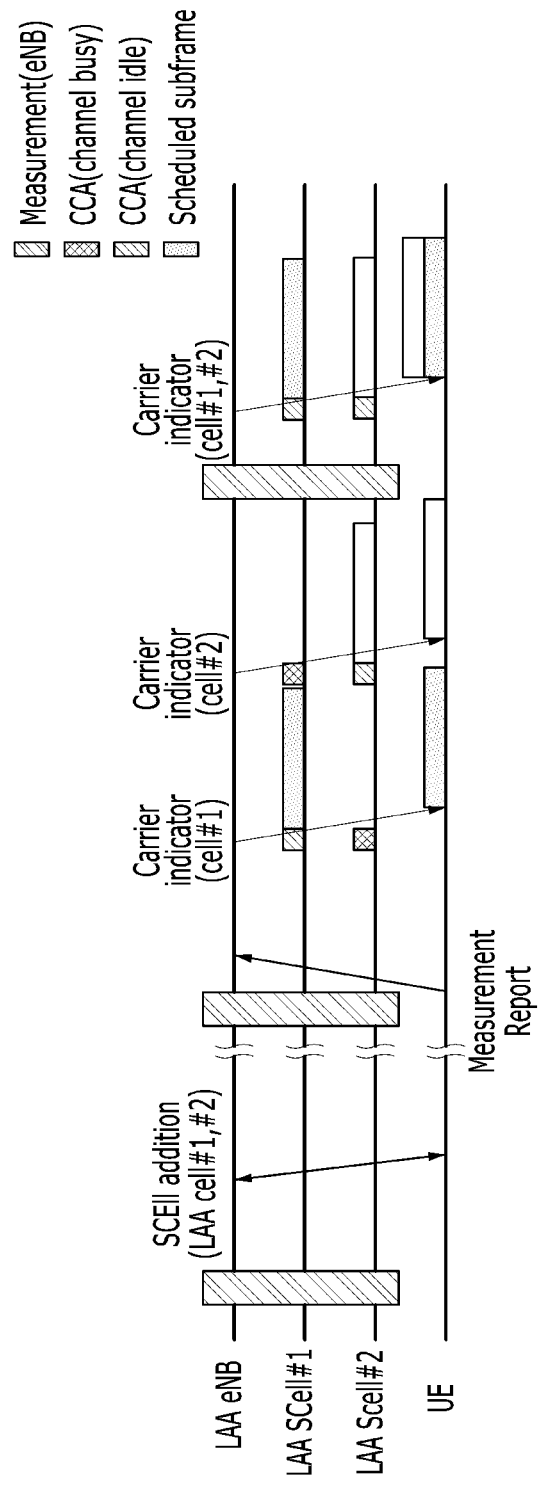
FIG. 29 is a schematic view illustrating a dynamic carrier selection method of Alt.2 according to an exemplary embodiment of the present invention.

FIG. 29 is a schematic view illustrating a dynamic carrier selection method of Alt.2 according to an exemplary embodiment of the present invention.

Referring to FIG. 29, an LAA eNB may configure LAA cell #1 and LAA cell #2 as an SCell for a UE through an RRC connection reconfiguration procedure. Then, a dynamic carrier selection procedure may be performed through a carrier indication procedure using measurement report transmitted from the UE and measurement of the eNB and data according to the dynamic carrier selection procedure may also be transmitted/received.

With regard to dynamic carrier configuration in terms of an LAA UE, in Alt.1-2 and Alt.2, on/off control and carrier indication may be performed through physical layer signaling, respectively, and thus whether corresponding information is transmitted may not be checked. In this case, transmission possibility of information may be enhanced through a robust transmission method, but mismatch of carriers used between the UE and the eNB may significantly cause performance degradation, and thus carrier mismatch may be overcome through an implicit identification method or an explicit identification method.

Figure 30:
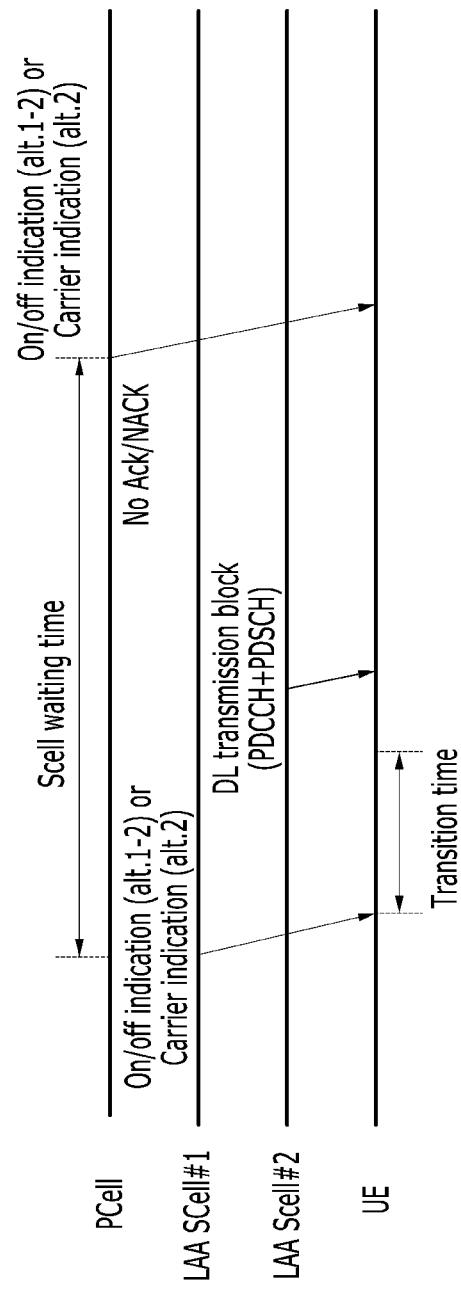
FIG. 30 is a schematic view illustrating an implicit identification method for an issue in terms of carrier mismatch according to an exemplary embodiment of the present invention.

FIG. 30 is a schematic view illustrating an implicit identification method for an issue in terms of carrier mismatch according to an exemplary embodiment of the present invention.

First, the implicit identification method is a method for determining that error occurs in transmission of switching information and retransmitting switching information through a PCell when HARQ ACK/NACK for downlink transmission is not received for response latency time by an LAA SCell that transmits switching information (i.e., on/off indication (alt.1-2) or carrier indication (alt.2)) indicating a LAA SCell that intends to change a carrier, to the UE. In this case, downlink latency time may be configured based on HARQ ACK/NACK time for downlink transmission, and switching information may be transmitted to the UE in the LAA SCell and then downlink transmission (PDCCH+PDSCH) may be begun in consideration of transition time of the UE.

Figure 31:
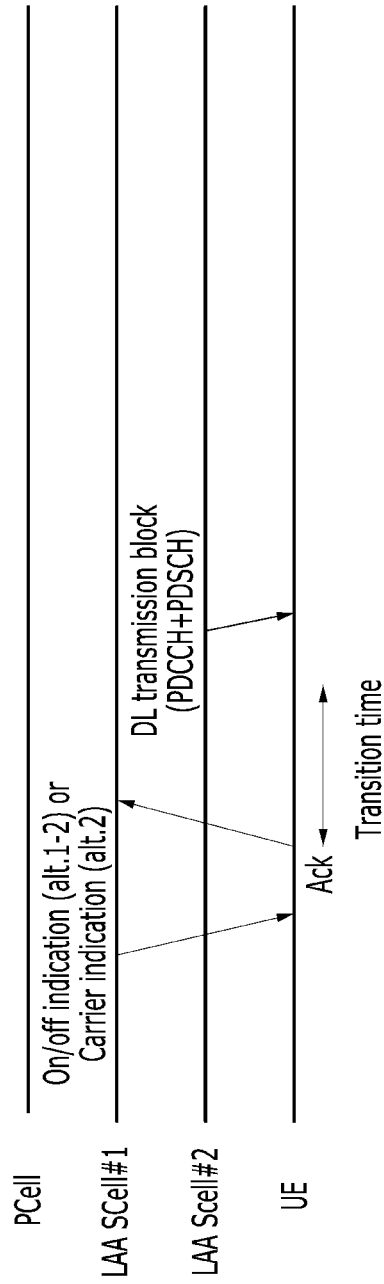
FIG. 31 is a schematic view illustrating an explicit identification method for an issue in terms of carrier mismatch according to an exemplary embodiment of the present invention.

FIG. 31 is a schematic view illustrating an explicit identification method for an issue in terms of carrier mismatch according to an exemplary embodiment of the present invention.

The explicit identification method is a method in which an LAA SCell (LAA SCell #1) transmits switching information (i.e., on/off indication (alt.1-2) or carrier indication (alt.2)) indicating an LAA SCell (LAA SCell #2) in which a carrier is intended to be changed, to a UE, and the UE transmits whether switching information is received to LAA SCell #1 and then communicates with the switched LAA SCell #2. When confirmation for switching information is not received by LAA SCell #1, the eNB may determine that error occurs in transmission of switching information and retransmit switching information to the UE through the PCell. In this case, the eNB may receive response information for switching from the UE and then start downlink transmission (PDCCH+PDSCH) in consideration of transition time of the UE.

Figure 32:
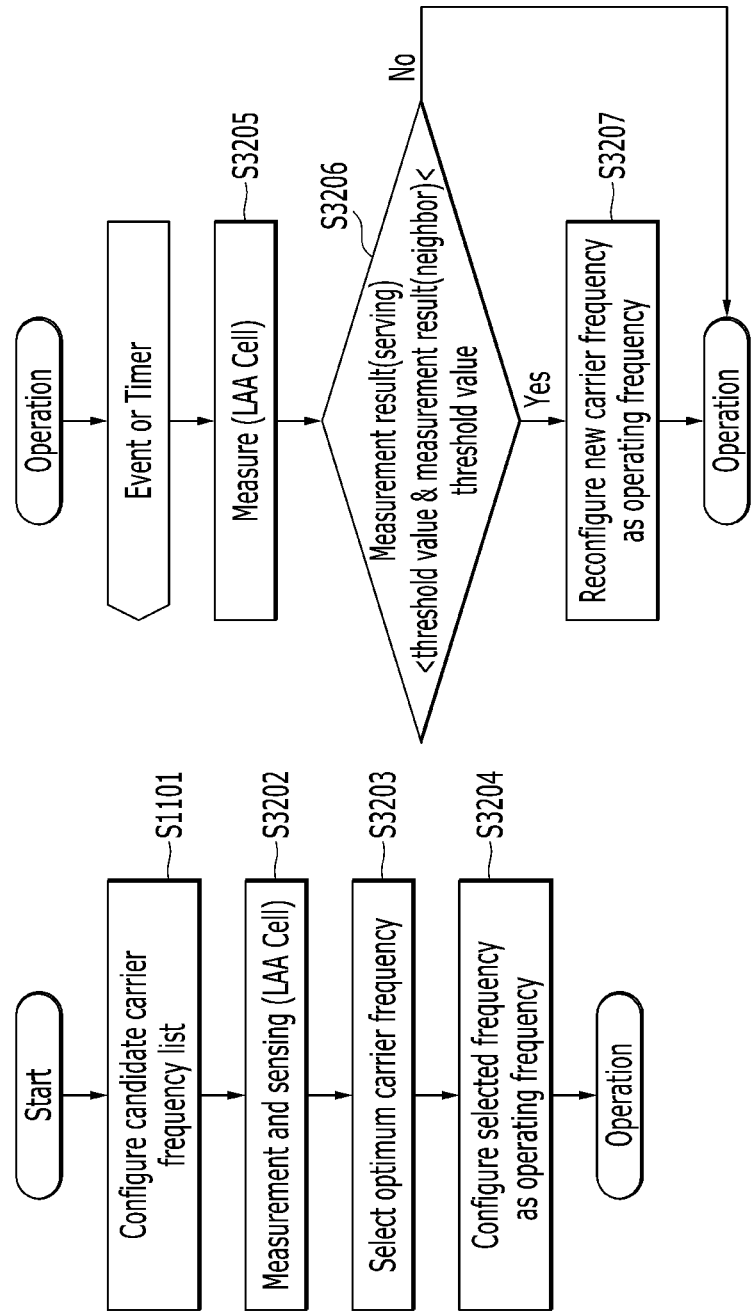
FIG. 32 is a flowchart illustrating a dynamic carrier configuration method in terms of a LAA cell according to an exemplary embodiment of the present invention.

FIG. 32 is a flowchart illustrating a dynamic carrier configuration method in terms of a LAA cell according to an exemplary embodiment of the present invention.

Dynamic carrier configuration in terms of an LAA cell may be performed based on measurement of an LAA cell itself or an LAA UE connected to the LAA cell. Initially, the LAA cell may receive information about an available unlicensed band carrier frequency from operation and management (OAM) and so on and configure a candidate carrier frequency list for an LAA cell based on the received information about the available unlicensed band carrier frequency (S3201). Then, the LAA cell may perform measurement and sensing on a carrier frequency contained in the candidate carrier frequency list (S3202) and select an optimum carrier frequency based on the result of measurement and sensing (S3203). In addition, the LAA cell may configure the selected frequency as an operating frequency of the LAA cell (S3204).

Then, the LAA cell and the LAA UE may perform periodical or event-driven measurement on the carrier frequency contained in the candidate carrier frequency list (S3205). This measurement may be used to recognize interference and congestion of a frequency that is currently used in an LAA cell. The LAA cell may determine whether a configured carrier frequency is modified using the measurement result (S3206). When whether the carrier frequency is modified is determined, the LAA cell may use a threshold value. That is, switching at a new carrier frequency may be determined based on comparison between a measured value via measurement and the threshold value. When switching at a new carrier frequency is determined, the LAA cell may move the connected LAA UE to another cell and then reconfigure a new carrier frequency as an operating frequency (S3207). However, when switching at the new carrier frequency is not determined, the LAA cell and the LAA UE may continuously perform measurement.

Figure 33:
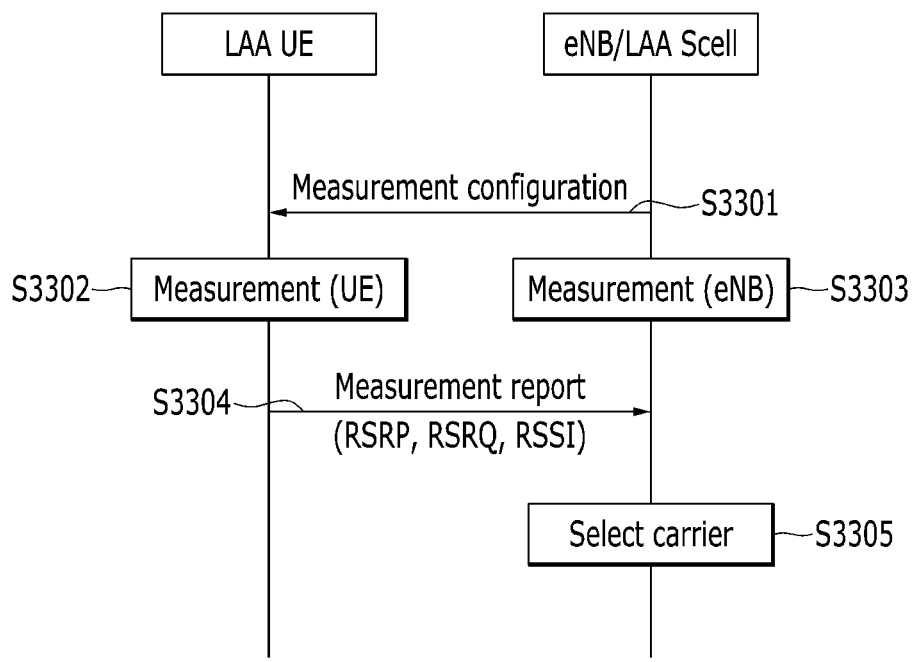
FIG. 33 is a flowchart illustrating a method for dynamically selecting a carrier according to an exemplary embodiment of the present invention.

FIG. 33 is a flowchart illustrating a method for dynamically selecting a carrier according to an exemplary embodiment of the present invention.

In an operating procedure for dynamic carrier selection, a carrier frequency with a low interference level and cell load may be selected via measurement of an eNB and a UE.

For measurement of dynamic carrier selection, reference signal received power (RSRP), reference signal received quality (RSRQ) and reference signal strength indicator (RSSI) may be used. The UE may perform measurement based on measurement configuration (S3301) configured by the eNB (S3302) and transmit the measurement result to the eNB (S3304). The eNB may select an optimum carrier frequency based on the measurement result (S3303) of the eNB for the LAA cell and the measurement result received from the UE (S3305), change an operating frequency to the corresponding frequency, and provide a service.

Figure 34:
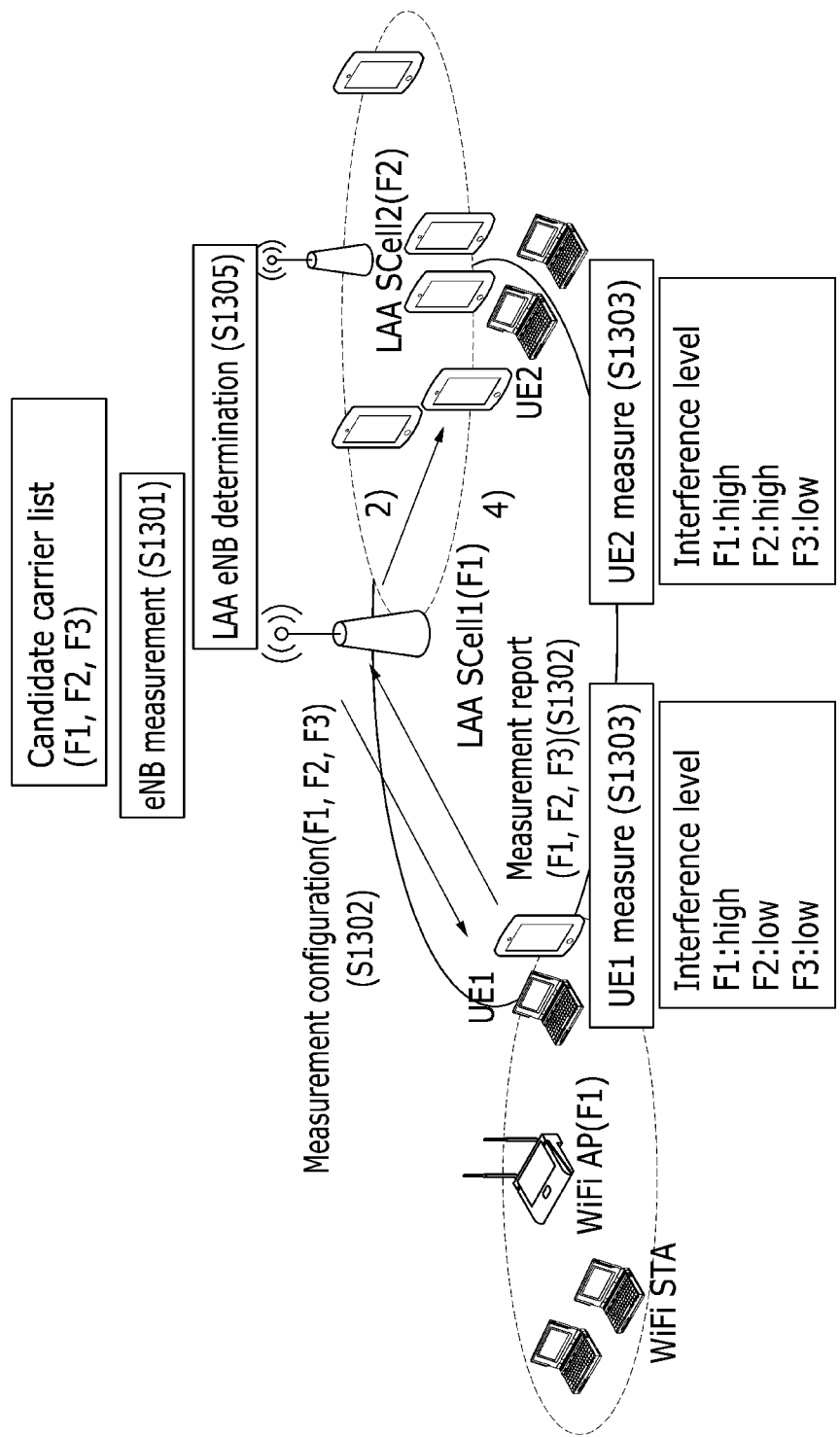
FIG. 34 is a schematic view illustrating an operating scenario of dynamic carrier selection according to an exemplary embodiment of the present invention.

FIG. 34 is a schematic view illustrating an operating scenario of dynamic carrier selection according to an exemplary embodiment of the present invention.

First, an eNB may perform measurement of configurable carrier frequencies F1, F2, and F3 in an LAA cell (LAA SCell#1), select a carrier frequency with lowest interference among carrier frequencies, and perform initial frequency configuration (S3401). The LAA eNB that performs the initial carrier frequency configuration may periodically broadcast a discovery reference signal (DRS) to the LAA cell. In addition, interference measurement may be periodically performed at configurable frequencies F1, F2, and F3 and a candidate carrier list may be managed. The UE that receives a DRS from the LAA cell may transmit the measurement result to the eNB, and the eNB that receives the measurement result from the UE may configure an LAA cell as a secondary cell for the UE. Referring to FIG. 34, UE1 and UE2 may access an LAA cell (LAA SCell #1).

Then, the eNB may indicate measurement at a carrier frequency of an LAA cell and configurable carrier frequencies of an LAA cell that provides a service, to the UE (S3402).

In addition, UE1 and UE2 may perform measurement at configurable carrier frequencies according to measurement indication of the eNB (S3403). In the example illustrated in FIG. 34, after access of UE1 and UE2, the number of WiFi stations (STAs) that access a WiFi AP may be enhanced and the WiFi STA in an ad-hoc mode may access toward UE2 so as to enhance an interference level of UE1 and UE2.

The UE may transmit the measurement result including RSSP, RSRQ, and RSSI to the eNB (S3404). A method for transmitting measurement report to the eNB from the UE may include periodic report or event-driven report. In the periodic report method, the UE may transmit interference information to the eNB at a predetermined time interval. In this case, as information indicating interference, an average value of RSSI of specific measurement duration or a high interference ratio value may be used. The average value of RSSI of the specific measurement period may be obtained by periodically performing measurement during measurement duration and averaging the measurement result. In addition, a high interference ratio value may be obtained through a ratio of time in which an RSSI value is higher than a threshold value during specific time duration. For example, if time period in which an RSSI value is higher than an interference (RSSI) threshold value is 100 ms during 200 ms observation duration, a high interference ratio value may be represented by 0.5. In the event-driven report method, when a predetermined even occurs, the UE may report the measured RSSI value to the eNB as report of an interference amount. In FIG. 34, an interference level of UE1 and UE2 is enhanced, and thus the measurement report transmitted from UE1 includes information indicating that an interference level of F1 is high and an interference level of F2 and F3 is low, and the measurement report transmitted from UE2 may include information indicating that interference level between F1 and F2 is high and an interference level of F3 is low.

The eNB may determine whether a carrier is modified based on the interference level of the UE, included in the measurement report, and the interference level according to measurement of the eNB (S3405). As illustrated in FIG. 34, when the LAA cell and the UE that accesses the LAA cell (LAA SCell1) highly interfere at F1, the eNB may select a frequency for an LAA cell (LAA SCell1) from a candidate carrier list and change the frequency. In FIG. 34, a carrier may be changed to F3 from F1. In this case, the eNB may perform a release procedure of an LAA cell on a UE that accesses an LAA cell (LAA SCell #1) and change a frequency used in the LAA cell (LAA SCell#1). As the frequency of the LAA cell (LAA SCell #1) is completely changed, the UE may access an LAA cell (LAA SCell #1). When high interference is measured only in a specific UE, the eNB may not change a frequency of an LAA cell and access of the UE in which high interference is measured may be released from an LAA cell (LAA SCell#1).

Radio resource management (RRM) measurement for LAA may be performed based on a DRS that is already known, and the RRM measurement result (i.e., RSRP, RSRQ, RSSI) may be transmitted to the LAA UE from the LAA eNB using DRS measurement timing configuration (DMTC). Based on the DMTC, the measurement result of RRM measurement may be reported to the eNB in RRC. In LAA, the DRS may be transmitted in the following two forms.

Alt.1: Transmission at fixed time position of configured DMTC

Alt.2: Transmission at a plurality of time positions in configured DMTC duration A higher layer operation for measurement configuration may reuse a DRS configuration (DMTC) method of LTE Rel-12, and in this case, the DMTC may include a parameter for configuring/controlling two DRS transmission methods of Alt.1 and Alt.2. FIG. 35 is a diagram illustrating abstract syntax notation one (ASN.1) illustrating measurement gap configuration for an LAA cell according to an exemplary embodiment of the present invention.

An LAA cell may have one of DMTC methods, an LAA eNB may configure a measurement object for stating a configured DRS transmission method for the LAA SCell to the LAA UE, and the LAA UE may perform measurement based on the configured measurement object.

In the LAA, the DMTC may be configured for each frequency and a plurality of frequencies may be configured as the same DMTC parameter value. Accordingly, a plurality of frequencies may be dynamically used in the same area so as to efficiently provide an LAA service. That is, DMTC including the same parameter for DRS measurement of a plurality of frequencies may be configured for the UE, and thus the method may be advantageous in terms of battery consumption of the UE.

Measurement configuration in LAA may be changed for each parameter. The RSRP and the RSRQ may be based on measurement frequency band for a cell. In addition, the RSSI may be based on measurement frequency band for a cell or measurement per frequency.

The RSRP and the RSRQ may be measured based on power amount of a received signal and quality of the received signal of the LAA cell. The measured RSRP and RSRQ may be used when the LAA cell is configured, released, activated, or deactivated for the SCell. On the other hand, RSSI measurement for the LAA cell may be used to predict an interference level and congestion degree for a specific cell or a specific frequency, and thus, configuration for each cell or each frequency may be necessary during measurement configuration. In the legacy RRC standard, MeasObjectEUTRA included in MeasConfig may be used to configure a measurement object of evolved-UMTS terrestrial radio access (E-UTRA), and a frequency of an LAA cell measured through carrierFreq and allowedMeasBandwidth of the information object may be configured.

The LAA uses a band of 5 GHz unlike in the legacy licensed band, and thus the LAA UE operates as a plurality of RF chains. Currently, for inter-frequency measurement, a measurement gap may be configured and used, and in this case, may affect transmission/reception of all serving cells irrespective of whether RF is embodied (i.e., interruption of transmission and reception). Accordingly, when the UE has different RF chains for a licensed band and an unlicensed band, system performance may be enhanced by removing influence on transmission/reception of a cell of a licensed band during measurement of an LAA cell that operates at different frequencies. In addition, when an LAA cell of an unlicensed band is used through carrier switching, there may be a demand for high inter-carrier measurement compared with the case of a licensed band, and accordingly, an independent measurement gap needs to be configured for an operation of a licensed band and an unlicensed band in the LAA.

Whether a measurement gap for inter-frequency measurement is configured may be associated with capability of the UE, and the measurement gap may be configured through a UE capability transfer procedure. In the 3GPP Rel-12 standard, whether a measurement gap for inter-frequency measurement is required may be configured through interFreqNeedForGaps included in the UE-EUTRA-Capability information object, and when the measurement gap for measurement of a licensed band cell and an unlicensed band cell is independently configured, the legacy standard may also be used. That is, when whether the measurement gap for a band or band set to be measured is necessary is configured, the LAA eNB may determine a method for configuring a measurement gap (i.e., independent measurement gap or shared measurement gap) for measurement between frequencies of licensed band and unlicensed band during measurement configuration in consideration of an interFreqNeedForGaps included in the information element of UE-EUTRA-Capability.

In the Rel-13 LAA, for independent measurement gap configuration for a frequency of a licensed band and a frequency of an unlicensed band, MeasGapConfig included in MeasConfig needs to be independently configured at a frequency of a licensed band and a frequency of an unlicensed band, and to this end, as illustrated in FIG. 35, measurement gap configuration for transmission/reception with an LAA cell needs to be contained.

Most RSSI measurement is performed at a frequency but not a current serving frequency, and thus a measurement gap for inter-frequency measurement needs to be used, and in order to efficiently measure a plurality of channels, a gap pattern having a short period (e.g., 10 ms or 20 ms) may be used, as shown in FIG. 36. FIG. 36 illustrates ASN.1 illustrating measurement gap configuration for an LAA cell according to another exemplary embodiment of the present invention.

Figure 37:
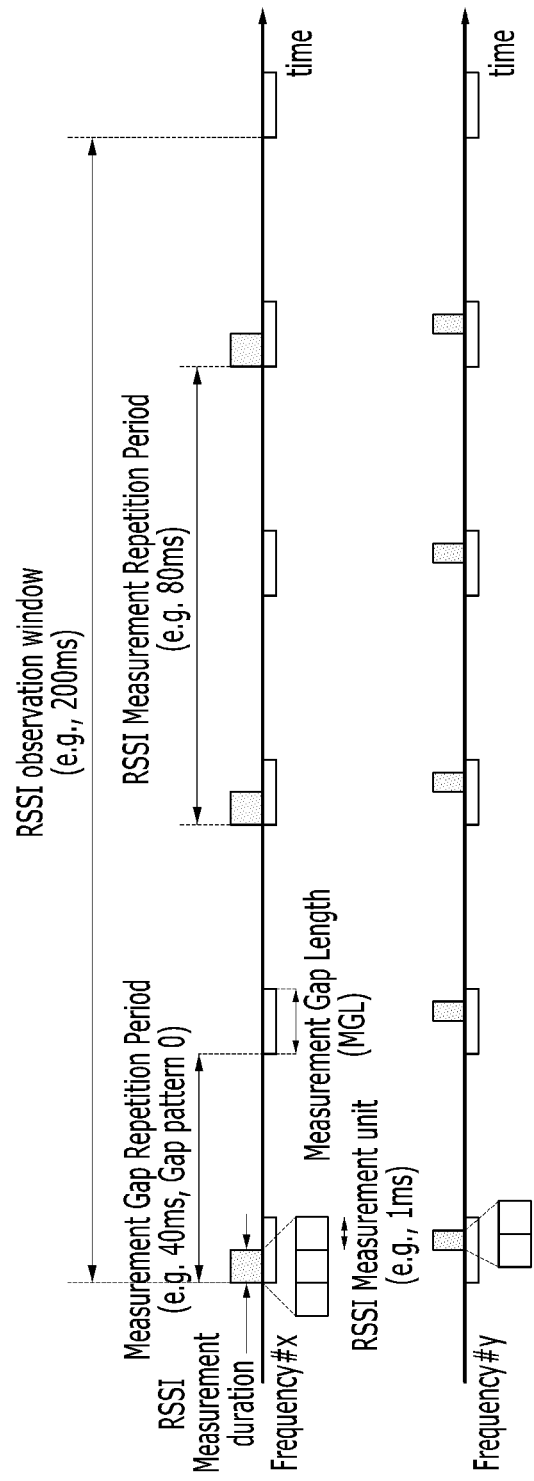
FIG. 37 is a schematic view illustrating a method for measuring an RSSI according to an exemplary embodiment of the present invention.

FIG. 37 is a schematic view illustrating a method for measuring an RSSI according to an exemplary embodiment of the present invention.

According to an exemplary embodiment of the present invention, RSSI measurement may be performed in a plurality of RSSI measurement units based on an observation window. The RSSI measurement unit may be an OFDM symbol unit, a slot unit, or a subframe unit. To this end, the RSSI measurement may be configured in consideration of a period of a measurement gap. In addition, the RSSI measurement is not measurement through synchronization signal (PSS/SSS) and a reference signal, and thus it may be possible to perform a plurality of measurement operations in one measurement gap. For example, when RSSI measurement duration is configured as 3 ms for two specific frequencies and the RSSI measurement unit is configured by 1 ms, the UE may perform RSSI measurement at two independent frequencies during one measurement gap.

For example, when gap pattern 0 (gp0; which means that the measurement gap is configured by 40 ms) is used and an offset is 0 for configuration for a measurement gap, RSSI measurement including three measurement samples (i.e., RSSI measurement repetition period of 80 ms) may be configured during an observation window of 200 ms, as shown in FIG. 37. That is, RSSI measurement for frequency #x may be performed in unit of 80 ms during three RSSI measurement units (3 ms) from a time point in which a measurement gap is started. RSSI measurement for Frequency #y may be performed in unit of 40 ms during two RSSI measurement units (2 ms) from fourth subframe of a measurement gap in which RSSI measurement for frequency #x of 3 ms is terminated.

The LAA cell may periodically broadcast a DRS according to the aforementioned DRS structure and transmission method, and the LAA UE may search for the LAA cell using the periodically broadcasted DRS. A DRS may be transmitted through DMTC in a frequency in which the LAA cell operates, and the DMTC information may be configured by the LAA eNB during measurement configuration. In addition, in the Rel-13 LAA, it is necessary to improve a MeasDS-Config information object so as to support a fixed DMTC and a DMTC window according to the DRS structure and the transmission method.

The transmission of DRS without periodicity of the LAA cell may be performed in the following case.

Alt.1: No measurement
Alt.2: Multiple measurement point within DRS window
Alt.3: Shorter measurement periodicity Alt.1 may use a DMTC information object of the legacy Rel-12 without changes and Alt.2 needs to improve a DMTC information object so as to contain a DMTC window for reconfiguration of a measurement point. In addition, Alt.3 needs to improve a DMTC information object so as to correct an existing DMTC period. FIG. 38 illustrates ASN.1 illustrating DMTC configuration according to an exemplary embodiment of the present invention.

With regard to dynamic carrier selection, measurement may be performed on specific time duration in a physical layer (L1 filtering) and an average value of the measurement result may be transmitted to 3 layers. However, in the case of the LAA, DRS transmission may not be ensured by LBT, and thus an average value for filtering performed in the physical layer may be calculated as follows.

First, an average value may be calculated based on fixed time (Alt.1). In this case, the average value may be calculated with respect to measurement samples measured for the predetermined fixed time, and the calculated average value may be transmitted to an RRC layer. The method is advantageous in that a typical method is not necessarily changed but is disadvantageous in that the number of measurement samples contained in the average value is variable, measurement accuracy is lowered, and in the worst case, a measurement sample is not present.

Alternatively, an average value may be calculated based on the fixed sample (Alt.2). In the method, after predetermined measurement samples may be measured, an average value of the measurement samples may be calculated, and the average value may be transmitted to an RRC layer. The method may be advantageous in that measurement accuracy is high compared with Alt1. but may be disadvantageous in that time taken to calculate the average value is not predicted and overall measurement time is increased. Accordingly, additional procedures (e.g., addition, modification, release, activation, a deactivation of SCell) according to measurement may not be frequently performed at an appropriate time point.

Accordingly, physical layer filtering may be performed by selecting a measurement sample according to whether a DRS is transmitted.

In an LTE RRC protocol, an additional filtering procedure may be performed and then evaluation for reporting may be performed using a measurement average value measured through filtering of a physical layer. In this case, a coefficient for the filtering may be configured via RRC. Since LAA contains RSSI measurement in addition to RSRP/RSRQ measurement proposed in the 3GPP LTE Rel-12, a layer 3 filter coefficient for RSSI measurement may be contained in QuantityConfig for E-UTRA as shown in FIG. 39. FIG. 39 illustrates ASN.1 for quantity configuration for layer 3 filtering according to an exemplary embodiment of the present invention.

With regard to LAA, transmission of a DRS may not be frequently ensured in DMTC duration configured by LBT. Filtering of LTE may be configured to perform physical layer filtering based on 200 ms and the filtering result may be transmitted to Layer 3, and Equation 1 may be used to evaluate the measurement value.

$$Fn=(1-a)Fn-1+aFn \qquad \text{(Equation 1)}$$

In Equation 1, Fn is an updated filtering measurement result and is used to evaluate a reporting criteria or used for measurement reporting. Fn−1 is a previous value of an updated filtering measurement result, and when a first measurement result is received from a physical layer, F0 may be set to be M1. In this case, Mn refers to the measurement result that most recently received from a physical layer. a=1/2k/4, where k is a filter coefficient of a corresponding measurement amount received according to measurement configuration.

In addition, when a DRS is not received in LAA by LBT, the measurement result may be transmitted to L3 in a physical layer as follows.

Alt.1: No transmission—This is a structure in which a measurement resulting value is not transmitted since a measured DRS is not present.

Alt.2: 0 transmission—This is a structure in which a measurement resulting value of 0 is transmitted since a measured DRS is not present.

When Layer 3 filtering is performed through Equation 1, the measurement result of Alt.1 and Alt.2 is transmitted as follows. Alt.1 is a structure in which the measurement result is not periodically transmitted, and thus it is necessary to correct a weight value in consideration of reception of a measurement result in a unit of 200 ms. For example, a higher weight value than a result that is recently measured in a time axis needs to be given to Layer 3 filtering, according to Equation 2 below. a' of Equation 2 below showing a corrected Layer 3 filtering method refers to a weight value of a received time interval Tn.

$$(1-a)=(1-a')200\ ms/Tn \qquad \text{(Equation 2)}$$

In Equation 2 above, Tn refers to a time interval between the measurement result that is newly received from a physical layer and the previously received measurement result.

In Alt.2, when the measurement result is not 0, the measurement result may not be contained in filtering. Accordingly, when the measurement value received from a physical layer is 0, a UE may not perform layer filtering, and when the layer filtering is performed, a method for adjusting a weight value, such as Equation 1 above, may be used.

RSSI of an LAA cell may be used to select a carrier and search for a hidden node. The measured RSSI may be reported to the eNB. The RSSI of the LAA cell may be information for inferring an interference level and a congestion degree of the LAA cell and may be measured as following.

Alt.1: Measure average RSSI

This method is a method for measuring an average of RSSI values during specific observation time duration.

Alt.1-1: Measure average RSSI with threshold value

This method is a method for measuring an average of RSSI values equal to or more than a threshold value during specific observation time duration.

Alt.2: Measure time ratio with threshold value

This method is a method for measuring a time ratio based on a threshold value of RSSI during specific observation time duration.

Alt.2-1: Measure average RSSI and time ratio with threshold value

This method is a method for measuring a time ratio and average RSSI during corresponding time duration based on a threshold value of RSSI during specific observation time duration.

Alt.3: Measure time period with RSSI

Alt.3-1: Measure time period and RSSI value with bitmap

This method is a method for indicating the comparison result between an RSSI value measured for each time duration and an RSSI threshold value during specific observation time in the form of a bitmap and reporting the bitmap and an average value of RSSI measured during the observation time duration. In this case, the bitmap may be indicated by dividing observation time into n time durations with the same interval, measuring RSSI in each equivalent interval, and differently representing indication when the measured RSSI is higher than a threshold value (on indication) and when the measured RSSI is not higher than the threshold value (off indication).

Alt.3-2: Measure time period and RSSI level with histogram

This method is a method for indicating RSSI values measured for respective time durations during specific observation time with a histogram and reporting RSSI levels for respective time durations. In this case, the histogram may be configured by dividing observation time into n time durations with the same interval and then indicating RSSIs measured in each the same interval as a level. Mapping the measured RSSI value to a level divided into an RSSI range may be configured according to a predetermined table value.

Figure 40:
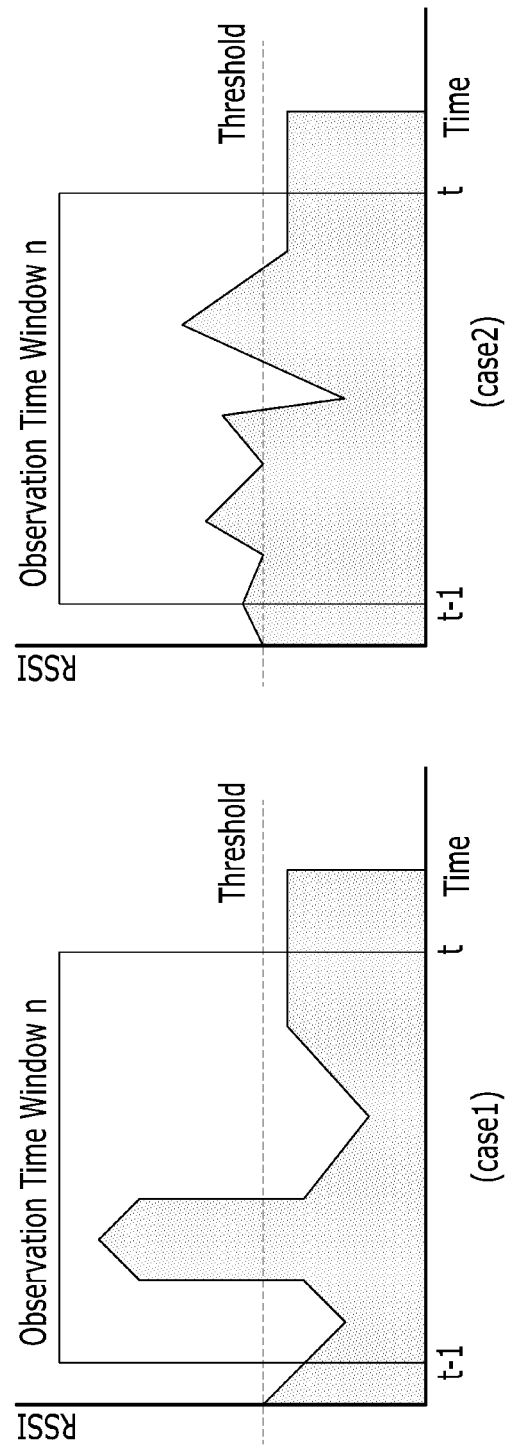
FIG. 40 is a schematic view illustrating a method for measuring an average RSSI according to an exemplary embodiment of the present invention.
Figure 41:
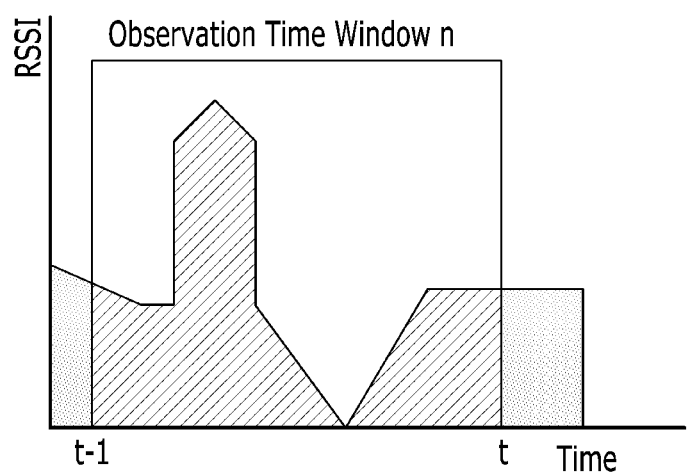
FIG. 41 is a schematic view illustrating a measured average RSSI according to an exemplary embodiment of the present invention.

FIG. 40 is a schematic view illustrating a method for measuring an average RSSI according to an exemplary embodiment of the present invention. FIG. 41 is a schematic view illustrating a measured average RSSI according to an exemplary embodiment of the present invention.

Referring to FIG. 40, the same average RSSI in case1 and case2 is reported to an LAA eNB but an actual LAA UE undergoes different interferences in case1 and case2. That is, although interference of a threshold value or more may occur in a most observation period ins case 2, interference may occur only in a very short period of observation time in case1. Accordingly, average RSSI of alt.1 may not differentiate interference states of case1 and case2. Referring to FIG. 41, according to Alt.1, RSSIs of all samples measured during entire observation time duration are indicated by dashed lines.

Figure 42:
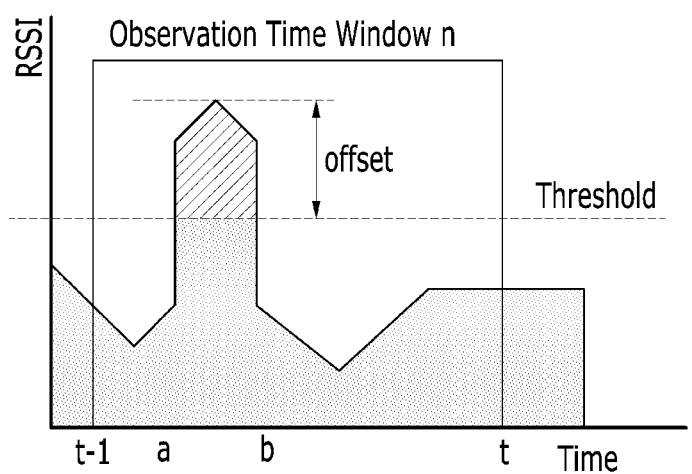
FIG. 42 is a schematic view illustrating a method for measuring an average RSSI using a threshold value according to an exemplary embodiment of the present invention.

FIG. 42 is a schematic view illustrating a method for measuring an average RSSI using a threshold value according to an exemplary embodiment of the present invention.

Referring to FIG. 42, according to Alt.1-1, during specific observation time duration of entire observation time duration, an RSSI offset of samples corresponding to RSSI threshold values or more (or less) may be measured (indicated by dashed lines), and an average of the measured offset may be calculated. That is, according to Alt.1-1, an average of RSSI offset of time period b to a may be calculated and reported to an LAA eNB.

Figure 43:
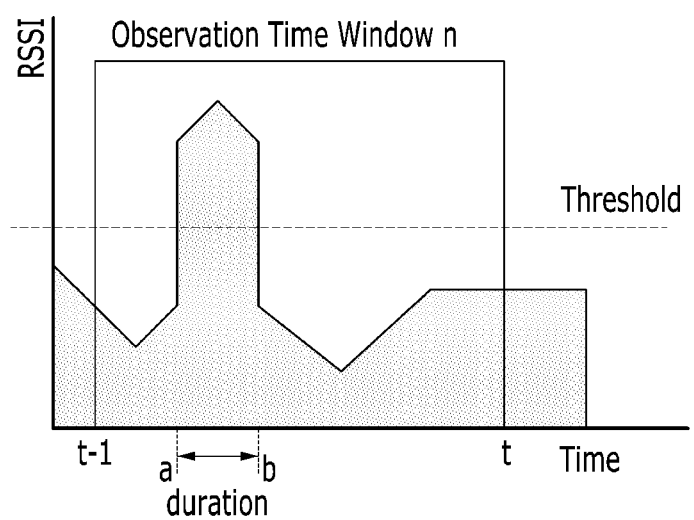
FIG. 43 is a schematic view illustrating a method for measuring a time ratio using a threshold value according to an exemplary embodiment of the present invention.

FIG. 43 is a schematic view illustrating a method for measuring a time ratio using a threshold value according to an exemplary embodiment of the present invention.

FIG. 43 illustrates a method for measuring a time ratio using a threshold value according to Alt.2. According to Alt.2, a ratio of time duration that is more or less than an RSSI threshold value may be calculated with respect to entire observation time duration and then reported to an LAA eNB. That is, the LAA UE may report a ratio of time duration (a, b) in which RSSI is higher than a threshold value to the LAA eNB with respect to entire observation time duration (t-1, t).

Figure 44:
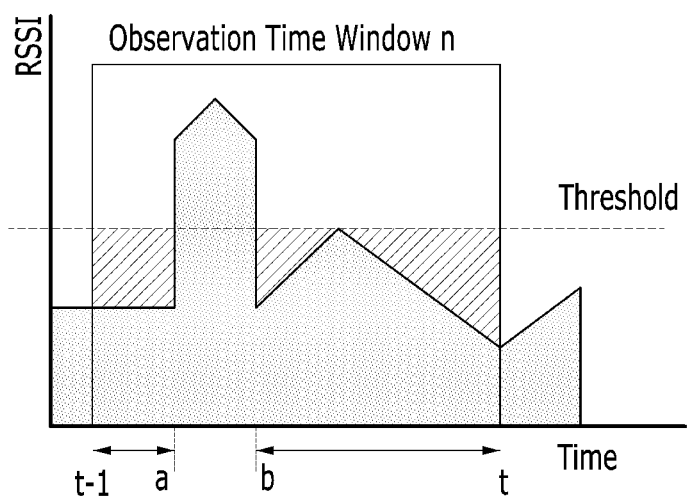
FIGS. 44 and 45 are schematic views illustrating a method for measuring average RSSI and a time ratio using a threshold value according to an exemplary embodiment of the present invention.
Figure 45:
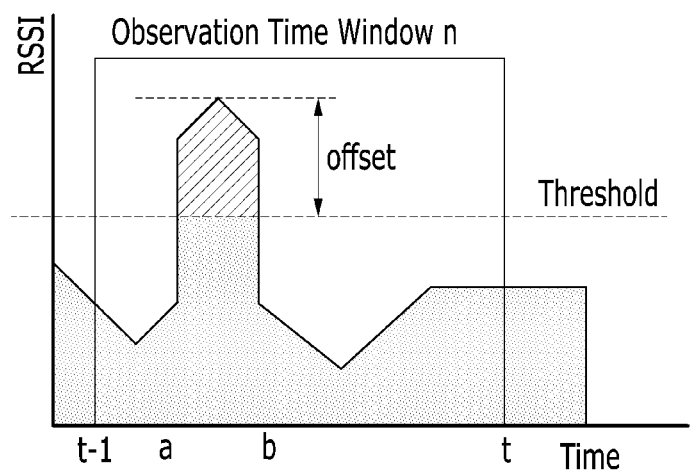

FIGS. 44 and 45 are schematic views illustrating a method for measuring average RSSI and a time ratio using a threshold value according to an exemplary embodiment of the present invention.

FIGS. 44 and 45 illustrate a method for measuring an average RSSI and time ratio of Alt.2-1 obtained by combining Alt.1-1 and Alt.2. According to Alt.2-1, time duration that is more or less than an RSSI threshold value may be measured during entire observation time duration, and a ratio of the measured time duration and average RSSI during the measured time duration may be reported. Referring to FIG. 44, the LAA UE may report a ratio of all time durations (t-1, a) and (b, t) in which RSSI is lower than a threshold value and an average value (indicated by dashed lines) of RSSI offset in the time duration to the LAA eNB with respect to entire measurement time duration (t-1, t). Referring to FIG. 45, the LAA UE may report a time duration ratio of time duration (a, b) in which RSSI is higher than a threshold value and an average value (indicated by dashed lines) of RSSI offset in this case to the LAA eNB with respect to entire measurement time duration (t-1, t).

Figure 46:
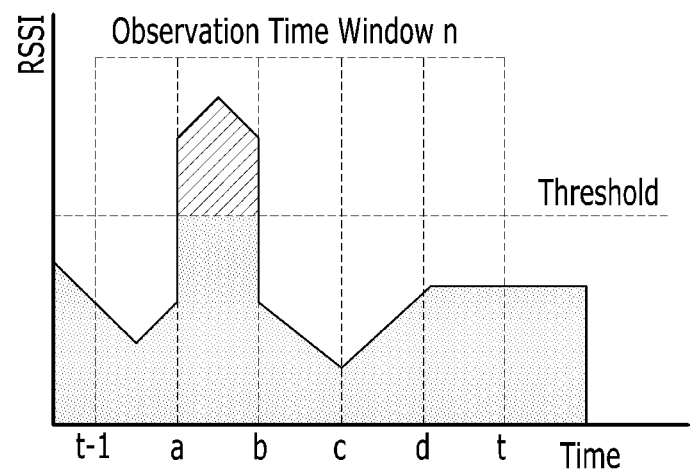
FIG. 46 is a schematic view illustrating a method for measuring a time period and an RSSI value using a bitmap according to an exemplary embodiment of the present invention.
Figure 47:
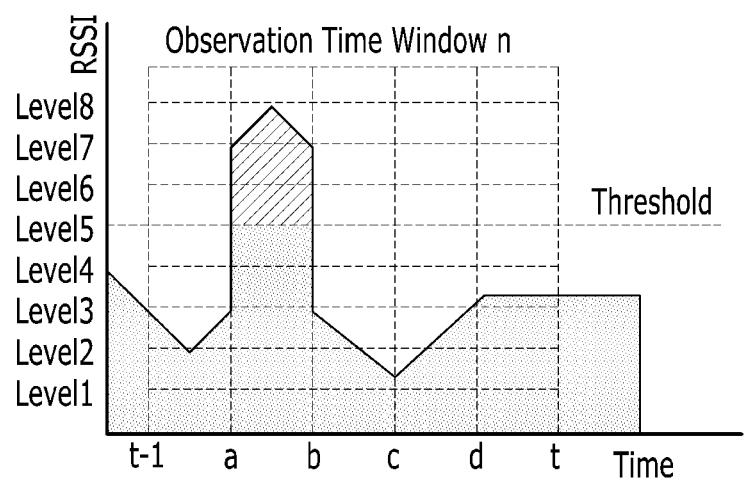
FIG. 47 is a schematic view illustrating a method for measuring a time period and an RSSI value using a histogram according to an exemplary embodiment of the present invention.

FIG. 46 is a schematic view illustrating a method for measuring a time period and an RSSI value using a bitmap according to an exemplary embodiment of the present invention. FIG. 47 is a schematic view illustrating a method for measuring a time period and an RSSI value using a histogram according to an exemplary embodiment of the present invention.

According to alt.3, RSSI measured in an observation time duration divided with the same interval may be reported. alt.3-1 and alt.3-2 may be separated from each other according to a measurement method and information.

FIG. 46 illustrates a method for measuring RSSI according to Alt.3-1. Referring to FIG. 46, entire observation time duration may be divided with the same interval and RSSI may be measured with respect to each portion of the divided observation time duration. Then, the RSSI measured during the divided observation time duration may be compared with a threshold value to configure a bitmap. The LAA UE may report the configured bitmap and an average of RSSI offset of a period equal to or more than a threshold value to the eNB. In FIG. 46, the LAA UE may report a bitmap '01000' and an average value of RSSI offset between a period a and a period b to the LAA eNB.

FIG. 47 illustrates a method for measuring RSSI according to Alt.3-2. Referring to FIG. 47, an entire observation time may be divided with the same interval, and RSSI may be measured with respect to each portion of the divided observation time duration. Then, a histogram may be configured by mapping the measured RSSI according to an RSSI level and an RSSI level of each period according to the configured histogram may be reported to the LAA eNB. In FIG. 47, RSSI level '38223' may be reported to the eNB.

Based on the above description, in order to measure an interference level and a congestion degree thorough RSSI measurement, it may be easier to recognize a state of an LAA cell than in the case in which an average value of observation time duration is measured when a time ratio in which an LAA cell is higher than a specific threshold value or average RSSI of a corresponding duration is measured.

RSSI measurement may be used to measure a frequency of a serving cell and a frequency of a neighbor cell and measured information may be changed according to whether a DRS is received. For example, when a DRS is received (reception of DRS), RSRP, RSRQ, and RSSI may be measured, and when the DRS is not received (no reception of DRS), only RSSI may be measured. Alternatively, an average value of RSRP, RSRQ, and RSSI that are measured during an observation time duration may be calculated.

Figure 48:
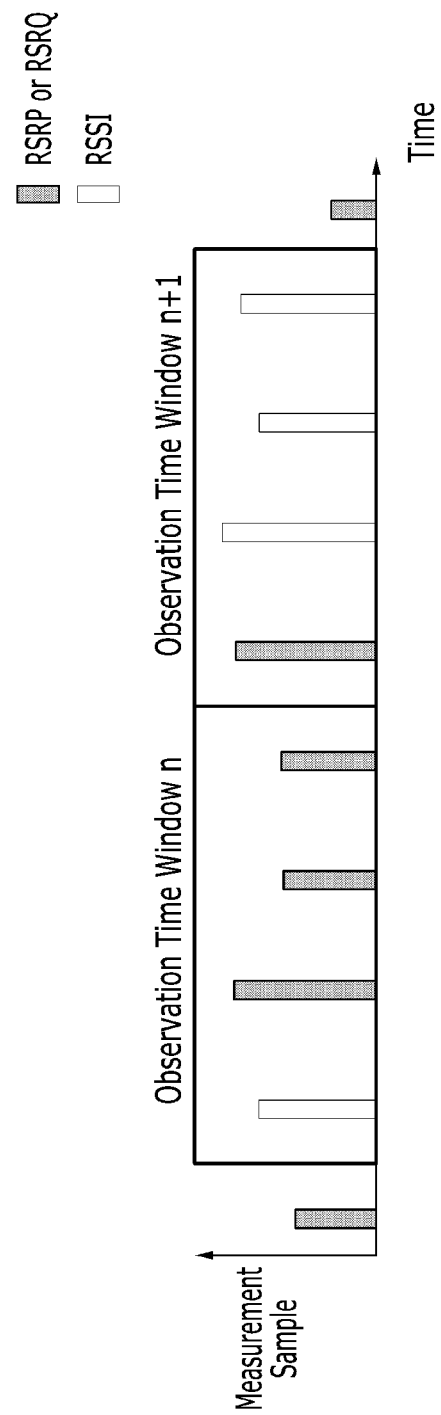
FIG. 48 is a schematic view illustrating RRM measurement according to an exemplary embodiment of the present invention.

FIG. 48 is a schematic view illustrating RRM measurement according to an exemplary embodiment of the present invention.

Referring to FIG. 48, RRM measurement may be performed in units of observation time durations (observation time window n and observation time window n+1). For example, three samples in which RSRP or RSRQ is measurable are present in an observation time window n and four samples in which RSSI measurement is achievable are present. Accordingly, four measurement samples may be used for RRM measurement in the observation time window n.

Configuration for RSSI measurement may include the following information according to a measuring method.

Alt.1: Measure average RSSI (average RSSI)

The configuration for RSSI measurement may include an observation window size, an RSSI threshold value, and information of an RSSI threshold value for reporting (in the case of event-driven measurement reporting).

Alt.1-1: Measure average RSSI with threshold value

The configuration for RSSI measurement may include an observation window size, an RSSI threshold value and information of an RSSI threshold value for reporting (in the case of event-driven measurement reporting).

Alt.2: Measure time ratio with threshold value

The configuration for RSSI measurement may include an observation window size, an RSSI threshold value and information of a threshold value of a time ratio for reporting (in the case of event-driven measurement reporting).

Alt.2-1: Measure average RSSI and time ratio with threshold value

The configuration for RSSI measurement may include an observation window size and information of a threshold value of a time ratio for reporting (in the case of event-driven measurement reporting).

Alt.3: Measure time period with RSSI

Alt.3-1: Measure time period and RSSI value with bitmap

The configuration for RSSI measurement may include an observation window size, the number of measurement periods in an observation window, an RSSI threshold value, and information of a threshold value of a time ratio for reporting (in the case of event-driven measurement reporting).

Alt.3-2: Measure time period and RSSI level with histogram

The configuration for RSSI measurement may include an observation window size, the number of measurement durations in an observation window, and information of a threshold value of a time ratio for reporting (in the case of event-driven measurement reporting).

Reporting configuration for measurement reporting of LAA may include reporting criterion and reporting format. The reporting criterion may be a method for triggering transmission of measurement report by an LAA UE and the reporting format may be associated with information contained in the measurement report.

Reporting criterion for RSRP and RSRQ measurement may be classified into periodic reporting and event-driven reporting. In the case of periodic reporting, a UE may transmit measurement information of a connected serving cell (including a PCell and a SCell) and a neighbor cell to the eNB with a predetermined time interval. In this case, the measurement information of the LAA cell may not be included in reporting according to the measurement result (when a DRS is not transmitted by LBT). In the case of event-driven reporting, the following event defined in the Rel-12 standard may be considered as a measurement event for the LAA cell.

Event A1 (Serving becomes better than threshold)
Event A2 (Serving becomes worse than threshold)
Event A4 (Neighbour becomes better than threshold)
Event A6 (Neighbour becomes offset better than SCell)
Event C1 (CSI-RS resource becomes better than threshold)
Event C2 (CSI-RS resource becomes offset better than reference CSI-RS resource)

In this case, periodic reporting or event-driven reporting may be used for RSRP and RSRQ measurement.

For dynamic carrier selection, a method for receiving measured RSSI from an LAA UE may be classified into event-driven reporting, periodic reporting, and one-shot reporting.

Case1: Event-Driven Reporting

When measured RSSI satisfies a predefined event, the RSSI may be reported. A predetermined event occurs, reporting is received from a UE, and an additional procedure (e.g., update of a candidate carrier list and carrier switching) for carrier selection according to determination of an LAA eNB may be performed.

Case2: Periodic Reporting

RSSI may be periodically reported using a timer. Based on RSSI information that is periodically transmitted from the LAA UE, an additional procedure (e.g., update of a candidate carrier list and carrier switching) for carrier selection according to determination of an LAA eNB may be performed.

Case2-1: One-Shot Reporting

RSSI may be reported according to request of the LAA eNB. A procedure for periodic reporting may be reused, and RSSI measurement may be transmitted once and then terminated.

In this case, when the event-driven reporting is used, the following event may be considered according to each RSSI measuring method.

Event Aa (Serving (RSSI) Becomes Better than Threshold)

Measurement information may be reported when an average RSSI measured in an observation window period configured with respect to a connected serving LAA cell is lower than a threshold value.

Event Ab (Serving (RSSI) Becomes Worse than Threshold)

Measurement information may be reported when an average RSSI measured in an observation window period configured with respect to a connected serving LAA cell is higher than a threshold value.

Event Ac (Neighbour (RSSI) Becomes Better than Threshold)

Measurement information may be reported when an average RSSI measured in an observation window period configured with respect to a neighbor LAA cell or frequency is lower than a threshold value.

Event Ad (Neighbour (RSSI) Becomes Offset Better than SCell)

Measurement information may be reported when an average RSSI measured in an observation period configured with respect to a neighbor LAA cell or frequency is lower than a threshold value.

Event Aa and event Ab among events for RSSI measurement may be related to measurement of a serving cell, and RSSI may be derived through RSRP/RSRQ measurement report of the Rel-12 standard, and thus event Aa and event Ab may be selectively used.

For example, when 'measurement of time ratio using threshold value (Alt.2)' and event Ab are applied, an LAA UE may report a time ratio to an LAA eNB when a ratio of time duration in which RSSI measurement value of a connected LAA cell higher than an RSSI threshold value is higher than a predetermined time ratio threshold value.

As another event-driven reporting method, the following event may be considered.

In the case of event D1 (RSSI becomes better than threshold), the measurement information may be reported to the eNB as follows. That is, the measurement information may be reported when RSSI measured at a carrier frequency configured by the eNB is lower than a threshold value.

alt.1: Measurement information (i.e., average RSSI measured in observation window period) may be reported to the eNB when an average value of RSSI measured in an observation window period is lower than a RSSI threshold value for reporting.

alt.1-1: Measurement information (i.e., average RSSI measured in period lower than RSSI threshold value) may be reported to the eNB when an average value of RSSI samples lower than an RSSI threshold value among RSSI samples measured in an observation window period is lower than a RSSI threshold value for reporting.

alt.2: Measurement information (i.e., time ratio of period lower than RSSI threshold value) may be reported to the eNB when a time duration ratio of RSSI samples lower than an RSSI threshold value among RSSI samples measured in an observation window period is lower than a time ratio threshold value for reporting.

alt.2-1: Measurement information (i.e., time ratio of period lower than RSSI threshold value and average RSSI measured in a period lower than RSSI threshold value) may be reported to the eNB when a time duration ratio of RSSI samples lower than an RSSI threshold value among RSSI samples measured in an observation window period is lower than a time ratio threshold value for reporting.

alt.3-1: Measurement information (i.e., RSSI bitmap and RSSI average value equal to RSSI threshold value or less) may be reported to the eNB when a time duration ratio of RSSI samples lower than an RSSI threshold value among RSSI samples measured in a measurement period with the same interval of an observation window is lower than a time ratio threshold for reporting.

alt.3-2: Measurement information (i.e., RSSI level) may be reported to the eNB when a time duration ratio of RSSI samples lower than an RSSI threshold value among RSSI samples measured in a measurement period with the same interval of an observation window is lower than a time ratio threshold value for reporting.

In the case of event D2 (RSSI becomes worse than threshold), measurement information may be reported to the eNB as follows. That is, measurement information may be reported when RSSI measured in a carrier frequency configured by the eNB is higher than a threshold value.

alt.1: Measurement information (i.e., average RSSI measured in observation window period) may be reported to the eNB when an average value of RSSI measured in the observation window period is higher than an RSSI threshold value for reporting.

alt.1-1: Measurement information (i.e., average RSSI measured in period higher than RSSI threshold value) may be reported to the eNB when an average value of RSSI samples higher than an RSSI threshold value among RSSI samples measured in an observation window period is higher than a RSSI threshold value for reporting.

alt.2: Measurement information (i.e., time ratio of period higher than RSSI threshold value) may be reported to the eNB when a time duration ratio of RSSI samples higher than an RSSI threshold value among RSSI samples measured in an observation window period is higher than a time ratio threshold value for reporting.

alt.2-1: Measurement information (i.e., time ratio of period higher than RSSI threshold value and average RSSI measured in a period higher than RSSI threshold value) may be reported to the eNB when a time duration ratio of RSSI samples higher than an RSSI threshold value among RSSI samples measured in an observation window period is higher than a time ratio threshold value for reporting.

alt.3-1: Measurement information (i.e., RSSI bitmap and RSSI average value equal to RSSI threshold value or less) may be reported to the eNB when a time duration ratio of RSSI samples higher than an RSSI threshold value among RSSI samples measured in a measurement period with the same interval of an observation window is higher than a time ratio threshold value for reporting.

alt.3-2: Measurement information (i.e., RSSI level) may be reported to the eNB when a time duration ratio of RSSI samples higher than an RSSI threshold value among RSSI samples measured in a measurement period with the same interval of an observation window is higher than a time ratio threshold value for reporting.

As the RSSI measurement result, information reported to the LAA eNB by the LAA UE is as follows according to a measurement method, and in this case, measurement information may be contained in a MeasResultsinformation object and transmitted to the LAA eNB from the LAA UE.

Alt.1: Measure average RSSI

An average RSSI value measured in a measurement time window may be included in an MeasResults information object.

Alt.1-1: Measure average RSSI with threshold value

An average RSSI value included in a threshold value or more or less that is configured in a measurement time window may be included in a MeasResults information object.

Alt.2: Measure time ratio with threshold value

A percentage value of time duration included in a threshold value or more or less that is configured in a measurement time window may be included in a MeasResults information object.

Alt.2-1: Measure time ratio and average RSSI with high interference

A percentage value of time duration included in a threshold value or more or less that is configured in a measurement time window and an average RSSI value of corresponding time duration may be included in a MeasResults information object.

Alt.3-1: Measure time period and RSSI value with bitmap

A bitmap value of time duration measured in a measurement time window and an average RSSI value included in a threshold value or more or less of corresponding time duration may be included in a MeasResults information object.

Alt.3-2: Measure time period and RSSI level with histogram

An RSSI level value in time duration measured in a measurement time window may be included in a MeasResults information object.

Figure 49:
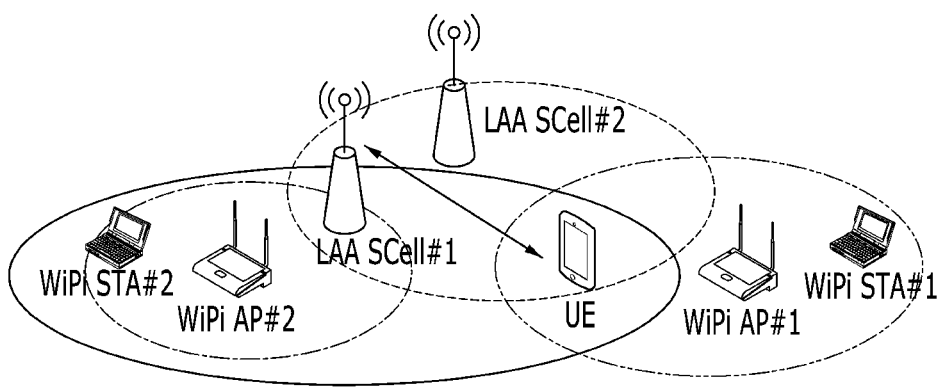
FIG. 49 is a schematic view illustrating a hidden node searching method according to an exemplary embodiment of the present invention.

FIG. 49 is a schematic view illustrating a hidden node searching method according to an exemplary embodiment of the present invention.

According to an exemplary embodiment of the present invention, whether a hidden node of a UE is present may be checked using RSSI.

First, the LAA eNB may occupy a channel during observation time duration through LBT and indicate RSSI measurement to the LAA cell and the LAA UE during the period. Then, the LAA cell and the LAA UE may transmit RSSI related measurement information measured during observation time duration to the LAA eNB. The LAA eNB that receives the RSSI related measurement information may compare an RSSI value measured by the LAA cell and an RSSI value received from the UE to estimate a hidden node near the UE.

For example, when a RSSI value received from the UE is higher than an RSSI value measured by the LAA cell, it may be estimated that the hidden node is positioned near the UE.

However, upon receiving a signal from a device that is not capable of detecting LBT, the LAA cell may not accurately estimate whether a hidden node is present from the RSSI related measurement information reported from the LAA UE.

Referring to FIG. 49, LAA SCell #1 may indicate RSSI measurement for F2 (dotted line) for selection of a new candidate frequency for LAA SCell #1 to the UE while providing a service to the UE using frequency F1 (solid line). Simultaneously, LAA SCell #1 may also perform RSSI measurement on F2. In F2, LAA SCell #2, WiFi AP #1 and WiFi STA #1, and WiFi AP #2 and WiFi STA #2 may operate.

Then, the UE may measure RSSI of F2 in a time duration indicated by LAA SCell #1 and report the RSSI to the LAA eNB. LAA SCell #1 may determine whether a hidden node is present via comparison between an RSSI measurement value reported from the UE and RSSI measured by LAA SCell #1. The following method may be used in an RSSI measuring method.

A method for measuring average RSSI with threshold value (Alt.1-1) in the average RSSI measurement (Alt.1), In this method, average RSSI measured by LAA SCell #1 and average RSSI reported by the UE may be compared with each other. When the average RSSI reported by the UE is different from the average RSSI measured by LAA SCell#1, presence of a hidden node is recognized.

A method for measuring average RSSI and time ratio with threshold value (Alt.2-1) in measurement of time ratio with threshold value (Alt.2).

In this method, a time ratio equal to or more than a threshold value measured in LAA SCell #1 and a time ratio equal to or more than a threshold value reported by the UE may be compared with each other. When the time ratio reported from the UE is different from the time ratio measured by LAA SCell#1, presence of a hidden node is recognized.

Method for measuring time period and RSSI value with bitmap (Alt.3-1).

In this method, a bitmap measured by LAA SCell #1 and a bitmap reported from the UE may be compared with each other. When a bitmap reported by the UE is different from a bitmap measured by LAA SCell#1, presence of a hidden node may be recognized according to a rule of Table 1 below.

In Table 1 below, bit information "1" indicates 'measured RSSI≥threshold value' and bit information "0" indicates 'measured RSSI<threshold value'.

TABLE 1

| | Bit information | |
| --- | --- | --- |
| Determination | LAA SCell#1 Measurement information (bit information) | UE reporting information (bit information) |
| No signal | 0 | 0 |
| Hidden node near UE | 0 | 1 |
| Exposed node near eNB | 1 | 0 |
| Exposed node near eNB and UE | 1 | 1 |

Measure time duration and RSSI level with $i^{th}$ histogram (Alt.3-2).

In this method, a pattern of an RSSI measurement value in a time period equal to a threshold value or more in a histogram level measured in LAA SCell #1 and a pattern of an RSSI measurement value in time duration equal to a threshold value or more in a histogram level reported by the UE may be compared with each other. The RSSI measurement values reported by LAA SCell #1 or the UE may be compared to generate bitmap information according to Alt.3-1. For example, bit information "1" indicates 'measured RSSI≥threshold value' and bit information "0" indicates 'measured RSSI<threshold value'. In addition, when the pattern derived through the histogram reported by the UE is different from the pattern derived through the histogram measured by LAA SCell#1, presence of a hidden node may be recognized using a rule shown in Table 1 above.

Figure 50:
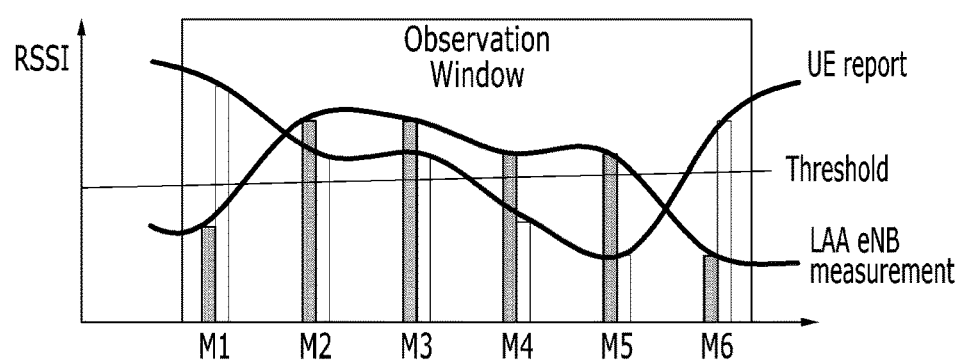
FIG. 50 is a graph illustrating RSSI measured by LAA SCell#1 and the UE according to an exemplary embodiment of the present invention.

FIG. 50 is a graph illustrating RSSI measured by LAA SCell#1 and the UE according to an exemplary embodiment of the present invention.

It is very difficult to search for a hidden node using Alt.1 or Alt.1-1 based on the RSSI measurement value since an average value is used in an entire observation window. When Alt.2 or Alt.2-1 is used, a ratio of time duration is compared based on an entire observation window, and thus there is a limit in effectively detecting a hidden node. However, Alt.3-1 or Alt.3-2 may be appropriate to detect a hidden node because an observation window is divided into a plurality of measurement periods with the same interval and RSSIs are measured and compared with respect to the divided respective measurement periods.

Referring to FIGS. 49 and 50, when Alt.3-1 or Alt.3-2 is used, it is seen that a hidden node (i.e., WiFi AP#1 or WiFi STA#1) is present near the UE through the result measured in t1 and t6 and that an exposed node (i.e., LAA SCell #2) recognizable by the UE and LAA SCell #1 is present in t2 and t3. In addition, LAA SCell#1 may recognize that an exposed node (i.e., WiFi AP#2 or WiFi STA#2) that is not recognizable by the UE is positioned in t4 and t5.

Figure 51:
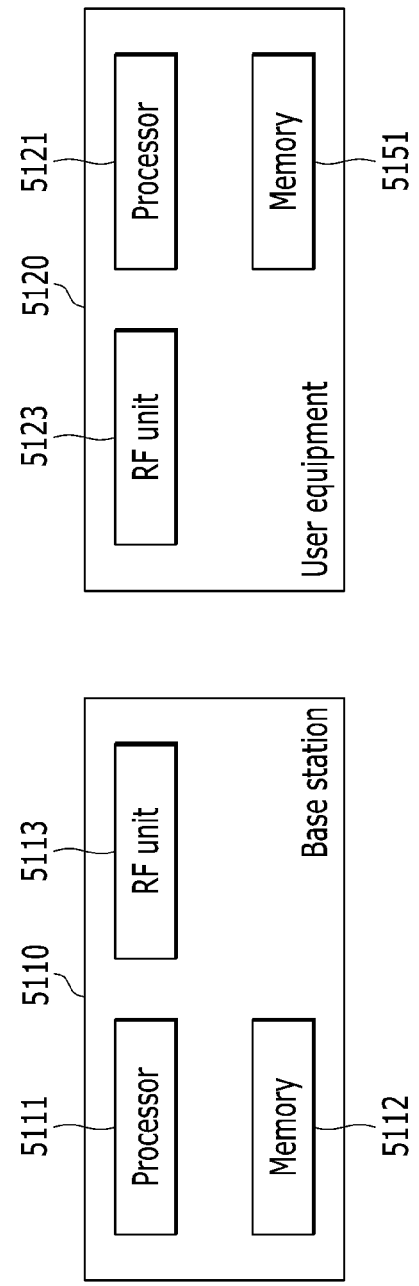
FIG. 51 is a block diagram illustrating a wireless communication system according to an exemplary embodiment of the present invention.

FIG. 51 is a block diagram illustrating a wireless communication system according to an exemplary embodiment of the present invention.

Referring to FIG. 51, the wireless communication system according to an exemplary embodiment of the present invention may include a base station 5110 and a user equipment 5120.

The base station 5110 may include a processor 5111, a memory 5112, a radio frequency (RF) unit 5113. The memory 5112 may be connected to the processor 5111 and may store various information items for driving the processor 5111 or at least one program executed by the processor 5111. The RF unit 5113 may be connected to the processor 5111 and may transmit/receive a radio signal. The processor 5111 may execute a function, a procedure, or a method proposed according to an exemplary embodiment of the present invention. In this case, in the wireless communication system according to an exemplary embodiment of the present invention, a wireless interface protocol layer may be embodied by the processor 5111. An operation of the base station 5110 according to an exemplary embodiment of the present invention may be embodied by the processor 5111.

The user equipment 5120 may include a processor 5121, a memory 5122, and a RF unit 5123. The memory 5122 may be connected to the processor 5121 and may store various information items for driving the processor 5121 or at least one program executed by the processor 5121. The RF unit 5123 may be connected to the processor 5121 and may transmit/receive a radio signal. The processor 5121 may execute a function, a procedure, or a method proposed according to an exemplary embodiment of the present invention. In this case, in the wireless communication system according to an exemplary embodiment of the present invention, a wireless interface protocol layer may be embodied by the processor 5121. An operation of the user equipment 5120 according to an exemplary embodiment of the present invention may be embodied by the processor 5121.

A memory according to an exemplary embodiment of the present invention may be positioned inside or outside a processor and may be connected to the processor via various means that are already known. A memory may be various types of volatile or nonvolatile storage medium and for example, may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for measuring channel occupancy of a licensed assisted access (LAA) cell by a base station, the method comprising:
   transmitting configuration information for received signal strength indication (RSSI) measurement for a frequency of the LAA cell to user equipment, wherein the configuration information includes a period of the RSSI measurement and a subframe offset of the RSSI measurement;
   receiving a report of the RSSI measurement from the user equipment; and
   selecting a channel of the LAA cell in which hidden nodes may exist based on the report of the RSSI measurement,
   wherein the report includes average RSSI and a measurement result information element including a percentage of samples when a measured value of the RSSI is more than a threshold value.

2. The method of claim 1, wherein the selecting the channel of the LAA cell based on the report of the RSSI measurement includes:
   determining a carrier frequency based on the report of the RSSI measurement of which the measured value of the samples is above the threshold value; and
   providing a service using the carrier frequency.

3. The method of claim 1, wherein the selecting the channel of the LAA cell based on the report of the RSSI measurement includes:
   changing a carrier frequency based on the report of the RSSI measurement of which the measured value of the samples is above the threshold value; and
   transmitting information about the carrier frequency.

4. The method of claim 1, further comprising
   determining interference level of the frequency based on the report of the RSSI measurement.

5. The method of claim 1, further comprising
   detecting a hidden node based on a comparison the report of the RSSI measurement and an RSSI measurement of a base station of the LAA cell.

6. The method of claim 1, further comprising
   detecting a hidden node based on a bitmap of the report of the RSSI measurement and an RSSI measurement of a base station of the LAA cell.

7. The method of claim 1, wherein the configuration information is transmitted through a radio resource control (RRC) signaling including an information element indicating the frequency.

8. The method of claim 1, wherein the period of the RSSI measurement is 40 ms or 80 ms.

9. A method for measuring channel occupancy of a licensed assisted access (LAA) cell by a terminal, the method comprising:
   receiving configuration information for received signal strength indication (RSSI) measurement for a frequency of the LAA cell from a base station, wherein the configuration information includes a period of the RSSI measurement and a subframe offset of the RSSI measurement;
   measuring the RSSI for the frequency; and
   transmitting a report of the RSSI measurement to the base station,
   wherein the report includes average RSSI and a measurement result information element including a percentage of samples when a measured value of the RSSI is more than a threshold value and the report of the RSSI measurement is used to select channel by the based station.

10. The method of claim 9, further comprising:
    receiving a service from the base station through a carrier frequency determined based on the report of the RSSI measurement of which the measured value of the samples is above the threshold value.

11. The method of claim 9, further comprising:
    receiving information about a carrier frequency changed by the base station based on the report of the RSSI measurement of which the measured value of the samples is above the threshold value.

12. The method of claim 9, wherein the configuration information is received through a radio resource control (RRC) signaling including an information element indicating the frequency.

13. The method of claim 9, wherein the period of the RSSI measurement is 40 ms or 80 ms.

* * * * *